(12) United States Patent
Hildebrand et al.

(10) Patent No.: US 9,639,437 B2
(45) Date of Patent: May 2, 2017

(54) TECHNIQUES TO MANAGE NON-DISRUPTIVE SAN AVAILABILITY IN A PARTITIONED CLUSTER

(71) Applicant: NETAPP, INC., Sunnyvale, CA (US)

(72) Inventors: John Hildebrand, Hillsborough, NC (US); Geoffrey Stewart Brown, Raleigh, NC (US); Nathan Baker, Morrisville, NC (US); John Meneghini, Billerica, MA (US); Frederick Knight, Cary, NC (US); Santosh Rao, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 53 days.

(21) Appl. No.: 14/526,975

(22) Filed: Oct. 29, 2014

(65) Prior Publication Data

US 2015/0169415 A1 Jun. 18, 2015

Related U.S. Application Data

(60) Provisional application No. 61/916,089, filed on Dec. 13, 2013, provisional application No. 62/047,365, filed on Sep. 8, 2014.

(51) Int. Cl.
*G06F 11/14* (2006.01)
*G06F 11/20* (2006.01)
*G06F 3/06* (2006.01)

(52) U.S. Cl.
CPC ........ *G06F 11/201* (2013.01); *G06F 11/1425* (2013.01); *G06F 11/2089* (2013.01); *G06F 3/0617* (2013.01); *G06F 11/2094* (2013.01)

(58) Field of Classification Search
CPC .... G06F 11/142; G06F 11/1425; G06F 11/20; G06F 11/2002; G06F 11/2005; G06F 11/2007; Y10S 707/99953
See application file for complete search history.

(56) References Cited

U.S. PATENT DOCUMENTS

| | | | | |
|---|---|---|---|---|
| 6,658,587 B1 * | 12/2003 | Pramanick | .......... | G06F 11/1425 709/230 |
| 7,590,737 B1 * | 9/2009 | Chen | ...................... | G06F 11/004 709/223 |
| 7,631,066 B1 * | 12/2009 | Schatz | .................. | G06F 9/5016 709/224 |
| 7,739,541 B1 * | 6/2010 | Rao | ...................... | G06F 11/0709 709/205 |
| 7,778,157 B1 * | 8/2010 | Tawri | .................. | G06F 11/2005 370/216 |
| 7,827,441 B1 * | 11/2010 | Wenzel | ............... | G06F 11/1076 711/130 |
| 2002/0083036 A1 * | 6/2002 | Price | .................... | G06F 11/2028 |
| 2014/0173330 A1 * | 6/2014 | Samanta | ............. | G06F 11/1666 714/4.11 |

* cited by examiner

Primary Examiner — Joseph Schell
(74) Attorney, Agent, or Firm — LeClairRyan, a Professional Corporation

(57) ABSTRACT

Techniques to managing non-disruptive SAN availability in a partitioned cluster comprising one or more components configured to determine whether to separate a cluster into two or more partitions, notify one or more responsive cluster nodes to separate the cluster into a first partition and a second partition, update one or more access states, notify the host that access states of one or more network paths has been updated, and provide the one or more access states. Other embodiments are described and claimed.

20 Claims, 35 Drawing Sheets

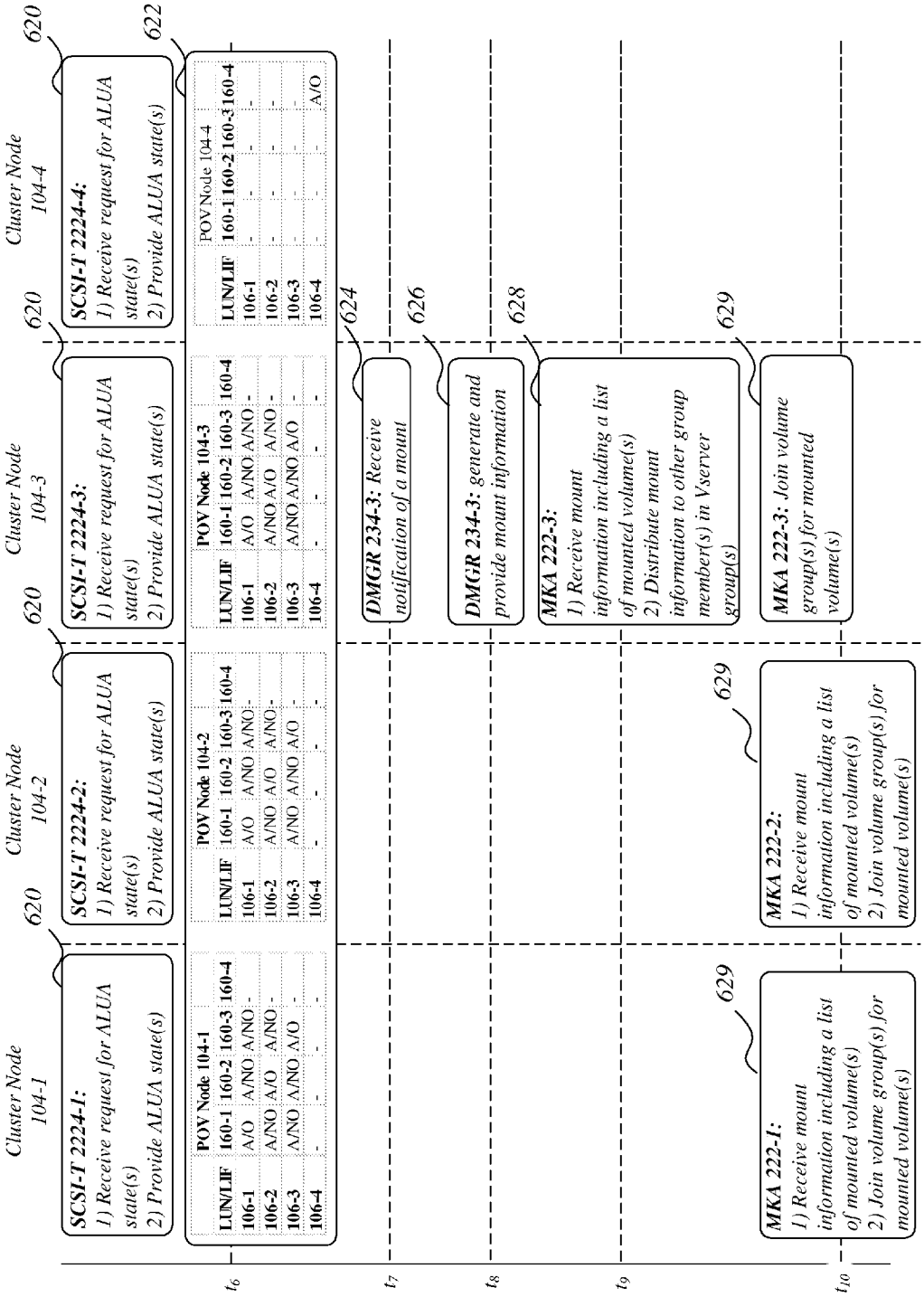

1030

Start
1032

↓

Provide Access States for at least two Logical Interfaces to a Host communicatively coupled to the at least two Logical Interfaces managed by at least two Cluster Nodes, the at least two Logical Interfaces including a First Logical Interface managed by a Destination Cluster Node and configured to provide access to a First Storage Unit and a Second Logical Interface managed by a Source Cluster Node configured to provide access to a Second Storage Unit, the Source and the Destination Cluster Nodes being located in Separate Partitions
1034

↓

Provide Pre-Relocation Information, in Response to Receiving a Pre-Relocation Notification Indicating a Data Mobility Event of the Second Storage Unit From the Source Cluster Node to the Destination Cluster Node
1036

↓

Remove Management Responsibility for the Second Storage Unit, in Response to Receiving the Pre-Relocation Information
1038

} Optional

↓

Protect Integrity of Information Stored in at least the Second Storage Unit and Accessed via the Second Logical Interface
1040

↓

Provide Post-Relocation Information, in Response to Receiving a Post-Relocation Notification Indicating the Completion of the Data Mobility Event of the Second Storage Unit to the Destination Cluster Node
1042

} Optional

↓

Disassociate from the Second Storage Unit, In Response to Receiving the Post-Relocation Information
1044

↓

Update at Least One Access State for the Second Logical Interface Managed by the Source Cluster Node to Disable the Host Access to the Second Storage Unit via the Second Logical Interface
1046

↓

Notify the Host of at least one Updated Access State for at least the Second Logical Interface
1048

↓

Provide the at least one Updated Access State for at least the Second Logical Interface to the Host, such that the Host Maintains Access to the Second Storage Unit via at least the First Logical Interface After the Data Mobility Event
1050

↓

End
1052

TECHNIQUES TO MANAGE NON-DISRUPTIVE SAN AVAILABILITY IN A PARTITIONED CLUSTER

CLAIM OF PRIORITY

This application claims the benefit of U.S. Provisional Application No. 61/916,089, filed Dec. 13, 2013 and U.S. Provisional Application No. 62/047,365, filed Sep. 8, 2014. Each patent application identified above is incorporated here by reference in its entirety to provide continuity of disclosure.

BACKGROUND

As more and more business critical applications are being deployed on virtualized, shared infrastructure, there has been a trend towards using clustered network storage systems to improve reliability. In a clustered storage system, two or more cluster nodes are connected in a distributed architecture such that the cluster nodes operate in a coordinated manner to respond to host requests. Each cluster node may be a storage controller, although may be implemented using a distributed architecture. Two or more cluster nodes are typically connected to form a cluster, where each of the cluster nodes in the cluster can communicate with the other cluster nodes in the cluster.

A clustered architecture allows convenient scaling through the addition of more cluster nodes, all capable of communicating with each other. Further, a storage cluster may present a single system image of stored data to hosts and administrators, such that the actual location of data can be made transparent to hosts and administrators. However, as the number of nodes increases, maintaining a consistent single cluster configuration across the cluster nodes of the cluster becomes a challenge as management and control operations may be performed on multiple nodes simultaneously. Thus the consistency of the cluster configuration becomes at risk, especially when communications between cluster nodes begins to experience intermittent failures. It is with respect to these and other considerations that the present improvements have been needed.

BRIEF DESCRIPTION OF THE DRAWINGS

FIG. 6C illustrates a continuation of the second operating environment during the data mobility event and the interconnect failure.

FIG. 10B illustrates yet another embodiment of a logic flow of data mobility in the non-disruptive cluster storage system during an interconnect failure.

DETAILED DESCRIPTION

Figure 1A:
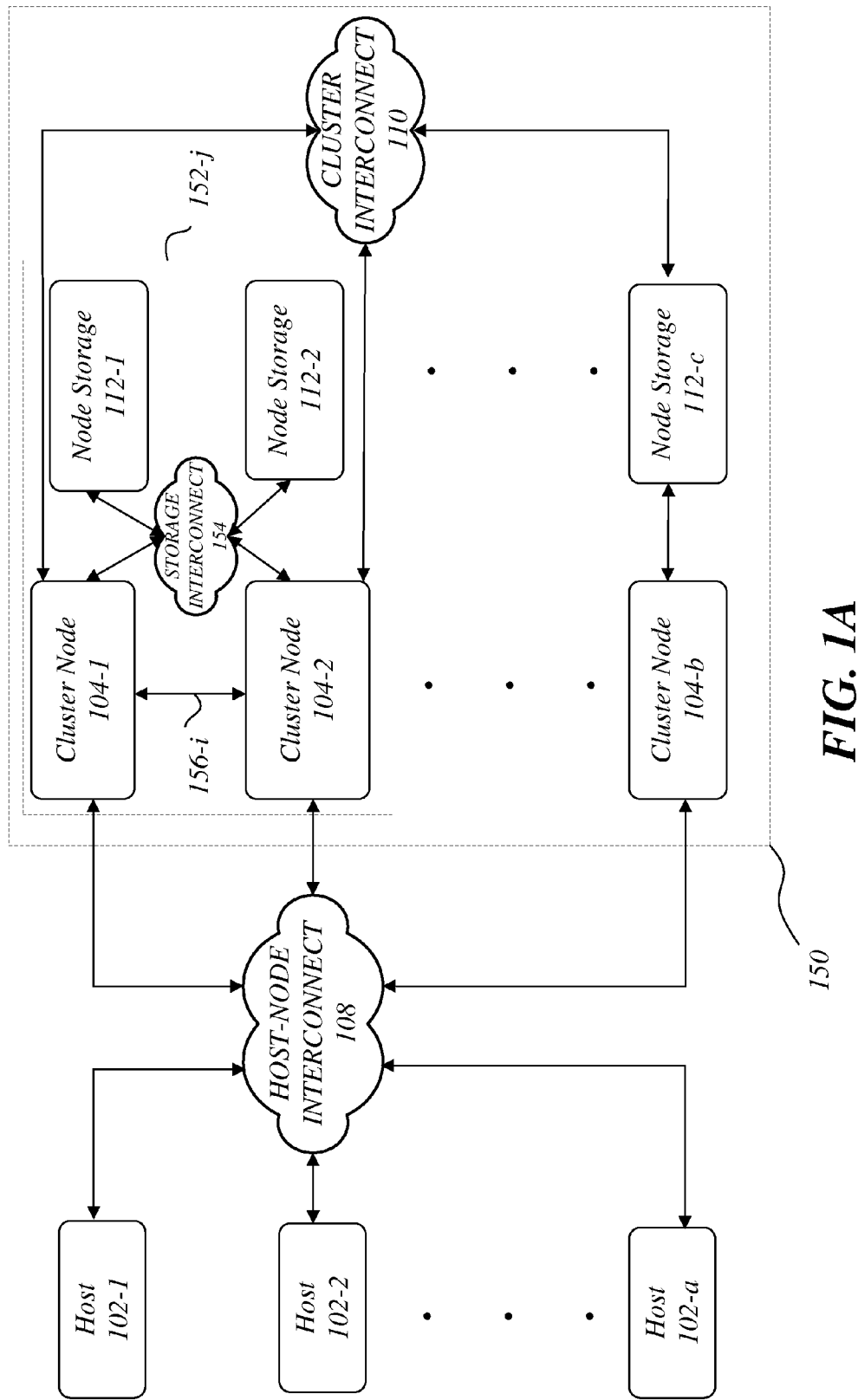
FIG. 1A illustrates an embodiment of a non-disruptive cluster storage system.

Various embodiments are directed to a non-disruptive cluster storage system including two or more cluster nodes arranged to provide one or more virtual storage elements (e.g., a virtual storage server). Each virtual storage element may be configured to provide distributed storage to one or more hosts. In the non-disruptive cluster storage system, the one or more hosts may store their data in one or more storage units such, as for example, one or more logical units (LUs), managed by the two or more cluster nodes. Each cluster node may be communicatively coupled with other cluster nodes via a cluster interconnect to share resources and/or shared states of one or more components of the cluster nodes in order to provide the one or more storage elements accessible by the one or more hosts.

Because of the distributed nature of the non-disruptive cluster storage system, interconnect failures between two more cluster nodes are unavoidable, and accordingly, in an effort to ensure that one or more communication failures within the cluster interconnect do not disrupt a host's access (e.g., data input/output (I/O), data read/write (R/W), etc.) to the one or more storage units such as, for example, LUs containing their data, the non-disruptive distributed storage system may provide a non-disruptive availability mechanism. Moreover, the non-disruptive availability mechanism may detect communication failures between one or more cluster nodes, determine whether the cluster is separated into one or more partitions, protect one or more hosts during the separation into one or more partitions, and provide access state updates to the one or more hosts regarding the location of the one or more storage units so that hosts communicatively coupled to the one or more storage elements may continue to store, access, and/or data in a non-disruptive manner despite the fact that the cluster is separated into one or more partitions.

When communication resumes between the one or more cluster nodes, the non-disruptive cluster storage system may detect one or more communicatively accessible and operational (i.e., running, executing, or otherwise responsive) cluster nodes in one or more partitions, combine one or more partitions in the cluster, protect the one or more hosts during such transition, and provide updates to the one or more logical interfaces regarding the location of the one or more LUs so that one or more hosts that are communicatively coupled to the one or more virtual storage elements may resume/continue to store, access, and/or modify their data.

In instances where storage units managed by a source cluster node are moved to, relocated to, or undertake management by a destination cluster node (i.e., a data mobility event) during an interconnect failure between the source cluster node and the destination cluster node, the non-disruptive cluster storage system may also provide one or more notifications so that cluster nodes may provide updates to the one or more logical interfaces regarding the new location of the one or more storage units so that the one or more hosts that are communicatively coupled to the one or more virtual storage elements may continue to store, access, and/or modify their data in those storage units.

To ensure that shared resources and/or shared states between cluster nodes remain consistent when cluster nodes are separated into partitions, the non-disruptive cluster storage system may be configured to maintain access to the information stored on the cluster nodes within the various partitions by utilizing persistent groups, node-locality (i.e., super member) groups, required membership voting method, and/or super membership voting method so that the shared resources and/or shared states between cluster nodes in different partitions persists within their respective partitions but modifications to shared resources and/or shared states are prevented when such modifications would cause one or more cluster nodes to be in an inconsistent state. These are merely a few of the features and benefits of a non-disruptive cluster storage system, and other features and benefits are described below.

With general reference to notations and nomenclature used herein, the detailed descriptions, which follow, may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding, transitioning, updating, associating, disassociating, notifying, determining, providing, receiving, comparing, or the like, which may be commonly associated with mental operations performed by a human operator. However, no such capability of a human operator is necessary, or desirable in most cases, in any of the operations described herein, which form part of one or more embodiments. Rather, these operations are machine operations. Useful machines for performing operations of various embodiments may include, without limitation, general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1A illustrates a block diagram for a non-disruptive cluster storage system 100 having a cluster 150 comprising a SAN subsystem. The cluster 150 may include one or more cluster nodes 104-b in communication with one or more hosts 102-a via a host-node interconnect 108 network, in a client-server fashion or in a peer-to-peer fashion. To facilitate communication between the one or more hosts 102-a and the one or more cluster nodes 104-b, the host-node interconnect 108 network may comprise one or more network devices (e.g., hubs, switches, routers, etc.) operatively connected to one or more network interface cards (NIC) and/or host bus adapters (HBA) attached to the one or more hosts 102-a and one or more physical network ports (e.g., Ethernet port on a NIC) attached to the one or more cluster nodes 104-b.

It is worthy to note that "a" and "b" and "c" and similar designators as used herein are intended to be variables representing any positive integer. Thus, for example, if an implementation sets a value for a=4, then a complete set of elements 102-a may include elements 102-1, 102-2, 102-3, and 102-4. The embodiments are not limited in this context.

The one or more cluster nodes 104 may be in communication with one or more node storages 112-c via storage interconnect 154. The one or more node storages 112 may include, without limitation, one or more storage units. The storage units may be logical abstractions of various data containers such as, for example, aggregates, volumes, LUNs, and/or any other data structure configured to store information. Additionally, each pair of cluster nodes such as cluster nodes 104-1 and 104-2 may be in communication with a pair of node storages 112-1, 112-2 via storage interconnect 154 and to each other via high availability interconnect 156-i to form a high availability pair 152-j so that when one cluster node (i.e., a high availability partner cluster node) in the high availability pair becomes communicatively inaccessible or not operational, the other cluster node may take ownership and management of data stored in both node storages 112-1 and 112-2. It may be appreciated that combination of cluster nodes 104 and node storages 112 may vary with a given implementation in order to provide redundancy and meet a client's need for availability and reliability.

The hosts 102 may be implemented as one or more servers, operatively coupled to the cluster nodes 104, in order to store, retrieve, and modify their associated data stored in the node storages 104. The cluster nodes 104 may be implemented as one or more storage controllers executing one or more storage operating systems operatively coupled to one or more node storages 112.

In various embodiments, the hosts 102, the cluster nodes 104, and/or the node storage 112 may each comprise one or more components. As used herein the terms "system" and "application" and "component" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an operating system running on a host, cluster node, and/or node storage and the host, cluster node, and/or node storage themselves can be a component. One or more components can reside within a process and/or thread of execution, and a component can be localized on one computer and/or distributed between two or more computers as desired for a given implementation. The embodiments are not limited in this context.

In various embodiments, the one or more components may also be communicatively coupled via various types of communications media and may coordinate operations between each other. The coordination may involve the uni-directional or bi-directional exchange of information. The one or more components may communicate via one or more interfaces such as application program interfaces and/or local or remote procedural mechanisms across one or more hardware and/or software boundaries. Additionally, the one or more components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, network interfaces, and bus interfaces.

In order to provide, fault tolerance, load balancing, and/or maintenance of consistency of shared resources and/or shared states between and among the cluster nodes 104-b, the one or more cluster nodes 104-b may also be in communication with each other via cluster interconnect 110. To facilitate communication between the one or more cluster nodes 104, the cluster interconnect 110 network may comprise one or more network components (e.g., hubs, switches, routers, etc.) operatively connected to the one or more cluster nodes 104.

In the illustrated embodiment shown in FIG. 1A, the one or more hosts 102-a, one or more cluster nodes 104 and one or more node storages 112-c may be electronic devices of same or different types. An exemplary electronic device may include any electronic device capable of receiving, processing, storing, and/or sending data for the non-disruptive cluster storage system. Examples of an electronic device may include, without limitation, an ultra-mobile device, a mobile device, a personal digital assistant (PDA), a mobile computing device, a smart phone, a telephone, a digital telephone, a cellular telephone, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a storage controller, a network-attached storage, mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context. Although a non-disruptive cluster storage system 100 shown in FIG. 1A has a limited number of elements in a certain topology, it may be appreciated that a non-disruptive cluster storage system 100 may include more or less elements in alternate topologies as desired for a given implementation.

Figure 1B:
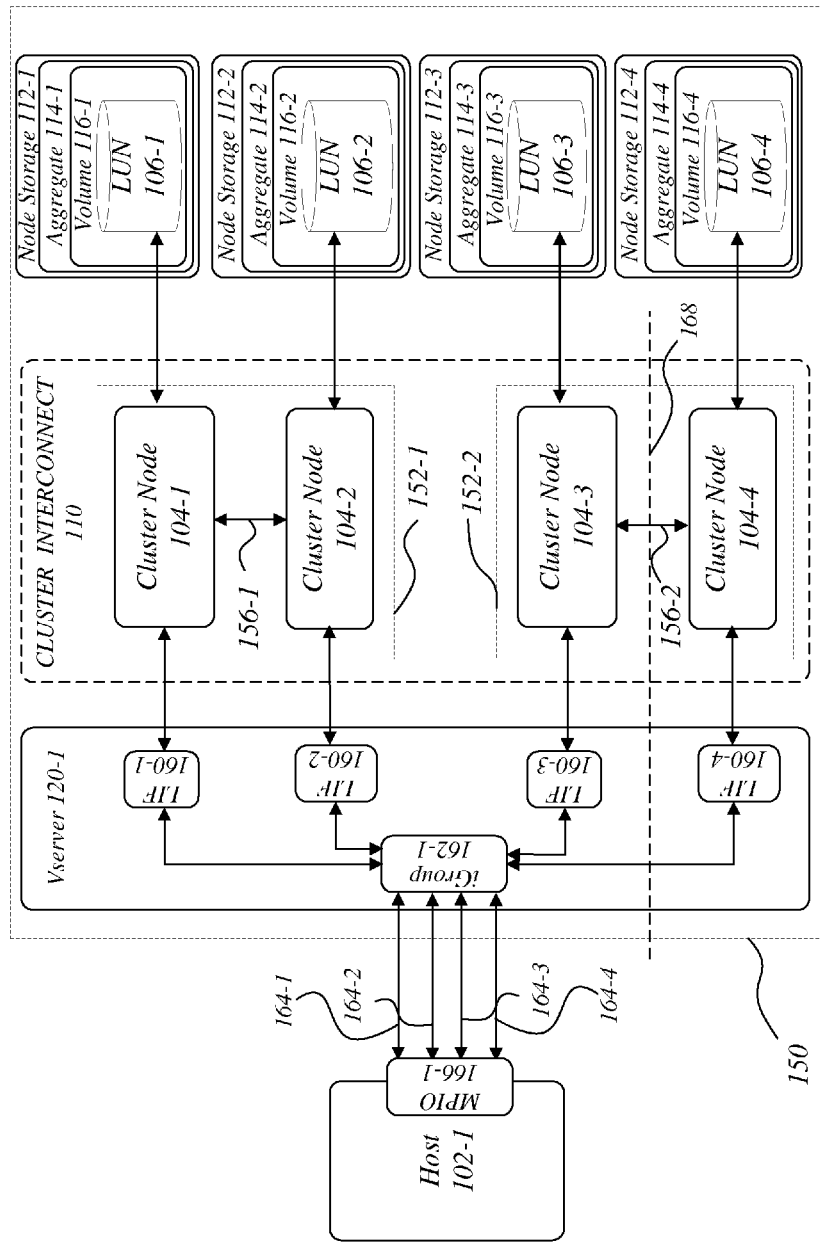
FIG. 1B illustrates another embodiment of the non-disruptive cluster storage system.

FIG. 1B illustrates a block diagram for the non-disruptive cluster storage system 175 having four cluster nodes 104-1, 104-2, 104-3, and 104-4, where each cluster node is hosting or managing storage units such as, for example, LUs identified by Logical Unit Numbers (LUNs) 106-1, 106-2, 106-3, and 106-4, respectively. The one or more LUNs 106-1, 106-2, 106-3, and 106-4, maybe stored in volumes 116-1, 116-2, 116-3, and 116-4, which is further stored in aggregates 114-1, 114-2, 114-3, and 114-4, respectively. The aggregates may be allocated from one or more redundant array of independent disks (RAID) (i.e., a combination of multiple physical disks) groups contained in a node storage such as node storage 112-1, 112-2, 112-3, or 112-4. It may be appreciated that while a single aggregate, volume, or LUN is illustrated in each node storage in FIG. 1B, each node storage may include one or more aggregates and each aggregate may include one or more volumes and each volume may include one or more LUNs.

Each pair of cluster nodes 104-1 and 104-2 and cluster nodes 104-3 and 104-4 may be in communication with each other via high availability interconnects 156-1 and 156-2 to form high availability pairs 152-1 and 152-2 so that when one cluster node (e.g., cluster node 104-4) in the high availability pair becomes communicatively inaccessible or not operational, the other cluster node (e.g., cluster node 104-3) may take ownership and management of data stored in both node storages (e.g., node storages 112-3 and 112-4).

Each of the four cluster nodes 104-1, 104-2, 104-3, and 104-4 may also be associated with logical interfaces (LIFs) 160-1, 160-2, 160-3, and 160-4, respectively. The one or more hosts 102, may access the one or more storage units via the LIFs 160-1, 160-2, 160-3, and 160-4 using one or more protocols such as, for example, Small Computer System Interface (SCSI), Internet Small Computer System Interface (iSCSI), Fibre Channel Protocol (FCP), and/or Fibre Channel over Ethernet (FCoE). Moreover, the one or more LIFs 160-1, 160-2, 160-3, and 160-4 may generally be arranged as logical abstractions of physical and/or virtual ports attached to each of the four cluster nodes and may provide network access points for the four cluster nodes 104-1, 104-2, 104-3, and 104-4. For example, each of the LIFs 160-1, 160-2, 160-3, or 160-4 may correspond to an Internet Protocol (IP) address and may be mapped to a physical network port (e.g., Ethernet port on a NIC and/or HBA) attached to each of the four cluster nodes 104-1, 104-2, 104-3, and 104-4.

The LIFs 160 may be further associated with a virtual storage element such as virtual storage server (Vserver) 120-1 hosted or managed as a distributed interface for access by host 102-1 via one or more NICs and/or HBAs attach the host 102-1. Each virtual storage element may also include one or more initiator groups (iGroup) such as, for example, iGroup 162-1 which may include a collection of unique identifiers to identify which initiators (e.g., NICs or HBAs) attached to hosts 102 may have access to one or more distributed targets such as such as, for example, LUNs 106-1, 106-2, 106-3, and 106-4. The iGroup 162-1 may further be mapped to the one or more LUNs 106-1, 106-2, 106-3, and 106-4, to provide a host such as host 102-1 access to the one or more LUNs 106-1, 106-2, 106-3, and 106-4 via the LIFs 160-1, 160-2, 160-3, and 160-4. It may be appreciated that a cluster node (e.g., cluster nodes 104-1, 104-2, 104-3, and 104-4) may be associated or involved with a virtual storage element (e.g., Vserver 120-1) when the virtual storage element includes a LIF hosted or managed by that cluster node, or when a LUN hosted, owned, and/or managed by that cluster node is mapped to an iGroup in that virtual storage element.

In order to provide increased fault tolerance to hardware and/or software failures between hosts and cluster nodes 104, the host 102-1 may further include redundant software and/or hardware components, such as, one or more NICs or HBAs utilizing Multipath Input/Output (MPIO) component 166-1 to provide host 102-1 with connectivity to the one or more cluster Nodes 104-1, 104-2, 104-3, and 104-4, via one or more network paths 164-1, 164-2, 164-3, and 164-4 to access the one or more LUNs 106-1, 106-2, 106-3, and 106-4 managed by the cluster nodes. It may be appreciated in instances where multiple network paths (e.g., network paths 164-1, 164-2, 164-3, and 164-4) may be available to a single LU such as, for example, LUN 106-1, the LU from the perspective of the host 102-1 utilizing MPIO component 166-1, will appear and/or configured as a single virtual disk accessible by the host 102-1 for read and write operations even though multiple network paths may be available to host 102-1.

To ensure that the host 102-1 uses optimized network paths 164 to access the storage units, such as, for example, LUNs 106 storing their data, the cluster Nodes 104 may provide one or more updates regarding the access states for each of the network paths 164-1, 164-2, 164-3, and 164-4. By way example, to access LUN 106-1, the host 102-1, utilizing MPIO component 166-1 may communicate with LUN 106-1 via network paths 164-1, 164-2, 164-3, 164-4, and LIFs 160-1, 160-2, 160-3, 160-4. Generally, a direct path, which is also the active/optimized (A/O) path, to LUN 106-1 is through cluster node 104-1 via LIF 160-1, because LUN 160-1 is hosted, owned, and/or managed by cluster node 104-1 and stored in a node storage 112-1 that is operatively connected to the cluster node 104-1.

However, in the event that a network path, such as, for example, when network path 164-1 becomes unavailable, one or more hosts 102 may also access LUN 160-1 through other active/not-optimized (A/NO) paths. By way of example, the host 102-1 may access LUN 106-1 through for example, cluster nodes 104-2 and 104-3 via LIF 160-2 and LIF 160-3, respectively. To provide access to the LUN 106-1 to host 102-1 via LIFs 160-2 and 160-3, the cluster node 104-2 and/or 104-3 may communicate with cluster node 104-1 through cluster interconnect 110 network to provide host 102-1 access to LUN 106-1 via LIFs 160-2 and/or 160-3.

Due to the possibility of software and/or hardware failures in the cluster interconnect 110, the cluster nodes 104-1, 104-2, 104-3, and 104-4, may also be configured to notify the host 102-1 as these events are detected. For example, the cluster nodes 104-1, 104-2, 104-3, and 104-4, may implement Asymmetric Logical Unit Assignment (ALUA) multi-pathing protocol, to notify the host 102-1 regarding which LIFs 160 are A/O, A/NO, unavailable (U), and/or not reported (-) for access with respect to one or more LUNs 106 in the cluster 150. Additionally, the ALUA multi-pathing protocol may also enable the host 102-1 to access the LUNs 106 via MPIO component 166-1 using the fastest paths (i.e., A/O paths) when available, and one or more slower paths (i.e., A/NO paths) when no optimized paths are available for a LUN. However, for ALUA access states that are unavailable (U) or not reported (-), the one or more LUNs may be inaccessible from the LIFs having an unavailable (U) or not reported (-) ALUA access state for that LUN. Additionally, in some implementations, LIFs that have an unavailable (U) ALUA access state for a LUN may also not be reported to the host 102-1, such that the LUN is inaccessible from those LIFs.

One such software and/or hardware failure event may include, without limitation, a cluster interconnect 110 network failure between one or more cluster nodes such as, for example, interconnect failure 168 which may separate cluster nodes 104-1, 104-2, 104-3, and 104-4 into two or more partitions (i.e., a partition event). Moreover, a partition may comprise one or more cluster nodes 104 in a cluster 150 that can communicate with each other. However, even though the cluster nodes 104 may communicate with each other, quorum may be required in order to make administrative modifications to the cluster 150. Thus, in order to ensure that administrative modifications may continue for a cluster 150 even when one or more cluster nodes 104 are separated into different partitions due to the interconnect failure 168, the cluster nodes 104 may be configured to first determine whether there is quorum in the cluster 150. It may be appreciated that an interconnect failure 168 as a result of a software and/or hardware fault is merely one example of a partition event, other occurrences that may result in the logical and/or physical disconnection between cluster nodes 104, such as, for example, software and/or hardware maintenance events, may also constitute a partition event and as such, separate the cluster into two or more partitions. The examples are not limited in this context.

Quorum may be generally established when the number of communicatively accessible (i.e., capable of communication) cluster nodes 104 is greater than the number of communicatively inaccessible (i.e., incapable of communication) cluster nodes 104 in the cluster 150 from the perspective of at least one partition. For example, when interconnect failure 168 occurs, the cluster 150 may be separated into a first partition and second partition, where the first partition may comprise cluster nodes 104-1, 104-2, and 104-3 and a second partition may comprise cluster node 104-3. The cluster nodes 104 in the first partition may determine that the number of communicatively accessible (i.e., capable of communication and as such, "in partition") cluster nodes is 3 (i.e., cluster nodes 104-1, 104-2, and 104-3) out of a total of 4 cluster nodes in the cluster 150 and that the number of communicatively inaccessible (i.e., incapable of communication and as such, "out of partition") cluster nodes is 1 (i.e., cluster node 104-4) out of a total of 4 cluster nodes in the cluster 150, the cluster nodes 104-1, 104-2, and 104-3 may then determine that the cluster 150 has quorum because the number of communicatively accessible cluster nodes is greater than the number of communicatively inaccessible cluster nodes.

When number of communicatively accessible cluster nodes 104 is equal to number of communicatively inaccessible cluster nodes 104 in the cluster 150, a cluster node holding epsilon, a tie breaking element, generally assigned to the first cluster node in the cluster 150 (e.g., cluster node 104-1) may be used to determine which partition maintains quorum. As such, a cluster node holding epsilon may add an extra vote to a partition including that cluster node, such that quorum may be maintained in the partition.

Generally, a partition maintaining quorum is the majority partition and remaining partitions may comprise one or more minority partitions. Thus, whether a partition is a majority partition or a minority partition may be determined based at least partially on whether the number of communicatively accessible cluster nodes 104 in that partition is equal to or greater N/2+1; where "N" is the total number of cluster nodes in the cluster 150. If the number of cluster nodes within a partition is equal to or less than N/2, then the cluster nodes 104 are within a minority partition. As previously discussed, the first cluster node in the cluster 150 (e.g., cluster node 104-1) may generally hold epsilon, which may add an additional vote.

By way of example, during an interconnect failure 168, the cluster node 104-4 may become isolated from the other cluster nodes 104 such that cluster nodes 104-1, 104-2, and 104-3 cannot communicate with cluster node 104-4. Cluster nodes 104-1, 104-2, and 104-3 may be determined to be within a majority partition because the total number of cluster nodes is four (N=4) and total number of communicatively accessible cluster nodes is 3, which is equal to 4/2+1. By contrast, cluster node 104-4 may be determined to be within the minority partition.

Figure 2A:
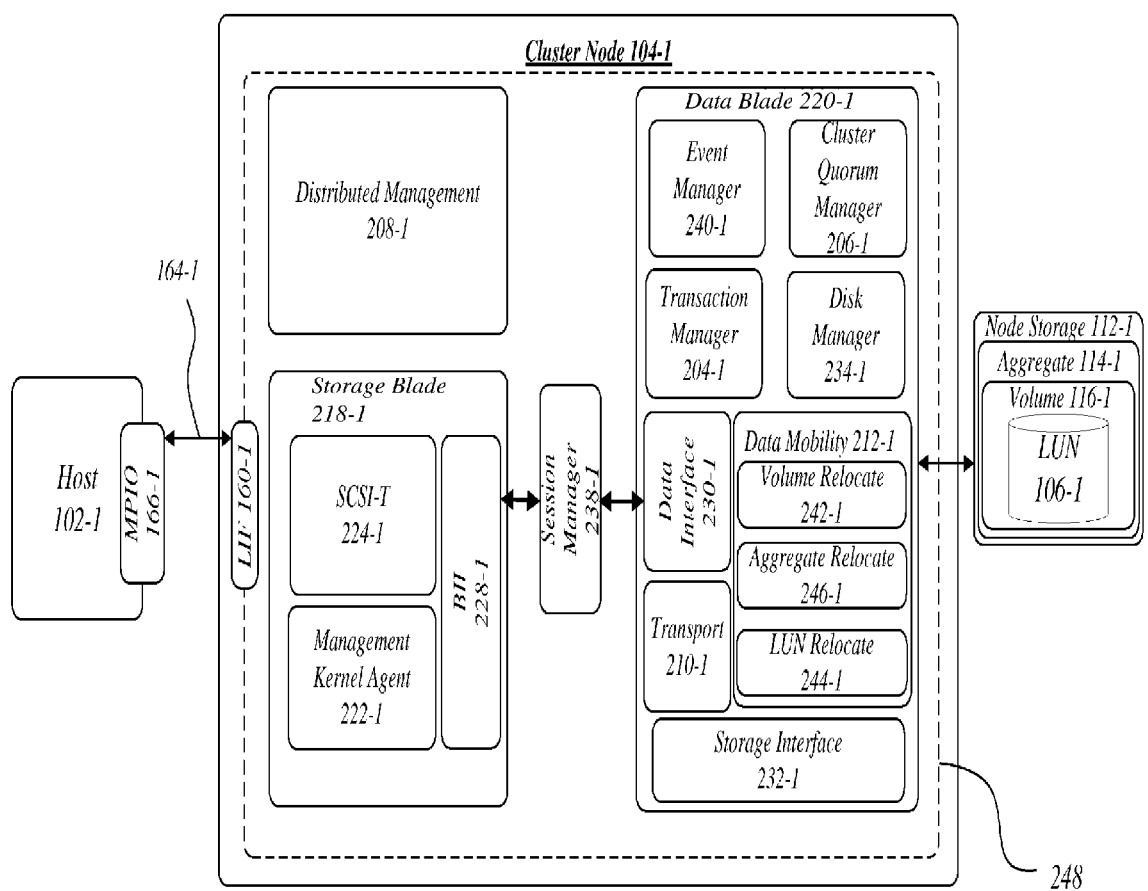
FIG. 2A illustrates an embodiment of a cluster node in the non-disruptive cluster storage system.

FIG. 2A illustrates an embodiment of cluster node 104-1. The cluster node 104-1 may be generally arranged to determine the cluster is separated into one or more partitions, notify one or more cluster nodes to separate into one or more partitions, remove one or more group members from one or more groups, updating one or more access states associated with one or more network paths between a host and one or more storage units, notifying the host that access states of one or more network paths for the one or more local logical units has been updated, providing the one or more access states for the one or more non-local logical units to hosts.

Each cluster node (e.g., cluster node 104-1) in cluster 150 may be configured to execute one or more storage operating systems such as storage operating system 248. An exemplary storage operating system 248 may include, without limitation, DATA ONTAP® from NetApp, Inc. The storage operating system 248 may comprise, among other components, a distributed management component 208-1, one or more Storage Blade components such as, for example, Storage Blade (i.e., SCSI-Blade) component 218-1, one or more Data Blade components such as, for example, the Data Blade (i.e., Data-Blade) component 220-1, and a session manager component 238-1.

The distributed management component 208-1 may be generally arranged to provide and update information between and among cluster nodes 104. Moreover, the distributed management component 208-1 may be generally arranged to provide and update cached configuration information to the management kernel agent component 222-1 or any other component. The cached configuration information may include, without limitation cached Vserver configuration information, cached volume configuration information, cached LU configuration information, initiator to LUN maps which maps one or more initiators to LUNs 106, and iGroups which may include groups of initiators associated with hosts 102. The distributed management component 208-1 may also be generally arranged to provide a management gateway via one or more cluster management LIFs (not shown) in order for cluster administrators to perform management functions such as, for example, security, access control, and auditing functions.

The distributed management component 208-1 may be further arranged to store and provide volume location information which may include, without limitation, a list of volume(s) hosted, owned, and/or managed by each cluster node in the cluster 150 and a volume to Data Blade component map, so that a Storage Blade component (e.g., Storage Blade component 218-1) may determine and communicate with the appropriate Data Blade component (e.g., Data Blade component 220-1) that owns or manages the volume storing a host's (e.g., host 102-1) data or information. The distributed management component 208-1 may also be arranged to store and provide LIF configuration information which may include, without limitation, a LIF to Storage Blade component map such that the distributed management component 208-1 may determine which Storage Blade component (e.g., Storage Blade component 218-1) is currently hosting or managing the associated LIF (e.g., LIF 160-1). The distributed management component 208-1 may be further arranged to store and provide Vserver information which may include, without limitation, a list of Vserver(s) including associated Vserver identifiers (e.g., Vserver names), one or more cluster management LIFs (not shown), or any other information cached by management kernel agent component 222-1 that is not specific to the SAN subsystem of cluster 150.

In one embodiment, the distributed management component 208-1 may be configured to communicate between and among other distributed management components (e.g., distributed management component 208-2 (not shown)) in other cluster nodes (e.g., cluster node 104-2) in order to persistently track and provide the cluster state information of the cluster nodes 104 in cluster 150 to the cluster administrators via one or more user interfaces (not shown) operatively coupled to the distributed management component 208-1. Moreover, the cluster state information may include, without limitation, the partitions currently in the cluster 150, the cluster nodes 104 in each partition, whether a cluster node (e.g., cluster node 104-1) is in the majority or a minority partition, the event triggering a cluster node (e.g., cluster node 104-1) to be in the minority partition, or any other information that may indicate the status and/or state of the cluster 150 to the cluster administrators. The cluster state information may be provided to a cluster administrator via one or more user interfaces (not shown) operatively coupled to the distributed management component 208-1.

In one embodiment, the distributed management component 208-1 may be further configured to communicate between and among other distributed management components (e.g., distributed management component 208-2, 208-3, and 208-4 (not shown)) in other cluster nodes 104, to persistently track transaction information associated with the transaction manager component 204-1 such as, for example, one or more modifications to a resource in the cluster node 150. The transaction information may include, without limitation, a transaction identifier, transaction type (e.g., voting proposal transaction, informative proposal transaction, etc.), the result of the transaction, whether the transaction was committed, discarded, or failed, reason(s) why transaction was discarded or failed, and/or any other information regarding the status of a transaction, including the last committed transaction.

The Storage Blade component 218-1 may be generally arranged to provide one or more hosts 102 such as host 102-1 access to the one or more storage units (e.g., LUN 106-1) managed by the cluster node 104-1 by communicating via the session manager component 238-1 with the respective Data Blade component 220-1 hosting, owning, and/or managing the appropriate LUN 106. Additionally, the Storage Blade component 218-1 may include, among other components, a SCSI-Target (SCSI-T) component 224-1, a management kernel agent (MKA) component 222-1, and a blocks inter-blade interface (BII) component 228-1.

The SCSI-T component 224-1 may be generally arranged to interface with host 102-1 utilizing, for example, the SCSI Target Device Object disclosed in the SCSI Architecture Model from Technical Committee T10 of the Internal Committee for Information Technology Standards. Moreover, the SCSI-T component 224-1 in conjunction with the transport component 210-1 may be generally arranged to provide SCSI-Target services to SCSI initiators, such as initiators attached to host 102-1 and management of one or more SCSI-Ports, which are logical representations of a host (e.g., host 102-1) connecting to a cluster node (e.g., cluster node 104-1) to access one or more storage units (e.g., LUNs 106) (i.e., a connection session). To provide hosts 102 (e.g., host 102-1) with access to their data stored in storage units (e.g., LUNs 106), the SCSI-T component 224-1 may also be generally arranged to interface with one or more Data Blade components 220 (e.g., Data Blade component 220-1) via the Session Manager component 238-1. The SCSI-T component 224-1 may be further arranged to determine, for a given initiator attached to hosts 102, which LUs the initiator can access and at which LUN, based at least partially on the cached configuration information including, without limitation, cached LU configuration information provided or updated by the management kernel agent component 222-1.

In one embodiment, the SCSI-T component 224-1 may be configured to exist and function in any partition, rejoin a majority partition, and maintain one or more network paths to one or more accessible LUs hosted, owned, and/or managed by one or more Data Blade components 220 of one or more cluster nodes 104. In one embodiment, the SCSI-T component 224-1 may be configured to remove one or more LUs from cluster node 104-1 when cluster node 104-1 cannot communicate via the cluster interconnect 110 (i.e., inaccessible) with one or more Data Blade components 220 hosting, owning and/or managing the one or more LUs which may include, without limitation, the Data Blade component 220-1 of cluster node 104-1. In one embodiment, the SCSI-T component 224-1 may also be configured to prevent access to a resource in order to protect data integrity of the resource (i.e., fence) and prevent any data corruption during data mobility events associated with data mobility component 212-1. An exemplary data mobility event may include, without limitation, the relocation of a LUN 106-1 managed by cluster node 104-1 to a different cluster node such as, for example, cluster node 104-2. Resources may include, without limitation, virtual storage elements (e.g., Vserver 120-1), LIFs (e.g., LIF 160-1), storage units such as, for example, aggregates (e.g., aggregate 114-1), volumes (e.g., volume 116-1), LUNs (e.g., LUN 106-1), and/or any other resources that may be shared or distributed between or among cluster nodes 104.

The SCSI-T component 224-1 may be further configured to determine and/or update the ALUA access states for one or more LUNs 106, when the SCSI-T component 224-1 notifies a host (e.g., host 102-1) regarding a path cost change. Moreover, the SCSI-T component 224-1 may determine and/or update ALUA access states in response to joining one or more distributed LU groups during an interconnect recovery and/or data mobility event. the SCSI-T component 224-1 may also determine and/or update ALUA access states in response to leaving one or more distributed LU groups during a interconnect failure and/or data mobility event.

The SCSI-component 224-1 may determine and/or update the ALUA access states based on the quorum status information provided by the cluster quorum manager (CQMGR) component 206-1 via the event manager (EMGR) component 240-1, the volume access state information stored, updated, and/or provided by management kernel agent component 222-1, and/or cached volume location information stored, updated, and/or provided by the BII component 228-1.

The quorum status information may include, without limitation, quorum state information, connectivity state information, and/or operational state information. The quorum state information may include, without limitation, information regarding whether the cluster node is in-quorum (INQ) or out-of-quorum (OOQ). The connectivity state information may include, without limitation, information regarding whether the cluster node is "in partition" (i.e., available) or "out of partition" (i.e., unavailable). The operational state information, which may include, without limitation information regarding whether the cluster node is whether the node is "up" (i.e., operational), "down" (i.e., not operational), or unknown (i.e., partner cluster node is unreachable).

The volume access state information may include, without limitation, a list of volumes in the cluster 150 and volume availability information for each volume included in the list of volumes. The volume availability information may indicate whether each volume in the list of volumes is "available" (i.e., volume is online and accessible within a partition) or "unavailable" (i.e., volume is offline or inaccessible within a partition) to a cluster node (e.g., cluster node 104-1).

The cached volume location information, as previously discussed, may include a list of volume(s) that are hosted, owned, and/or managed by each cluster node in a cluster 150 and/or volume to Data Blade component map. Moreover, the volume to Data Blade component map may indicate which Data Blade component 220 of the one or more cluster nodes 104 may host, own, and/or manage which particular volume(s) of the one or more volumes 116.

In one embodiment, the SCSI-T component 224-1 may be configured to report or indicate the ALUA access state for a local path for a LUN (e.g., LUN 106-1) as the active/optimized (A/O) path. Moreover, a local path is a network path to access a LUN (e.g., LUN 106-1) through a LIF (e.g., LIF 160-1) where a Data Blade component (e.g., Data Blade component 220-1) of a cluster node (e.g., cluster node 104-1) hosts, owns, and/or manages both the LIF (i.e., a local LIF) and the LUN (i.e., a local LUN). For example, a path to access LUN 106-1 via LIF 160-1 where both the LUN 106-1 and LIF 160-1 are hosted, owned, and/or managed by cluster node 104-1 may be considered a local path.

In one embodiment, the SCSI-T component 224-1 may also be configured to report or indicate the ALUA access state for all remote paths or non-local paths as the active/not-optimized (A/NO) path. Moreover, a remote or non-local path is a path through a LIF (e.g., LIF 160-1) to access a LUN (e.g., LUNs 106-2, 106-3, and 106-3) where the LIF is not hosted, owned, and/or managed by the same Data Blade component (e.g., Data Blade component 220-1) of the same cluster node (e.g., cluster node 104-1) as the LUN. For example, a path to access LUN 106-4 that is hosted, owned, and/or managed by Data Blade component (not shown) of cluster node 104-4 via LIFs 106-1, 106-2, and 106-3 that are hosted, owned, and/or managed by cluster nodes 104-1, 104-2, and 104-3, respectively, may be considered remote or non-local paths.

In one embodiment, the SCSI-T component 224-1 of cluster node 104-1 may also be configured to report or indicate the ALUA access state for a remote or non-local path through a LIF (e.g., LIF 160-1) for a LUN (e.g. LUN 106-4) as a not reported (-) path, when the cluster node 104-1 is not in the same partition as a cluster node (e.g., cluster node 104-4) hosting, owning, and/or managing that LUN.

In one embodiment, the SCSI-T component 224-1 of cluster node 104-1 may also be configured to report or indicate the ALUA access state for a non-local or remote path through a remote LIF (e.g., LIF 160-3) for a LUN (e.g., LUN 106-3) as an unavailable (U) path, when the operational state information for the cluster node (e.g., cluster node 104-3) hosting, owning, and/or managing that LUN indicates that the cluster node is "down" (i.e., not operational). Additionally or alternatively, the SCSI-T component 224-1 of cluster node 104-1 may also be configured to report or indicate the ALUA access state for any path through any LIF for a LUN (e.g., LUN 106-3) as an unavailable (U) path, when the operational state information for the cluster node hosting, owning, and/or managing that LUN is "up" and the volume access state information indicates that the volume comprising that LUN is "unavailable."

To determine and/or update the ALUA access states and report the determined and/or updated ALUA access states associated with the one or more local and/or remote paths for a host (e.g., host 102-1) to access data or information stored in the LUNs 106 from the perspective or point of view (POV) of cluster node 104-1, the SCSI-T component 224-1 may utilize the cached volume location information to determine which particular volume(s) of the one or more volumes (e.g., volumes 116-1, 116-2, 116-3, and 116-4) are hosted, owned, and/or managed by the cluster node 104-1 (i.e., local volume(s)) and which particular volume(s) of the one or more volumes are not hosted, owned, and/or managed the cluster node 104-1 (i.e., non-local or remote volume(s)). Furthermore, the SCSI-T component 224-1 may also utilize the access state information to determine whether a cluster node is "up" or "down." The SCSI-T component 224-1 may optionally utilize the volume access state information to determine whether a volume is "available" or "unavailable."

In one exemplary implementation and from the POV of the SCSI-T component 224-1 of cluster node 104-1, when connectivity state information indicates that a cluster node (e.g., cluster node 104-4) is "in partition," operational state information indicates that the cluster node (e.g., cluster node 104-1) is "up", the cached volume location information indicates that a volume managed by that cluster node is local (i.e., volume 116-1 managed by cluster node 104-1) to cluster node 104-1, and the volume access state information indicates that the local volume (e.g., volume 116-1) is "available," then the ALUA access state for a local path to access one or more LUNs (e.g., LUN 106-1) within the local volume (e.g., volume 116-1) via a LIF local to the cluster node 104-1 (e.g., LIF 160-1) may be determined and/or updated to be an A/O path. Additionally, the ALUA access state for one or more remote paths to access one or more LUNs (e.g., LUN 106-1) within the local volume (e.g., volume 116-1) via one or more LIFs remote to the cluster node 104-1 (e.g., LIFs 160-2, 160-3, and 160-4) may be determined and/or updated to be an A/NO path.

Continuing with the above exemplary implementation and from the POV of SCSI-T component 224-1 of cluster node 104-1, when the connectivity state information indicates that a cluster node (e.g., cluster node 104-4) is "in partition," the cached volume location information indicates that a volume managed by that cluster node is remote or non-local (i.e., volume 116-4 managed by cluster node 104-4) to the cluster node 104-1, and the volume access state information indicates that the remote volume is "available," then the ALUA access state for a remote path to access one or more LUNs (e.g., LUN 106-4) within the remote volume (e.g., volume 116-4) via a LIF local to the cluster node 104-1 (e.g., LIF 160-1) may be determined and/or updated to be an A/NO path.

Still continuing with the above exemplary implementation and from the POV of SCSI-T component 224-1 of cluster node 104-1, when connectivity state information indicates that a cluster node (e.g., cluster node 104-3) is "out of partition" and the operational state information indicates that the cluster node (e.g., cluster node 104-3) is "down," then the ALUA access state for a remote path to access one or more LUNs (e.g., LUN 106-1) within a volume (e.g., volume 116-1) local to the cluster node 104-1 via a LIF remote to the cluster node 104-1 may be determined and/or updated to be an unavailable (U) path. Additionally or alternatively, when connectivity state information indicates that a cluster node (e.g., cluster node 104-3) is "in partition," the operational state information indicates that the cluster node is "up" (e.g., cluster node 104-3) and the volume access state information indicates that a volume (e.g., volume 116-3) local to that cluster node (e.g., cluster node 104-3) is "unavailable," then the ALUA access state for any path to access one or more LUNs (e.g., LUN 106-3) within that volume (e.g., volume 116-3) which is "unavailable" via any LIF may be determined and/or updated to be an unavailable (U) path.

Further continuing with the above exemplary implementation and from the POV of SCSI-T component 224-1 of cluster node 104-1, when the connectivity state information indicates that a cluster node (e.g., cluster node 104-4) is "out of partition," the operational state information indicates that the cluster node (e.g., cluster node 104-4) is "up" or "unknown," and the cached volume location information indicates that a volume managed by that cluster node is remote (i.e., volume 116-4 managed by cluster node 104-4) to cluster node 104-1, then the ALUA access state for a remote path to access one or more LUNs (e.g., LUN 106-4) within the volume (e.g., volume 116-4) that is remote to the cluster node 104-1 via one or more LIFs that is local to the cluster node 104-1 (e.g., LIFs 160-1) may be determined and/or updated to be a not reported (-) path. Additionally, the ALUA access state for one or more remote paths to access one or more LUNs (e.g., LUN 106-4) within the volume (e.g., volume 116-4) that is remote to cluster node 104-1 via one or more LIFs that is also remote to the cluster node 104-1 (e.g., LIFs 160-2, and 160-3) may also be determined and/or updated to be a not reported (-) path. Furthermore, the ALUA access state for one or more remote paths to access one or more LUNs (e.g., LUNs 106-1, 106-2, and 106-3) within one or more volumes (e.g., volume 116-1, 116-2, and 116-3) that is remote to the cluster node having the connectivity state information of "out of partition" and operational state information of "up" or "unknown" (e.g., cluster node 104-4) via one or more LIFs that is local to that cluster node (e.g., cluster node 104-4) may be determined and/or updated to be a not reported (-) path.

Stated differently, the SCSI-T component (e.g., SCSI-T component 224-1) of a cluster node (e.g., cluster node 104-1) may be configured to ensure that access to one or more storage units is no longer possible and/or visible to a host (e.g., host 102-1) via a LIF (e.g., LIF 160-1) hosted or managed by that cluster node (e.g., cluster node 104-1), when that cluster node (e.g., cluster node 104-1) is no longer able to access the one or more storage units (e.g., volumes) that are owned, hosted, and/or managed by a different cluster node (e.g., cluster node 104-4) that has become communicatively inaccessible.

It may be appreciated that while the above embodiments and/or implementations were discussed in great detail from the POV of the SCSI-T component 224-1 of cluster node 104-1, the SCSI-T components 224 of other cluster nodes 104 (e.g., SCSI-T components 224-2, 224-3, and 224-4 (not shown) of cluster nodes 104-2, 104-3, and 104-4) may be similarly configured to determine and/or update the ALUA access states from their respective POV in order to notify or report (e.g., notify or report A/O paths, A/NO paths, and in some implementations, unavailable (U) paths) to the one or more MPIO components 166 (MPIO component 166-1) of one or more hosts 102 (e.g., host 102-1) regarding each path and their associated ALUA access states, so that the one or more hosts 102 may continue to access their data or information stored in one or more LUNs 106 in the cluster 150 with substantially reduced disruptions or interruptions.

The management kernel agent component 222-1 may be generally arranged to provide one or more components of the S-Blade component 218-1 with cached configuration information which may include, without limitation, cached volume configuration information and cached Vserver configuration information. The management kernel agent component 222-1 may be further arranged to manage data received from distributed management component 208-1.

In one embodiment the management kernel agent component 222-1 may be configured to prevent changes to a virtual storage element (e.g., a Vserver), when the virtual storage element is split between two partitions. Thus, if a virtual storage element includes or is associated with two LIFs where each LIF is hosted by each cluster node in a different partition, then the management kernel agent component 222-1 may prevent changes to the virtual storage element.

By way of example and with reference to FIG. 1B, the management kernel component 222-1 may prevent a cluster administrator operatively connected to distributed management component 208-1 of the cluster node 104-1 from modifying the Vserver configuration information associated with Vserver 120-1, when the interconnect failure 168 splits the cluster 150 into a majority partition containing the cluster nodes 104-1, 104-2, and 104-3 and a minority partition containing cluster node 104-4. However, it may be appreciated that when a virtual storage element includes all LIFs which are hosted by cluster nodes in a single partition and the cluster nodes are INQ (e.g., majority partition), the management kernel agent component 222-1 may be configured to allow modifications to configuration information (e.g., Vserver configuration information) associated with the virtual storage element. Additionally or alternatively, when a virtual storage element includes all LIFs which are hosted by cluster nodes in a single partition, and the cluster nodes are OOQ (e.g., minority partition), the management kernel agent component 222-1 may be configured to disallow modifications to the configuration information (e.g., Vserver configuration information) associated with the virtual storage element.

In one embodiment, the management kernel agent component 222-1 may be configured to store, provide, and/or update volume access state information comprising a list of volume(s) in the cluster 150 and volume availability information for each volume included in the list of volume(s). It may be appreciated that, in some implementations, the list of volumes for the cluster 150 may be further restricted to include only volumes 116 that comprise at least one LUN (e.g., LUN 106-1) that is mapped to an iGroup (e.g., iGroup 162-1) of a Vserver (e.g., Vserver 120-1) (i.e., a mapped LUN).

In one embodiment, the management kernel agent component 222-1 may be configured to update the volume access state information, when one or more cluster nodes 104 hosting, owning, and/or managing one or more storage units (e.g., aggregates 114 and/or volumes 116) becomes separated from a partition the cluster node 104-1 is in due to a partition event (e.g., an interconnect failure 168). For example, the management kernel agent component 222-1 of cluster node 104-1 in a majority partition may update the volume availability information for volume 116-4 to "unavailable," when cluster node 104-4 hosting, owning, and/or managing the volume 116 transitions from the majority partition to a separate minority partition due to interconnect failure 168. Stated differently, when a cluster node (e.g., cluster node 104-4) hosting, owning, and/or managing a volume (e.g., volume 116-4) transitions or moves outside of an accessing partition (e.g., cluster node 104-4 transitions from one partition such as a majority partition where all cluster nodes in the majority partition may communicatively access the cluster node 104-4, to another partition such as a minority partition where all cluster nodes in the majority partition are no longer able to communicatively access the cluster node 104-4), the management kernel agent component (e.g., management kernel agent component 222-1) of a cluster node (e.g., cluster node 104-1) in the accessing partition (e.g., the majority partition) may update the volume availability information for volume 116-4 to "unavailable" in the accessing partition (e.g., the majority partition).

In one embodiment, the management kernel agent component 222-1 may also be configured to update volume access state information of cluster node 104-1, when one or more storage units (e.g., aggregates 114 and/or volumes 116) hosted, owned, and/or managed by a source cluster node (e.g., cluster node 104-1) is moved or relocated to a destination cluster node that is in a different partition than the source cluster node. For example, the management kernel agent component 222-1 of cluster node 104-1 in a majority partition may update the volume access state information for volume 116-3 to "unavailable," when volume 116-3 is hosted, owned, and/or managed by cluster node 104-3 also in the majority partition is moved or relocated via a data mobility event to cluster node 104-4 during an interconnect failure 168 that separated the cluster 150 into a majority partition comprising at least the cluster nodes 104-1, 104-2, and 104-3 and a minority partition comprising the cluster node 104-4. Stated differently, when a volume (e.g., volume 116-3) moves or relocates outside of an accessing partition (e.g., volume 116-3 moves or relocates from one partition such as a majority partition where all cluster nodes in the majority partition may communicatively access the volume 116-3, which may be hosted, owned, and/or managed by cluster node 104-3, to another partition such as a minority partition where all cluster nodes in the majority partition are no longer able to communicatively access the volume 116-3), the management kernel agent component (e.g., management kernel agent component 222-1) of a cluster node (e.g., cluster node 104-1) in the accessing partition (e.g., the majority partition) may update the volume availability information for volume 116-3 to "unavailable" in the accessing partition (e.g., the majority partition).

To protect data integrity during a data mobility event, the management kernel agent component 222-1, in one embodiment, may be configured to receive one or more notifications regarding the beginning and/or completion of a data mobility event from the disk manager (DMGR) component 234-1, when the cluster node 104-1 is the source cluster node. Additionally, the management kernel agent component 222-1 may be configured to receive pre-relocation and/or post-relocation information from the disk manager component 234-1 and notify the other cluster nodes 104 in the same partition as cluster node 104-1 the beginning and/or completion of a data mobility event and the received relocation information. The pre-relocation and/or post-relocation information may include, without limitation, a list of storage units (e.g., aggregates, volumes, and/or LUNs) that are currently being moved or has been moved, as a result of the data mobility event, an unique identifier associated with the Data Blade component (e.g., Data Blade component 220-3 (not shown)) of a source cluster node (e.g., cluster node 104-3), and an unique identifier associated with the Data Blade component (e.g., Data Blade component 220-4 (not shown)) of a destination cluster node (e.g., cluster node 104-4).

The BII component 228-1 may be generally arranged to provide SCSI target data input/output and SCSI LU metadata functions. The BIT component 228-1 may also be arranged to interface with the Data Blade component 220-1 or other Data Blade components 220 in other cluster nodes 104 via one or more intra-process and/or inter-process communication mechanisms such as, for example, SpinNP protocol.

In one embodiment, the BII component 228-1 may be configured to interface and communicate with SCSI-T components (e.g., SCSI-T component 224-1) and notify the SCSI-T components to fence access to one or more storage units (e.g., LUNs 106) hosted, owned, and/or managed by one or more cluster nodes 104 located in a different partition than cluster node 104-1 in order to protect data integrity of the data stored in the storage units (e.g., LUNs 106).

In one embodiment, the BII component 228-1 may be further configured to store, update, and/or provide cached volume location information which may include, without limitation, a cached list of volume(s) that are hosted, owned, and/or managed by a cluster node, and cached volume to Data Blade component 220-1 map, so that a Storage Blade component (e.g., Storage Blade component 218-1) may determine which Data Blade component (e.g., Data Blade component 220-1) hosts, owns, and/or manages which volume and/or LUN, and provide the cached volume location information when requested.

The session manager component 238-1 may generally be arranged to communicate between the Storage Blade component 218-1 and Data Blade component 220-1 via one or more sessions established between the Storage Blade component 218-1 and Data Blade component 220-1. The one or more sessions may be utilized to provide data access (e.g., input/output) operations between the Storage Blade component 218-1 and Data Blade component 220-1. The session manager component 238-1 may also be arranged to interface with other session manager components 238 (e.g., session manager component 238-2 (not shown)) in other cluster nodes 104 (e.g., cluster node 104-2) in order to establish one or more sessions and provide data access operations with other Data Blade components 220 (e.g., Data Blade component 220-2 (not shown)) of other cluster nodes 104 (e.g., cluster node 104-2) such that hosts 102 can access one or more storage units (e.g., LUNs 106) via one or more LIFs 160s regardless of which cluster node 104 is hosting or managing the storage units (e.g., LUNs 106). For example, the host 102-1 may access data contained in LUN 106-2 via LIF 160-1 hosted by cluster node 104-1, even though LUN 106-2 is hosted, owned, and/or managed by cluster node 104-2.

The Data Blade component 220-1 may be generally arranged to host, own, and/or manage one or more storage units such as, for example, aggregates 114, volumes 116, and/or LUNs 106 stored in node storages 112 operatively connected to one or more cluster nodes 104. The Data Blade component 220-1 may be further arranged to process data access requests from the Storage Blade component 218-1 of Cluster Node 104-1 or Storage Blade component (e.g., Storage Blade component 218-2 (not shown)) of a different cluster node (e.g., cluster node 104-2). Moreover, the Data Blade component 208-1 may include, among other components, event manager (EMGR) component 240-1, cluster quorum manager (CQMGR) component 206-1, transaction manager (TMGR) component 204-1, disk manager (DMGR) component 234-1, a data interface component 230-1, a transport component 210-1, a data mobility (DM) component 212-1, which may include, without limitation, a LUN relocate (LR) component 244-1, an aggregate relocate (AR) component 246-1, and a volume relocate (VR) component 242-1.

The event manager component 240-1 may be generally arranged to receive event information associated with one or more components (e.g., cluster quorum manager component 206-1) within a cluster node (e.g., cluster node 104-1) and broadcast and/or distribute the event information to one or more components within a cluster node which may include, without limitation, management kernel agent component 222-1, transaction manager component 204-1, cluster quorum manager component 206-1, and/or SCSI-T component 224-1. For example, in one embodiment, the event manager component 240-1 may be configured to provide quorum status information received from the cluster quorum manager component 206-1 to SCSI-T component 224-1.

The cluster quorum manager component 206-1 may be generally arranged to determine whether to assume mastership role in a cluster (e.g., cluster 150) or a partition of the cluster based at least partially on the cluster node identifier associated with each cluster node and/or the existence of another cluster quorum manager component (e.g., cluster quorum manager component 206-4 (not shown) of cluster node 104-4) assuming the mastership role. Moreover, the cluster quorum manager component 206-1 may assume mastership role in the cluster 150 or a partition of the cluster 150 and become a master cluster quorum manager component, when there are no other cluster quorum manager component assuming a mastership role in that partition. Additionally or alternatively, the cluster quorum manager component 206-1 may become a master cluster quorum manager component, when the cluster quorum manager component 206-1 failed to establish or maintain one or more handshakes via a handshaking mechanism with an existing master cluster quorum manager component in the cluster 150.

As a master cluster quorum manager component in a partition of a cluster 150, the master cluster quorum manager component such as, for example, cluster quorum manager component 206-1 may be arranged to prove the cluster 150 by testing the connection path to another cluster node via the handshaking mechanism in order to determine which cluster nodes are communicatively accessible and operational (i.e., responsive or active) and which cluster nodes are communicatively inaccessible or not operational (i.e., unresponsive or inactive). Moreover, to prove the cluster 150 via the handshaking mechanism, the cluster quorum manager component 206-1 may be arranged to propose to the transaction manager 204-1 one or more heartbeat signals to be sent to cluster quorum manager components 206 (e.g., cluster quorum manager components 206-2, 206-3, and 206-4 (not shown)) of other cluster nodes 104 (e.g., cluster nodes 104-2, 104-3, and 104-4). Based at least partially on number and/or frequency of the one or more heartbeat response signals received from the cluster quorum manager components of other cluster nodes, the cluster quorum manager component 206-1 may be arranged to determine quorum status information of one or more cluster nodes 104.

In one embodiment, the cluster quorum manager component 206-1 may be configured to communicate with one or more cluster quorum manager components 206 of one or more cluster nodes 104 to determine quorum status information, which may include, without limitation, quorum state information, connectivity state information, and/or operational state information for one or more cluster nodes 104 in the cluster 150. With respect to the quorum state information, the cluster quorum manager component 206-1 of cluster node 104-1 may be configured to determine whether the number of responsive or active cluster nodes 104 in a partition that includes cluster node 104-1 is greater than the number of unresponsive or inactive cluster nodes 104 in the cluster 150. In instances when there is a tie (i.e., the number of responsive or active cluster nodes is equal to number of unresponsive or inactive cluster nodes), the cluster quorum manager component 206-1 may further be configured to determine whether the partition has a cluster node holding epsilon. If number of active cluster nodes 104 in a partition is greater than the number of inactive cluster nodes 104 in the cluster 150, then cluster nodes 104 in that partition are INQ (i.e., a majority partition) and cluster nodes 104 outside that partition are considered to be OOQ (i.e., one or more minority partitions).

With respect to the connectivity state information, the cluster quorum manager component 206-1 of cluster node 104-1 may be configured to determine whether a cluster node such as, for example, cluster node 104-3 is able to communicate with the cluster node 104-1 (e.g., responding to one or more heartbeat signals) in a partition that includes cluster node 104-1. If the cluster node such as cluster node 104-3 is able to communicate with cluster node 104-1 in the partition, then the connectivity state for cluster node 104-3 is "in partition" (i.e., available), otherwise the cluster node is "out of partition" (i.e., unavailable). It may be appreciated that in some instances, a cluster node may be both OOQ and "in partition" because that cluster node may be in a minority partition and is able to communicate with another cluster node in the same minority partition.

With respect to operational state information, the cluster quorum manager component 206-1 may be configured to receive operational state information for a cluster node in one or more heartbeat response signals transmitted by a high availability partner cluster node of that cluster node in a high availability pair 152. Moreover, the heartbeat response signal may include, without limitation, the cluster node identifier (i.e., cluster node name and/or number) and/or operational state information of a partner cluster node.

By way of example, if the high availability partner cluster node such as, for example, cluster node 104-3 is able to communicate with its partner cluster node 104-4 via cluster interconnect 110 or high availability interconnect 156-2 and determine that its partner cluster node 104-4 is functional, then the operational state information received from high availability partner cluster node 104-3 may indicate its partner cluster node 104-4 is "up" (i.e., operational). If the high availability partner cluster node 104-3 is able to communicate and determine that its partner cluster node 104-4 is not functional (e.g., a panic condition has occurred), then the operational state information received from cluster node 104-3 may indicate that the cluster node 104-4 is "down" (i.e., not operational). If the cluster node 104-3 is unable to communicate with cluster node 104-4, then the operational state information received from cluster node 104-3 may indicate that the cluster node 104-4 is "unknown" (i.e., partner cluster node is unreachable). It may be appreciated that based on the quorum status information, one or more components receiving the quorum status information may determine whether a cluster node is OOQ and "out of partition" because the cluster node is powered down (e.g., the cluster node quorum status information is OOQ, "out of partition," and "down") or whether the cluster node is OOQ and "out of partition" because there is a communication failure (e.g., the cluster node quorum status information is OOQ, "out of partition," and "up").

The transaction manager component 204-1 may be generally arranged to manage and coordinate access, actions, and/or modifications over a set of resources shared and distributed across the cluster 150. The transaction manager component 204-1 may also be generally arranged to enable access, actions, and/or modifications of shared states among a set of collaborating components of one or more cluster nodes 104 distributed across the cluster 150.

To coordinate access, actions, and/or modifications of resources and/or shared states between and among cluster nodes, the transaction manager component 204-1 may be generally arranged to create one or more distributed groups for the management of one or more resources and/or shared states where components of one or more cluster nodes 104 may join each group as group members to perform access, actions, and/or modifications to the one or more resources and/or shared states. This ensures that access, actions, and/or modifications through a transaction associated with the transaction manager component 204-1 will occur atomically (i.e., complete in entirety or not at all). Additionally, this also allows collaborating group members to indicate their ability or lack thereof to participate in access, actions, and/or modifications, and preserves and ensures that the integrity of all collaboratively managed information is sustained across the cluster 150.

The transaction manager component 204-1 of cluster node 104-1 may also be arranged to communicate with one or more transaction manager components 204 (e.g., transaction manager components 204-2, 204-3, and 204-4 (not shown)) of one or more (e.g., cluster nodes 104-2, 104-3, and 104-4) in one or more cluster nodes 104 such that one or more components of one or more cluster nodes 104 may view, create, join, and/or leave one or more distributed groups. Additionally, the one or more components may also propose one or more transactions to perform access, actions, and/or modifications of one or more shared resources and/or shared states.

To effectuate access, actions, and/or modifications, the transaction manager component 204-1 of cluster node 104-1 may be further arranged to communicate with one or more transaction manager components 204 (e.g., transaction manager component 204-2, 204-3, and 204-4 (not shown)) of one or more cluster nodes 104 (e.g., cluster nodes 104-2, 104-3, and 104-4) to receive one or more proposed transactions and/or propose one or more transactions to the group members of one or more groups. The group member, whom a proposed transaction originates, may be designated as the proposal originator (PO). In addition to selecting the proposed transaction (i.e., access, actions, and/or modification to be performed), the PO may also select the proposed transaction type, which may include a voting proposal transaction or an informative proposal transaction.

In a voting proposal transaction, one or more group members may vote based at least partially on a voting algorithm selected by the PO. Moreover, each voting proposal transaction may be committed or discarded based at least partially on the votes (i.e., acceptance or rejection) from each group member and the voting method selected by a PO. When a voting proposal transaction is committed, each group member may update one or more resources and/or shared states managed by the distributed group. When a proposed transaction is discarded, each group member abstains from performing access, actions, and/or modifications to the one or more resources and/or shared states managed by the distributed group.

In an informative proposal transaction, one or more group members of a group as a PO of the informative proposal transaction may distribute information to the one or more group members. The information may include, for example, quorum status information, workspace information associated with a distributed group, mount information, or any other information that the PO may distribute to one or more group members.

The data mobility component 212-1 may be generally arranged to manage and/or provide data mobility events and event notifications (e.g., pre-relocation or PRE-COMMIT notifications, post-relocation or POST-COMMIT notifications, etc.) such as, for example, the relocation of one or more storage units such as, for example, aggregates 114, volumes 116, and/or LUNs 106. Moreover, the data mobility component 212-1 may include, without limitation, an aggregate relocate component 246-1, a volume relocate component 242-1, and a LUN relocate component 244-1. The aggregate relocate component 246-1 may generally be arranged to move an aggregate, that was hosted, owned, and/or managed by a source cluster node to a destination cluster node such that the destination cluster node will host, or undertake ownership and/or management of the aggregate. The volume relocate component 242-1 may be generally arranged to move a volume from a source aggregate to a destination aggregate where the source aggregate and destination aggregate may be hosted, owned, or managed by the same cluster node or by different cluster nodes. The LUN relocate component 244-1 may generally be arranged to move a LUN from a source volume to a destination volume, where the source volume and the destination volume may be located within an aggregate hosted, owned, and/or managed by the same cluster node or within two separate aggregates where each aggregate of two separate aggregates is hosted, owned and/or managed by a different cluster node.

To protect data integrity of data stored in an aggregate, a volume, and/or a LUN during a data mobility event from a source cluster node in a first partition (e.g., a majority partition) to a destination cluster node in a second partition (e.g., a minority partition) during an interconnect failure 168 of the cluster 150, the data mobility component 212-1 (e.g., aggregate relocate component 246-1, LUN relocate component 244-1, or volume relocate component 242-1) of the source cluster node in the first partition may be configured to notify one or more components of the source cluster node regarding the beginning of the data mobility event and the completion of the data mobility event. Additionally, the one or more components of the source cluster node may further notify one or more components of other cluster nodes in the same partition as the source cluster node regarding the beginning of the data mobility event and the completion of the data mobility event.

In one embodiment, the aggregate relocate component 246-1 of the cluster node 104-1 may be configured to notify one or more components of the cluster node 104-1 such as, for example, the disk manager component 234-1, when an aggregate begins and/or completes its relocation from cluster node 104-1 to a new cluster node. In one embodiment, the volume relocate component 242-1 of the cluster node 104-1 may be also configured to notify one or more components of the cluster node 104-1 such as, for example, the disk manager component 234-1, when a volume begins and/or completes relocation from aggregate 114-1 of cluster node 104-1 to a different aggregate managed by a different cluster node. In one embodiment, the LUN relocate component 244-1 of the cluster node 104-1 may be also configured to notify one or more components of the cluster node 104-1 such as, for example, the disk manager component 234-1, when a LUN begins and/or completes relocation from a volume 116-1 of cluster node 104-1 to a different volume managed by a different cluster node. In one embodiment, the LUN relocate component 244-1 of the cluster node 104-1 may be also configured to notify one or more components of the cluster node 104-1 such as, for example, the disk manager component 234-1, when a LUN begins and/or complete relocation from a volume 116-1 of cluster node 104-1 to a different volume managed by the same cluster node, such as, for example, cluster node 104-1.

The disk manager component 234-1 may generally be arranged to manage and/or perform LUN (e.g., a Network Appliance® vDisk in a cluster 150) related management and configuration actions and/or operations (e.g., LUN create) in response to one or more requests from the distributed management component 208-1. The disk manager component 234-1 may also be generally arranged to maintain LUN-related internal structures within a volume. The disk manager component 234-1 may be further arranged to store data streams that constitute the host addressable portion of a LUN, LUN related configuration information and metadata utilized by the distributed management component 234-1 and/or SCSI-T component 224-1.

In one embodiment, the disk manager component 234-1 may be configured to receive one or more notifications indicating the beginning and/or completion of a data mobility event (e.g., aggregate relocation, volume relocation, and/or LUN relocation event) from data mobility component 212-1 (e.g., aggregate relocate component 246-1, volume relocate component 242-1, and/or LUN relocate component 244-1) when cluster node 104-1 is the source cluster node in the data mobility event. In response to the one or more notifications indicating the beginning and/or completion of an aggregate relocation, volume relocation, and/or LUN relocation, the disk manager component 234-1 may be configured to notify a one or more components such as, for example, the management kernel agent component 222-1 that the aggregate, volume, and/or LUN is beginning and/or has completed the relocation. Additionally, disk manager component 234-1 may be further configured to provide pre-relocation and/or post-relocation information, to the one or more components such as, for example the management kernel agent component 222-1. The pre-relocation and/or post-relocation information may include a list of storage units (e.g., aggregates, volumes, and/or LUNs) that are currently being moved or has been moved, as a result of the data mobility event, an identifier associated with the Data Blade component (e.g., Data Blade component 220-3 (not shown)) of the source cluster node (e.g., cluster node 104-3), and/or an identifier associated with the Data Blade component (e.g., Data Blade component 220-4 (not shown)) of the destination cluster node 104-4 (e.g., cluster node 104-4).

The data interface component 230-1 may be generally arranged to interface with the Storage Blade component 218-1 or other Storage Blade components 218 in one or more cluster nodes 104 via one or more intra-process and/or inter-process communication mechanisms such as, for example, SpinNP protocol in order to provide data access to LUN 106-1 hosted, owned, and/or managed by the Data Blade component 220-1. To ensure that the data interface component 230-1 interfaces with the appropriate Storage Blade component 218-1, each data interface component (e.g., data interface component 230-1) of a Data Blade component (e.g., Data Blade component 220-1) may also be registered with the session manager component (e.g., session manager component 238-1) of their respective cluster nodes. The data interface component 230-1 may be further arranged to translate the data access received from one or more Storage Blade components 218 to a storage interface protocol utilized by the storage interface component 232-1 to perform one or more file input/output operations.

The transport component 210-1 may be generally arranged to provide SCSI transport using FCP, iSCSI, or FCoE protocols and manage one or more LIFs (e.g., LIF 160-1) to interface with hosts 102. Moreover, to provide data access to the initiators attached to host 102-1, the transport component 210-1 may be further arranged to establish a connection with the hosts 102, and communicate with the SCSI-T component 224-1 in order to provide the established connection to the SCSI-T component 224-1 as a SCSI-Port.

The storage interface component 232-1 may be generally arranged to receive one or more file input/output operations from the data interface component 230-1 and provide data access to the storage units (e.g., aggregates, volumes, and/or LUNs). Moreover, the storage interface component 232-1 may be arranged to provide read and write functionality to one or more physical disks utilizing one or more file layouts such as, for example, the Write Anywhere File Layout (WAFL) that provides read and write functionality to data in one or more data blocks.

Figure 2B:
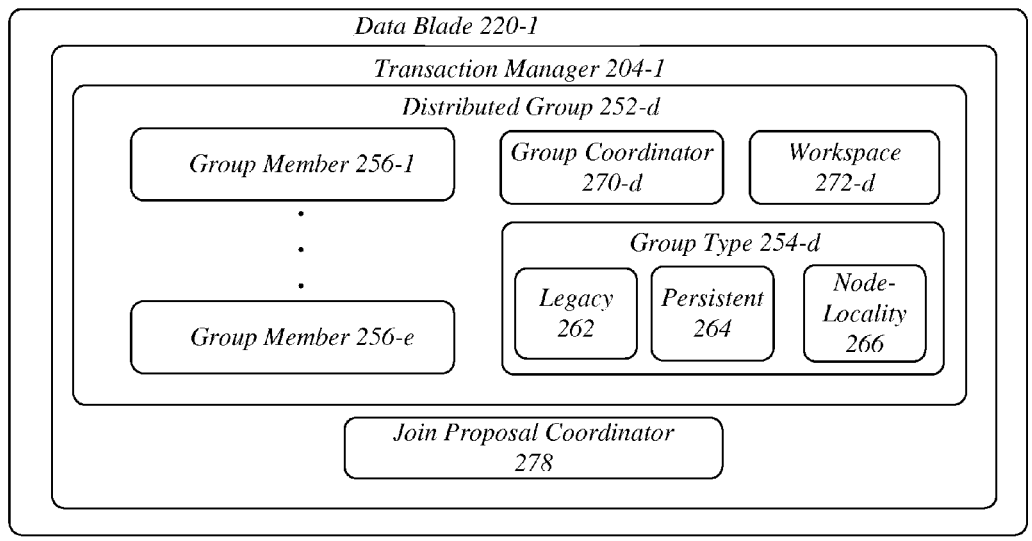
FIG. 2B illustrates an embodiment of a transaction manager component in a cluster node.

FIG. 2B illustrates an embodiment of the transaction manager component 204-1. As previously discussed, the transaction manager component 204-1 may be generally arranged to manage one or more resources and/or shared states utilizing one or more distributed groups 252-d and may also be arranged to manage a join proposal coordinator (JPC) 278. Each distributed group may include, without limitation, a group coordinator (GC) 270-d, and a workspace 272-d. Each workspace may be associated with its respective distributed group 282 and may be shared between and among one or more group members 256-e, which are logical abstractions of one or more components in one or more cluster nodes 104. From an implementation perspective, the one or more components may implement one or more interfaces having one or more methods (e.g., propose, accept, reject, join, leave, etc.) that may be required for group members 256 to participate in one or more transactions in the one or more distributed groups 252.

The JPC 278 may be generally be arranged to facilitate the join and leave of one or more group members 256 into the one or more distributed groups 252, and store a list of one or more distributed groups 252 in the cluster 150 so that one or more components of one or more cluster nodes 104 may join the one or more distributed groups 252. Generally, each partition of a cluster 150 may include a JPC 278, which is hosted or managed by the first cluster node (e.g., cluster node 104-1) in the partition of cluster 150. However, during an interconnect failure (e.g., interconnect failure 168), the cluster 150 may be separated into two or more partitions such as, for example, one majority partition and one or more minority partitions, and each of the one or more minority partition may not initially include a JPC 278.

To ensure that each partition includes a JPC 278 after an interconnect failure, in one embodiment, the transaction manager component (e.g., transaction manager component 204-4 (not shown)) of a cluster node (e.g., cluster node 104-4) may be configured to create and host a new JPC 278 to facilitate join and leave of one or more components of one or more cluster nodes 104 as one or more group members 256 in a minority partition based on the cluster node identifier associated with each cluster node. In instances when two or more cluster nodes 104 are in a minority partition, the cluster node having the lowest cluster node identifier may be configured to create and host a new JPC 278.

The GC 270 may generally be arranged to coordinate transactions (e.g., voting proposal transactions) in each distributed group 252 and facilitate in proposing new transactions to the group members 256 of each distributed group 252 and in the voting process in accordance with a voting method selected by the PO. Generally, the GC 270 for a distributed group 252, may be load balanced and managed or hosted between and among one or more cluster nodes 104 participating in the distributed group 252 via one or more group members 256. However, if a cluster node hosting or managing the GC 270 becomes communicatively inaccessible (e.g., transitions or moves to a separate partition), a new GC 270 may be selected such that the GC 270 may be managed or hosted by another cluster node participating in the distributed group 252 via a group member.

During an interconnect failure (e.g., interconnect failure 168), one or more group members 256, may become unresponsive because the one or more group members 256 represented by one or more components of a cluster node that may no longer be communicatively accessible due to the interconnect failure (e.g., in a separate partition). Accordingly, in one embodiment, the GC 270 of each distributed group 252 may be configured to evict one or more group members 256 representing one or more components of a cluster node that is no longer communicatively accessible because it is in a separate partition or is OOQ.

To ensure that at least some resources and/or shared states managed by the transaction manager component 204-1 may continue to be shared and/or managed during a partition event (e.g., interconnect failure 168) in cluster 150 that separates the cluster 150 into two or more partitions (e.g., a majority partition and one or more minority partitions), each distributed group may be configured to include a group type attribute 254-d. Moreover, the group type attribute 254-d may ensure that at least some distributed groups may continue to exist in one or more partitions. In one embodiment, the group type attribute 254 for a distributed group 252 may include, without limitation, a legacy type attribute 262, a persistent type attribute 264, or node-locality (i.e., super member) type attribute 266.

With respect to the legacy type attribute 262, in one embodiment, assuming cluster node 104-1 is in a minority partition, the transaction manager component 204-1, via the GC of a distributed group, may be configured to remove or evict all group members 256 from the distributed group 252, when the cluster 150 is separated into one majority partition and one or more minority partitions and the distributed group 252 has a legacy type attribute 262. Additionally, in another embodiment, the transaction manager component 204-1 may be configured to remove and/or dissolve the empty distributed group.

With respect to the persistent type attribute 264, in one embodiment, the transaction manager component 204-1, via the GC 270 of a distributed group 252 having a persistent type attribute 264, may be configured to remove or evict one or more group members 256 that are representative of one or more components of one or more cluster nodes 104, when the one or more cluster nodes 104 are no longer in the same partition of the GC of distributed group 252 with a persistent type attribute 264. However, unlike legacy group type attribute 262, the transaction manager component 204-1 may be configured to retain or persist the distributed group 252 with a persistent type attribute 264 regardless of the partition state of the cluster 150. Additionally, when a partition includes a distributed group 252 with a persistent type attribute 264, and a GC 270 does not exist in that partition for that distributed group 252 with a persistent type attribute 264, then a new GC 270 may be created, load balanced, and managed or hosted by a cluster node (e.g., created by a transaction manager component of the cluster node) in that partition to support the management of one or more transactions in the distributed group 252 with the persistent type attribute 264.

By way of example, the transaction manager component 204-1 of cluster node 104-1, via GC 270 (hosted or managed by cluster node 104-1) of distributed Vserver group managing Vserver 120-1, may be configured to remove or evict one or more group members 256 representing the management kernel agent component 222-4 of cluster node 104-4, when the cluster node 104-4 is no longer in the same partition as cluster node 104-1. Additionally, when the cluster node 104-4 is no longer in the same partition as cluster node 104-1 and a GC 270 does not exist in the same partition as cluster node 104-4 for the distributed Vserver group managing Vserver 120-1, then the transaction manager component 204-4 of cluster node 104-4 may be configured to create and manage or host a GC 270 for the distributed Vserver group managing Vserver 120-1 in the same partition as cluster node 104-4.

With respect to the node-locality type attribute 266, in one embodiment, the transaction manager component 204-1, via the GC 270 of a distributed group with the node-locality type attribute 266, may be configured to remove or evict one or more group members 256 that are representative of one or more components of one or more cluster nodes 104, when the one or more cluster nodes 104 are no longer in the same partition as the resource and/or shared state managed by the distributed group having the node-locality type attribute 266. Additionally, when a partition includes a distributed group 252 with a node-locality type attribute 266, and a GC 270 does not exist in that partition for that distributed group 252 having a node-locality type attribute 266, then a new GC 270 may be created, load balanced, and managed or hosted by a cluster node (e.g., created by a transaction manager component of the cluster node) in that partition to support the management of one or more transactions in the distributed group 252 with the node-locality type attribute 266.

By way of example, the transaction manager component 204-1 of cluster node 104-1, via GC 270 of distributed volume group having the node-locality type attribute 266 and managing volume 116-1 that is hosted, owned and/or managed by cluster node 104-1, may be configured to remove or evict a group member representing the management kernel agent component 222-4 of cluster node 104-4 and consequently, cause the group member to leave the distributed volume group managing volume 116-1, when cluster node 104-4 is no longer in the same partition as cluster node 104-1 (e.g., cluster node 104-1 is INQ and in a majority partition while cluster node 104-4 is OOQ and in a minority partition). Additionally, when the cluster node 104-4 is no longer in the same partition as cluster node 104-1 and a GC 270 does not exist in the same partition as cluster node 104-4 for the distributed volume group having the node locality type attribute 266 managing volume 116-1, then the transaction manager component 204-4 of cluster node 104-4 may be configured to create and manage or host a GC 270 for the distributed volume group managing volume 116-4 in the same partition as cluster node 104-4.

It may be appreciated that one or more group members 256 of a distributed group having the node-locality type attribute 266 that is managing a resource and/or shared state may also leave the distributed group, when the resource and/or shared state managed by the distributed group 252 having the node-locality type attribute 266 is no longer in the same partition as the group members 256 representing one or more components of one or more cluster nodes 104. Additionally, during and/or after the one or more group members 256 leave the distributed group, the workspace 272 associated with the distributed group may be purged by the group members 256 that left the distributed group, so that no configuration information may be accessible and/or stored by the group members 256 that left the distributed group.

By way of example, a group member of a distributed volume group managing volume 116-4 (e.g., the group member representing management kernel agent component 222-1 of cluster node 104-1) may leave that distributed volume group having node-locality type attribute 266 managing volume 116-4 that is managed by cluster node 104-4, when the cluster node 104-4 is no longer in the same partition as cluster node 104-1 (e.g., cluster node 104-1 is INQ and in a majority partition while cluster node 104-4 is OOQ and in a minority partition). Further, the group member that left the distributed volume group managing volume 116-4 may purge the workspace 272 associated with the distributed volume group, that no configuration information may be accessible and/or stored by the group member that left the distributed volume group managing volume 116-4.

In one embodiment, the transaction manager component 204-1 via the GC of a distributed group 252, may be further configured to reject or fail one or more proposed transactions, when the resource and/or shared state managed by that distributed group 252 becomes unavailable and the distributed group 252 has a node-locality type attribute 266. Furthermore, the transaction manager component 240-1 may be configured to remove and/or dissolve any empty distributed group with a node-locality type attribute 266. It may be appreciated that the resource and/or shared state may become unavailable, when the resource and/or shared state is hosted, owned, and/or managed by a cluster node (i.e., a resource that is local to the cluster node such as, for example, volumes 116 and/or LUNs 106) that has been placed in a partition separate from the group members (e.g., in the minority partition when group members are in a majority partition) or when a resource and/or shared state is local to or hosted or managed by a cluster node has been relocated to a new cluster node in a partition separate from the group members during a data mobility event.

To facilitate voting proposal transactions, the GC 270 may generally be arranged to receive one or more voting proposal transactions from a PO and distributes the voting proposal transaction to the one or more group members 256 for their acceptance or rejection of the proposed transaction. In one embodiment, the GC 270 after receiving one or more responses from one or more group members 256, the GC 270 may be configured to determine whether to commit or discard the transaction based at least partially on a voting method selected by the PO. Moreover, the appropriate voting method for a voting proposal transaction ensures that access, actions, and/or modifications can be safely committed without causing one or more components of one or more nodes 104 to be in inconsistent shared states during an interconnect failure. Accordingly, in one embodiment, the voting method may be a legacy voting method, where all group members must accept the voting proposal transaction in order for the voting proposal transaction to be committed. Otherwise, the voting proposal transaction is discarded.

In one embodiment, voting method may be a required membership voting method. In the required membership voting method, the PO (e.g., management kernel agent 222-1) may be configured to provide a list of group members 256 that may be required participate in the voting proposal transaction. If one of the group members 256 in the list of group members 256 is not present in the distributed group 252 at the time of the voting proposal transaction then the GC 270 may be configured to fail the voting proposal transaction and notify the PO that the voting proposal transaction has failed.

By way of example, a required membership voting method may be used to ensure that a group member that hosts, owns, and/or manages a resource will participate in the voting proposal transaction that may modify that resource. When a PO proposes a voting proposal transaction under required member voting, the PO may also provide list of group members 256 which may include a group member that hosts, owns, and/or manages that resource (i.e., a super member (SM)). This inclusion of the SM in the list of the group members ensures that the SM, which manages that resource, will participate in any access, actions, and/or modifications to that resource.

In one embodiment, the voting method may be a SM voting method. In the SM voting method, the PO may not be aware of the group member(s) that may be required to participate in the voting proposal transaction perform access, actions, and/or modification to a resource. In such instances, the PO may be configured to notify the transaction manager component 204-1 that a group member managing that resource, i.e., a SM is required to participate in the voting proposal transaction. Each group member including the PO may be configured to notify their respective transaction manager components whether they are a SM for that resource. The GC 270 may then be configured to fail the voting proposal transaction when the GC 270 does not receive at least one vote response from a SM for that resource.

By way of example, a SM voting method may be used to ensure that the group member that hosts, owns, and/or manages a resource will participate in the voting proposal transaction that may modify that resource. However, unlike required membership voting method, the PO may not know the SM for that resource because that resource may have been relocated to a different cluster node in a separate partition during a data mobility event and an interconnect failure. Moreover, this may occur in instances when an interconnect failure occurs between high availability pair of cluster nodes 104-1, 104-2 and 104-3, 104-4 while a data mobility event is occurring to relocate that resource from cluster node 104-3 to cluster node 104-4 or vice versa, and after the data mobility event completes, the interconnect failure ends (i.e., interconnect recovers). In such instances, a PO may propose a voting proposal transaction specifying the SM voting method, so that a SM for that resource is required to participate in the vote. Before or during the voting proposal transaction, each group member (including the PO) may also notify their transaction manager component whether they are a SM for that resource. When GC 270 for that distributed group managing that resource does not receive at least one vote response from a SM for that resource, then the GC may fail the transaction. This ensures that the SM for that resource will participate in any access, actions, and/or modifications to that resource, even when the PO may not be aware of the group member hosting, owning, and/or managing that resource.

The workspace 272 for each distributed group 252 may be generally arranged to store and provide access to workspace information, which may include, without limitation, configuration information associated with one or more resources being managed by each distributed group 252. When group members 256 join a distributed group 252, each group member 256 may receive workspace information associated with the workspace 272. However, in some instances, because some resources and/or shared states may be local to a cluster node such as, for example, volume 116-1 which is hosted, owned, and/or managed by cluster node 104-1, that cluster node may contain the most up-to-date state for the resource and/or shared state. Accordingly, in some embodiments, group members 256 may be configured to receive workspace information associated with workspace 272 from a cluster node hosting, owning, and/or managing that resource, when group members 256 join a distributed group 252 managing that resource.

In instances when the cluster 150 is partitioned into a majority partition and one or more minority partitions, some distributed groups 252 (e.g., distributed groups 252 with persistent type attribute 264 or in some instances, distributed groups 252 with node-locality type attribute 266) may continue to exist between the majority and minority partitions. However once the interconnect failure ends (i.e., the interconnect recovers), cluster nodes of the minority partition may begin to rejoin cluster nodes of the majority partition.

To ensure that configuration information for distributed groups 252 having persistent type attribute 264 (e.g., distributed Vserver groups having the persistent type attribute 264 for managing Vservers such as Vserver 120-1) remains in synchronization between partitions, in one embodiment, at least the transaction manager component 204-1 may lock down the workspace 272 of the distributed groups having persistent type attribute 264, when one or more group members 256 of the distributed group representing one or more components of cluster nodes that are separated into two or more partitions, so that the workspace 272 of distributed groups having persistent type attribute 264 may become static or immutable and any proposed transactions to modify the workspace 272, including any configuration information of the distributed group, may fail.

To ensure that configuration information for distributed groups 252 having node-locality type attribute 266 (e.g., distributed volume groups and/or LU groups having node-locality type attribute 266) are synchronized for any rejoining cluster node(s), in one embodiment, the group members 256 of one or more distributed groups 252 managing resources and/or shared states of cluster nodes in the majority partition may be configured to provide, update, and/or re-synchronize the workspace 272 for one or more group members 256 representing components of cluster nodes in the minority partition. Similarly, group members 256 representing one or more components of cluster nodes in the majority partition that are rejoining one or more distributed groups 252 having node-locality type attribute 266 managing resources and/or shared states of cluster nodes in the minority partition may receive workspace 272 provided, updated, and/or re-synchronized by the cluster node in the minority partition.

To ensure that the transaction manager component 204-1 do not create a situation where there are two or more distributed groups managing the same resource and/or shared state, in one embodiment, the transaction manager component 204-1 of cluster node 104-1, may be configured to perform soft-reset procedure when the cluster node 104-1 is initially in a minority partition and then rejoins the majority partition. To perform the soft-reset procedure, the transaction manager component 204-1 may be configured to fence any incoming requests by providing a response indicating that the transaction manager component 204-1 is currently in a closed (i.e., non-operational) state, provide event information to the event manager component 240-1 indicating that the transaction manager component 204-1 is currently in a closed state, remove or evict all members from one or more distributed groups 252 having persistent type attribute 264, remove and/or dissolve the one or more distributed groups 252 including workspaces of the one or more distributed groups 252 having the persistent type attribute 264, remove any stored distributed group information associated with management of distributed groups 252 having persistent type attribute 264, remove any GC 270 in one or more distributed groups 252 having persistent type attribute 264 and JPC 278 for the partition, and provide event information to the event manager component 240-1 indicating that the transaction manager component 204-1 is now in the open state (i.e., operational state) after the soft-reset procedure is complete. It may be appreciated that, in some implementations, group members of distributed groups of group types 254 that do not have persistent type attribute 264 (e.g., distributed groups 252 having node-locality type attribute 266) may not be affected (e.g., group members may not be removed or evicted) by the soft-reset procedure.

Figure 2C:
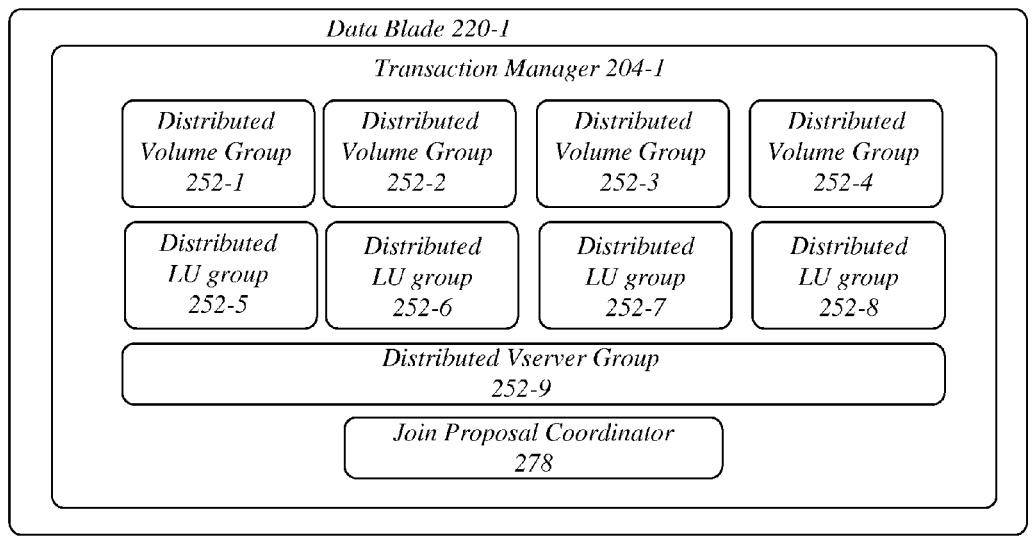
FIG. 2C illustrates an exemplary embodiment of the transaction manager component in a cluster node.

FIG. 2C illustrates an exemplary embodiment of the transaction manager component 204-1 for the non-disruptive cluster storage system 175. Moreover, in the exemplary embodiment, the transaction manager 204-1 may comprise distributed volume groups 252-1, 252-2, 252-3, and 252-4 created to coordinate access, actions, and/or modifications to volumes 116-1, 116-2, 116-3, and 116-4, respectively, between and among cluster nodes 104-1, 104-2, 104-3, and 104-4. Additionally, the transaction manager component 204-1 may comprise one or more distributed LU groups 252-4, 252-5, 252-6, and 252-7 created to coordinate access, actions and/or modifications to LUNs 106-1, 106-2, 106-3, and 106-4, respectively, between and among cluster nodes 104-1, 104-2, 104-3, and 104-4. Further, the transaction manager component 204-1 may also comprise a distributed Vserver group 252-9 to coordinate access, actions and/or modifications to the Vserver 120-1.

To ensure that at least the distributed Vserver groups will survive in all partitions such that the cluster nodes may continue to provide access to hosts, at least the distributed Vserver group 252-9 may be configured with persistent type attribute 264. Additionally or alternatively, distributed volume groups and/or distributed LU groups may be configured with node-locality type attribute 266 so that the distributed volume groups and distributed LU groups will survive in a partition, when the resources and/or shared states of a cluster node managed by the distributed volume groups and/or distributed LU groups are also within that partition. Conversely, distributed volume groups and/or distributed LU groups configured with node-locality type attribute 266 may not continue to exist or survive in a partition and the workspaces 272 associated with the distributed volume groups and/or distributed LU groups in that partition may be purged, when the resources and/or shared state of a cluster node managed by the distributed volume groups and/or distributed LU groups is no longer present in that partition (e.g., the cluster node is in a separate partition).

A distributed volume group may contain volume configuration information associated with a volume, such as, for example, volumes 116-1, 116-2, 116-3, and 116-4, which may include, without limitation, management configuration information (e.g., size, name, identifier, etc.) for all LUNs contained in the volume. To coordinate access, actions, and/or modifications on a volume such as volume 116-1, each distributed volume group such as distributed volume group 252-1 may also contain one or more group members 256 and GC 270. As previously discussed, the group members 256 may be logical abstractions of one or more components of one or more cluster nodes. Thus in one embodiment, a group member of a distributed volume group may include, without limitation, management kernel agent component 222 of each cluster node. To ensure that a distributed volume group such as distributed volume group 252-1 may continue to exist or survive at least in the same partition as the volume the distributed volume group is managing after a partition event (e.g., interconnect failure 168), each distributed volume group may also be configured with the node-locality (i.e., super member) type attribute 266 as previously discussed.

A distributed LU group may contain LUN configuration information (e.g., LUN name, size, operating system type, serial number, state, etc.) associated with a LUN such as, for example, LUNs 116-1, 116-2, 116-3, and 116-4. To coordinate access, actions, and/or modifications on distributed targets such as, for example, LUNs 106, each distributed LU group such as distributed LU group 252-5 may also contain one or more group members 256 (not shown) and GC 270 (not shown). In one embodiment, a group member of a distributed LU group may include, but is not limited to, SCSI-T component 224, of each cluster node. To ensure that a distributed LU group such as distributed LU group 252-5 may continue to exist or survive at least in the same partition as the LUN the distributed LU group is managing after a partition event (e.g., interconnect failure 168), each distributed LU group may also be configured with the node-locality (i.e., super member) type attribute 266 as previously discussed.

A distributed Vserver group may contain Vserver configuration information associated with a Vserver such as, for example, Vserver 120-1, which may include, without limitation, iGroup configuration information, portset configuration information (e.g., target portal groups, protocol, World Wide Port Name (WWPN), etc.), LUN map information, services information (e.g., state of Vserver for FCP, iSCSI and/or FCoE protocols), and LIF configuration information. To coordinate access, actions, and/or modifications on a Vserver such as Vserver 120-1, the distributed Vserver group such as distributed volume group 252-9 may also contain one or more group members 256 (not shown) and GC 270 (not shown). In one embodiment, a group member of a distributed Vserver group may include, but is not limited to, management kernel agent component 222 of each cluster node. To ensure that a distributed Vserver group such as distributed Vserver group 252-9 may remain or survive in each partition after a partition event (e.g., interconnect failure 168), the distributed Vserver group 252-9, each distributed Vserver group may also be configured with persistent type attribute 264.

It may be appreciated that when cluster nodes 104-1, 104-2, 104-3, and 104-4 that are involved with a Vserver (e.g., Vserver 120-1) becomes separated into two or more partitions due to a partition event (e.g., cluster nodes 104-1, 104-2, and 104-3 in the majority partition and cluster node 104-4 in the minority partition due to an interconnect failure 168), the management kernel agent components 222 and/or transaction manager components 204 of cluster nodes 104-1, 104-2, 104-3, and 104-4 may lock down the workspace 272 associated with the distributed Vserver group (e.g., workspace 272 associated with distributed Vserver group 252-9 managing Vserver 120-1), so that the workspace of the distributed Vserver group may become static or immutable in order to prevent modifications to the Vserver configuration information associated with the Vserver 120-1. Moreover, the workspace of the distributed Vserver group 252-9 managing Vserver 120-1 may remain static or immutable for as long as the cluster nodes 104 involved in the Vserver 120-1 are separated into two or more partitions. When the partition event ends and the cluster nodes 104 (e.g., cluster nodes 104-1, 104-2, 104-3, and 104-4) involved with the Vserver 120-1 are in the same partition, the workspace of the distributed Vserver group 252-9 may become modifiable or mutable.

It may also be appreciated that while the exemplary, distributed volume groups, distributed LU groups, and distributed Vserver groups are illustrated in FIG. 2C, distributed groups may be formed for the management of any resource and/or shared state between and among cluster nodes, which may include, without limitation, distributed Active Cluster Node (ACN) group which may track the active cluster nodes in a cluster, distributed configured cluster node group which may track the all configured cluster nodes in a cluster, and the like.

It may be further appreciated that while numerous operations, processes, elements, components, or any other features have been discussed in great detail with respect to cluster node 104-1, cluster nodes 104-2, 104-3, 104-4, or any other cluster node in the cluster 150 may be configured with operations, processes, elements, components or any other features that are substantially similar to those discussed with respect to cluster node 104-1 in order to provide distributed storage to one or more hosts. The embodiments, and/or implementations are not limited in these contexts.

Included herein is a set of embodiments and their associated operating environments representative of exemplary uses cases of one or more processes, steps, and/or events for performing novel aspects of the disclosed architecture. While, for purposes of simplicity of explanation, the one or more processes, steps, and/or events shown herein, for example, in the form of one or more use case diagrams are shown and described as a series of timed sequence of processes, steps, and/or events, it is to be understood and appreciated that the one or more processes, steps, and/or events are not limited by the time or order shown, as some of the processes, steps, and/or events may, in accordance therewith, occur in a different order, at a different time, and/or concurrently with other processes, steps, and/or events from that shown and described herein. Moreover, not all processes, steps, and/or events illustrated in a methodology may be needed for a novel implementation.

Figure 3A:
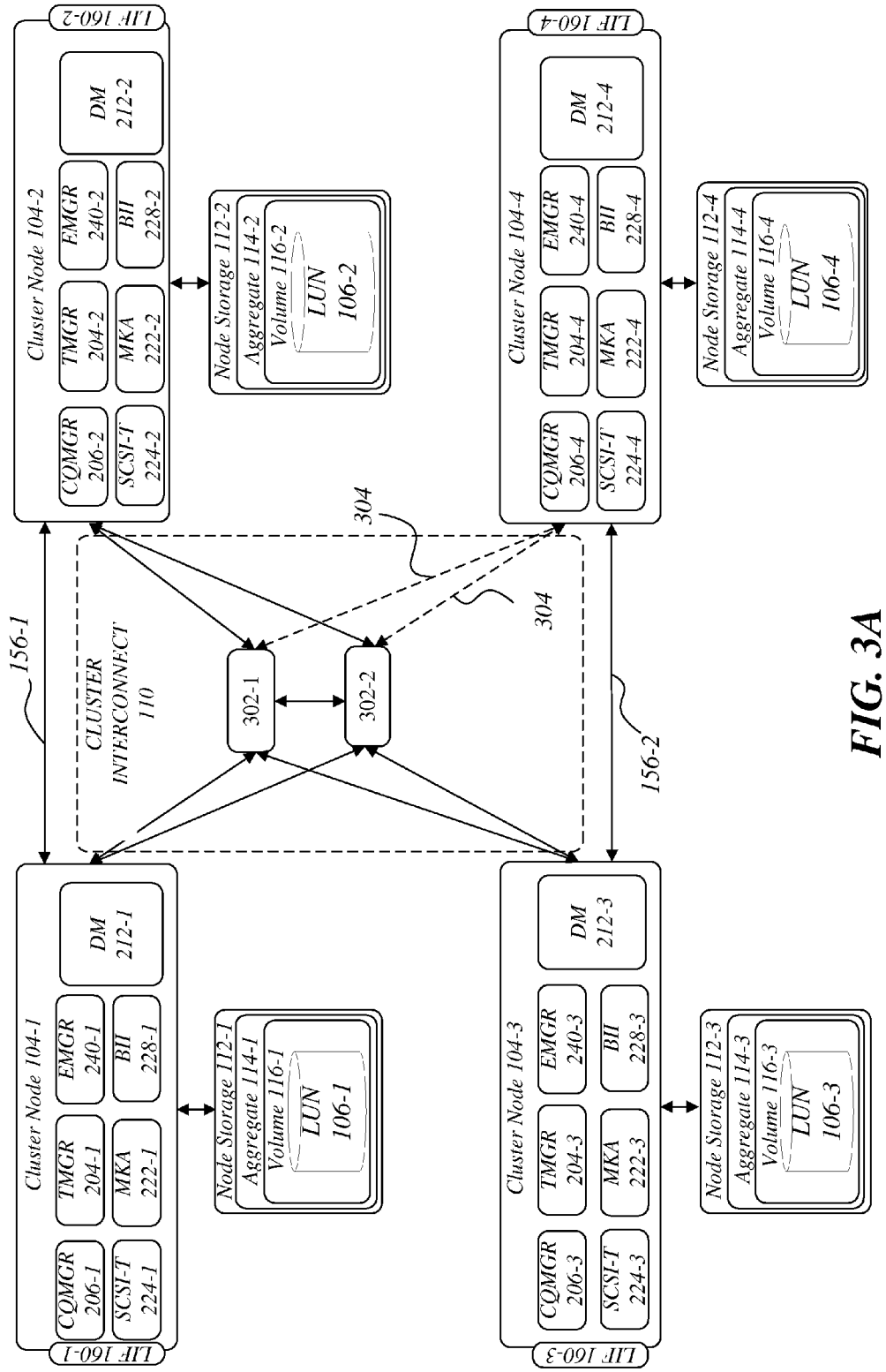
FIG. 3A illustrates an embodiment of an interconnect failure in the non-disruptive cluster storage system.

FIG. 3A illustrates an embodiment of the non-disruptive cluster storage system 175 when a cluster interconnect failure 304 occurs in cluster interconnect 110. In the non-disruptive cluster storage system 175, cluster nodes 104-1, 104-2, 104-3, and 104-4 may be interconnected via the cluster interconnect 110. The cluster interconnect 110 may comprise networking components 302-1 and 302-2 (e.g., hubs, switches, routers, load balancers, etc.) to facilitate communications between and among cluster nodes 104-1, 104-2, 104-3, and 104-4. Additionally, cluster nodes 104-1, 104-2 and cluster nodes 104-1, 104-2 may be configured as high availability pairs (not shown). During the cluster interconnect failure 304, cluster node 104-4 may become an isolated cluster node, and will begin transitioning from the same partition (e.g., a majority partition) as cluster nodes 104-1, 104-2, 104-3, and 104-4 into its separate partition (e.g., a minority partition).

Figure 3B:
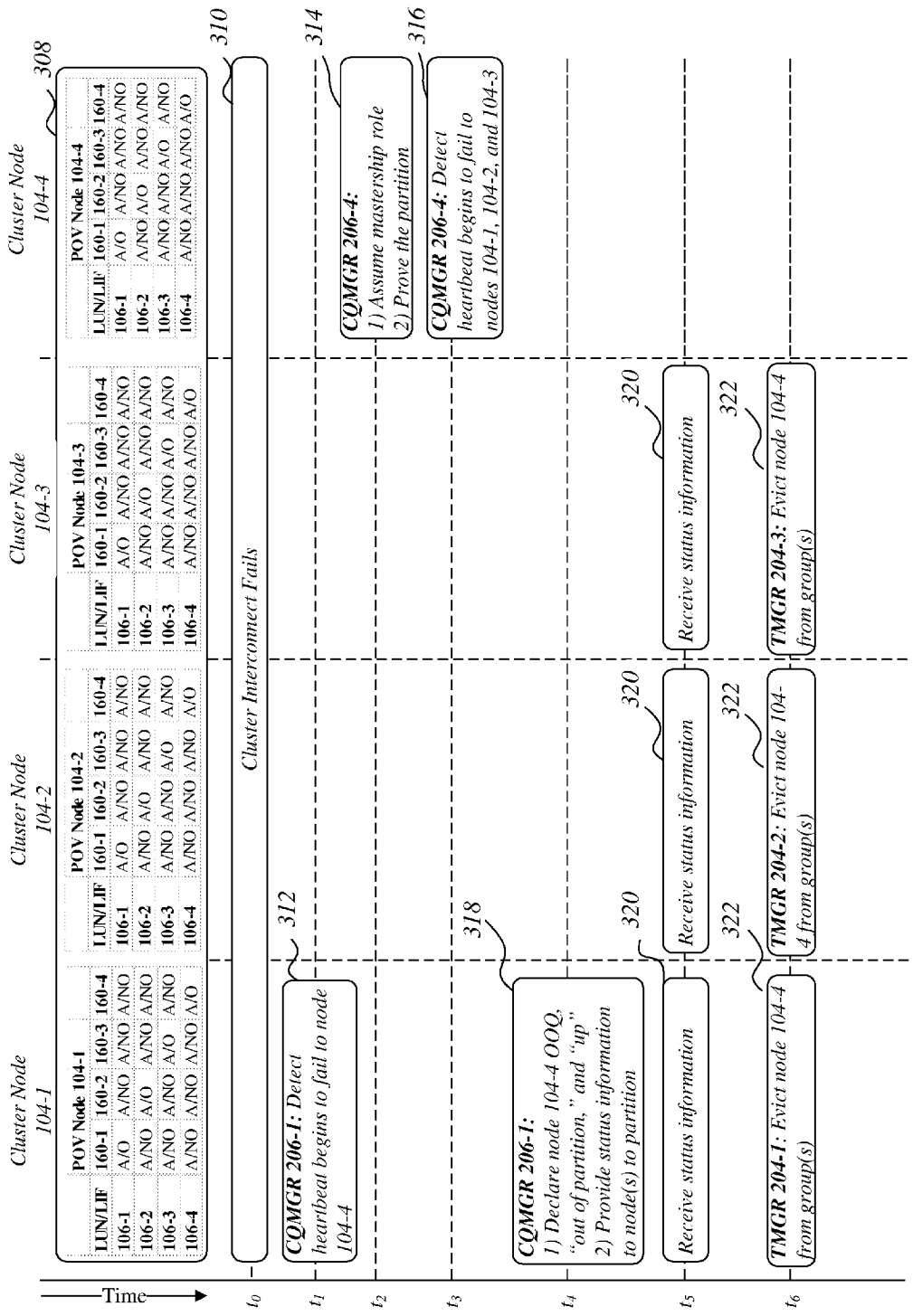
FIG. 3B illustrates an operating environment in the non-disruptive cluster storage system during an interconnect failure.

FIG. 3B illustrates an embodiment of an operating environment 300 for the non-disruptive cluster storage system 175. The operating environment 300 illustrates operations of the cluster nodes 104-1, 104-2, 104-3, and 104-4 and one or more components of the cluster 104-1, 104-2, 104-3, and 104-4 when cluster interconnect failure 304 occurs.

As shown in FIG. 3A, assuming that before interconnect failure 304 occurs, the ALUA access states from the point of view (POV) of cluster nodes 104-1, 104-2, 104-3, 104 are as illustrated in the ALUA access states table 308. Moreover, the ALUA access state table 308 provides the ALUA access states from the POV of a cluster node (e.g., cluster node 104-1) for each LUN (e.g., LUNs 106-1, 106-2, 106-3, and 106-4) through a LIF (e.g., LIF 160-1) hosted by the cluster node (e.g., cluster node 104-1). Additionally, the ALUA access state table 308 also provides the ALUA access states from the POV of a cluster node (e.g., cluster node 104-1) for each LUN through LIF (e.g., LIF 160-2, 160-3, and 160-4) not hosted by the cluster node (i.e., a remote or non-local LIF). To ensure that hosts 102 (e.g., host 102-1) uses the active/optimized path to access the one or more LUNs 106 through one or more LIFs 160, the SCSI-T component of each cluster node may be configured to report or indicate its ALUA access states to the hosts 102.

At time $t_3$, the cluster interconnect fails 310. For example, cluster interconnect 110 as shown in FIG. 3A may fail such that cluster node 104-4 becomes isolated from cluster nodes 104-1, 104-2, and 104-3.

At time $t_1$, CQMGR 206-1 of cluster node 104-1 may detect that heartbeat begins to fail to node 104-4 312. For example, the cluster quorum manager component 206-1, which may be a master cluster quorum manager component, and may detect that heartbeat begins to fail to a cluster node (e.g., cluster node 104-4) because the cluster node (e.g., cluster node 104-4) has failed to respond to one or more heartbeat signals.

At time $t_2$, CQMGR 206-4 of cluster node 104-4 may 1) assume mastership role and 2) prove the partition 314. For example, the cluster quorum manager component 206-4, may assume mastership role as a master cluster quorum manager component and begin proving the partition to determine which cluster nodes are in the same partition (e.g., same minority partition) as cluster node 104-4.

At time $t_3$, CQMGR 206-4 of cluster node 104-4 may detect that heartbeat begins to fail to cluster nodes 104-1, 104-2, and 140-3 316. For example, the cluster quorum manager component 206-1, which has assumed mastership role to become a master cluster quorum manager component, and may detect that cluster node 104-1, 104-2, and 104-3 has failed to respond to one or more heartbeat signals transmitted by cluster node 104-4.

At time $t_4$, CQMGR 206-1 of cluster node 104-1 may 1) declare node 104-4 OOQ, "out of partition," and "up," and 2) provide status information to node(s) to partition 318. For example, the cluster quorum manager component 206-1 of cluster node 104-1, as a master cluster quorum manager component, may declare that cluster node 104-4 is OOQ, "out of partition," and "up" after determining that cluster node 104-4 has failed to response to a threshold value (e.g., four or more) of heartbeat signals. It may be appreciated that the cluster quorum manager component 206-1 may determine whether a cluster node is OOQ based at least partially on the number of communicatively accessible and operational cluster node(s) in a partition as compared to the number of cluster node(s) in the entire cluster as previously discussed. The cluster quorum manager component 206-1 may also provide quorum status information which may include, without limitation, quorum state information indicating cluster node 104-4 is OOQ, connectivity state information indicating that the cluster node 104-4 is "out of partition," and operational state information indicating that the cluster node is 104-4 is "up" to cluster nodes 104-1, 104-4, and 104-3. It may be appreciated that the cluster node 104-3 may determine whether cluster node 104-4 is "up" (i.e., operational) via the high availability interconnect 156-2 during the interconnect failure 304 as previously discussed. The cluster quorum manager component 206-1 of cluster node 104-1 may also begin partitioning the cluster nodes into a majority partition including cluster nodes 104-1, 104-2, and 104-3 and one or more minority partitions including cluster node 104-4.

At time $t_5$, one or more components of cluster nodes 104-1, 104-2, and 104-3 may receive status information 320. For example, one or more components such as BII components 228-1, 228-2, and 228-3 and transaction manager components 204-1, 204-2, and 204-3 of cluster nodes 104-1, 104-2, and 104-3 may receive quorum status information from their respective event manager components 240-1, 240-2, and 240-3. Additionally, to protect integrity of information stored in the storage units, the BII components 228-1, 228-2, and 228-3 may communicate with and notify SCSI-T components 224-1, 224-2, and 224-3 to begin fencing off any access via LIFs 160-1, 160-2, and 160-3 to any LUN(s) owned or managed by cluster node 104-4 (e.g., LUN 106-4), in response to one or more access requests for LUN(s) owned or managed by cluster node 104-4 (e.g., LUN 106-4) received via LIFs 160-1, 160-2, and 160-3 from one or more hosts (e.g., host 102-1).

At time $t_6$, TMGR 204-1, TMGR 204-2, and TMGR 204-3 of cluster nodes 104-1, 104-2, and 104-3, respectively, may evict cluster node 104-4 from group(s) 322. For example, transaction manager components 204-1, 204-2, and 204-3 of cluster nodes 104-1, 104-2, and 104-3, respectively, may evict one or more components (e.g., management kernel agent component 222-4 and/or SCSI-T component 224-4) of cluster node 104-4 which may be represented as group members in one or more distributed groups such as, for example, distributed Vserver group(s) coordinating access, actions, and/or modifications to Vserver(s) (e.g., Vserver 120-1) that cluster nodes 104-1, 104-2, and 104-3 may be involved in and distributed volume group(s) coordinating access, actions, and/or modifications to volume(s) (e.g., volumes 116-1, 116-2, and 116-3) that cluster nodes 104-1, 104-2, and 104-3 may host, own, and/or manage. Moreover, because cluster node 104-4 is no longer part of any distributed Vserver groups in the majority partition, management kernel agent components 222-1, 222-2, and 222-3 may prevent modifications to Vserver configuration information for any Vservers cluster node 104-4 is involved with such as, for example, Vserver 120-1. Additionally, because cluster node 104-4 is no longer part of any distributed volume groups in the majority partition, any transactions (e.g., resizing a LUN in a volume, changing an attribute of a LUN in a volume, etc.) requiring a volume (e.g., volume 116-4) hosted, owned, and/or managed by cluster node 104-4 will fail.

Figure 3C:
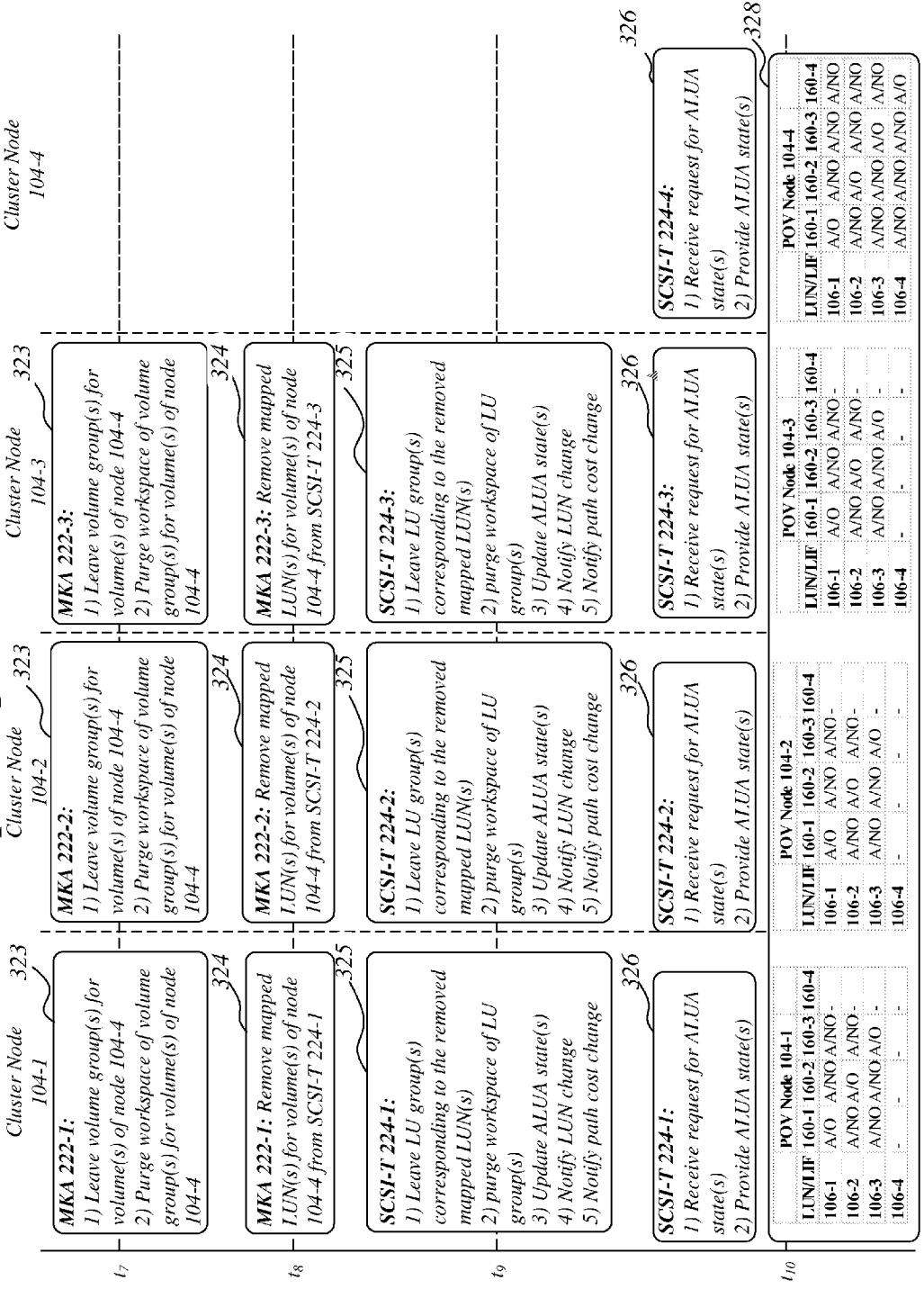
FIG. 3C illustrates a continuation of the operating environment in the non-disruptive cluster storage system during an interconnect failure.

FIG. 3C illustrates a continuation of the embodiment of the operating environment 300 for the non-disruptive cluster storage system 175 starting at time $t_7$. At time $t_7$, MKA 222-1, 222-2, and 222-3 of cluster nodes 104-1, 104-2, and 104-3, respectively, may 1) leave volume group(s) for volume(s) of node 104-4, and 2) purge workspace of volume group(s) for volume(s) of node 104-4 323. For example, the management kernel agent components 222-1, 222-2, and 222-3 may leave volume group(s) associated with volume(s) (e.g., volume 116-4) residing on or managed by cluster node 104-4. Additionally, the management kernel agent components 222-1, 222-2, and 222-3 may purge workspace of the distributed volume group(s) managing volume(s) (e.g., volume 116-4) so that any configuration information associated with the volume(s) (e.g., volume 116-4) may no longer be accessible and/or stored by cluster nodes 104-1, 104-2, and 104-3.

At time $t_8$, MKA 222-1, 222-2, and 222-3 of cluster nodes 104-1, 104-2, and 104-3, respectively, may remove mapped LUN(s) for volume(s) of node 104-4 324. For example, the management kernel agent components 222-1, 222-2, and 222-3 may remove mapped LUN(s) (e.g., LUN 106-4) of volume(s) (e.g., volume 116-4) that are hosted, owned and/or managed by cluster node 104-4 from SCSI-T components 224-1, 224-2, and 224-3. Moreover, the management kernel agent components 222-1, 222-2, and 222-3 may remove at least a portion of the volume configuration information from the SCSI-T components 224-1, 224-2, and 224-3, respectively, the removed portion of the volume configuration information may include, without limitation, LUN(s) (e.g., LUN 106-4) that are mapped to iGroup(s) (e.g., iGroup 162-1) of Vserver(s) (e.g., Vserver 120-1) for volume(s) (e.g., volume 116-4) that are hosted, owned, and/or managed by cluster node 104-4.

At time $t_9$, SCSI-T 224-1, 224-2, and 224-3 of cluster nodes 104-1, 104-2, and 104-3, respectively, may 1) leave LU group(s) corresponding to the removed mapped LUN(s), 2) purge workspace of LU group(s), 3) update ALUA state(s), 4) notify LUN change, and 5) notify path cost change 325. For example, in response to removed portion of the volume configuration information, SCSI-T components 224-1, 224-2, and 224-3 may leave distributed LU group(s) corresponding to the mapped LUN(s) (e.g., LUN 106-4), removed by MKA 222-1, 222-2, and 222-3 in order to remove access to any LUN(s) (e.g., LUN 106-4) hosted, owned, and/or managed by cluster node 104-4 via LIFs 160-1, 160-2, and 160-3. The SCSI-T components 224-1, 224-2, and 224-3 may purge workspace of the distributed LU group(s) corresponding to removed mapped LUN(s) (e.g., LUN 106-4) so that any configuration information associated with the mapped LUN(s) (e.g., LUN 106-4) may no longer be accessible and/or stored by cluster nodes 104-1, 104-2, and 104-3. The SCSI-T components 224-1, 224-2, and 224-3 may further update ALUA access state(s) for LIFs 160-1, 160-1, 160-2, 160-3, and 160-4 with respect to LUNs 106-1, 106-2, 106-3, and 106-4 from their respective POVs based on the quorum status information provided by the respective cluster quorum manager components 206-1, 206-2, and 206-3 via the respective event manager components 240-1, 240-2, and 240-3, the volume access state information stored, updated, and/or provided by the respective management kernel agent components 222-1, 222-2, and 222-3, and/or cached volume location information stored, updated, and/or provided by the respective BII components 228-1, 228-2, and 228-3, as previously discussed.

With continued reference to time at $t_9$, the SCSI-T components 224-1, 224-2, and 224-3 may further notify hosts 102 of a LUN change indicating a LUN inventory update and one or more LUNs on one or more LIFs has now become not reported (-). To notify the hosts 102 utilizing SCSI protocol, SCSI-T components 224-1, 224-2, and 224-3 may set UNIT_ATTENTION (U/A) to REPORT_LUNS_DATA_HAS_CHANGED (RLDHC) on the Initiator_Target nexus (I_T). In addition, SCSI-T components 224 (e.g., SCSI-T component 224-1) may be configured to further notify any hosts 102 attempting access any not reported (-) LUN (e.g., LUN 106-4) through a LIF (e.g., LIF 160-1, LIF 160-2, and LIF 160-3) with a LOGICAL_UNIT_NOT_SUPPORTED response (i.e., not supported). Further, SCSI-T components 224-1, 224-2, and 224-3 may also notify the hosts 102 of a path cost change indicating that one or more ALUA access states has been changed and/or updated. For example, to notify the hosts 102 utilizing SCSI protocol, SCSI-T components 224-1, 224-2, and 224-3 may set UNIT_ATTENTION (U/A) to ASYMMETRIC_ACCESS_STATE_CHANGED (AASC) on the Initiator_Target_LUN nexus (I_T_L).

At time $t_{10}$, SCSI-T 224-1, 224-2, 224-3, and 224-4 of cluster nodes 104-1, 104-2, 104-3, and 104-4, respectively, may 1) receive request for ALUA state(s) and 2) provide ALUA state(s) 326. For example, SCSI-T components 224-1, 224-2, 224-3, and 224-4 of cluster nodes cluster nodes 104-1, 104-2, 104-3, and 104-4 may receive requests for the updated and/or latest ALUA access state(s) and provide the updated ALUA access state(s) as illustrated in ALUA access state table 328. To retrieve the current ALUA state(s) for each LUN utilizing SCSI protocol, hosts 102 may send a REPORT_TARGET PORT_GROUP (RTPG) request. Moreover, from POV of cluster nodes 104-1, 104-2, and 104-3, LUN 106-4 may be not reported (-) and as such, any access request to LUN 106-4 through LIF 160-1, LIF 160-2 and LIF 160-3, will be not supported. Additionally, because cluster node 104-4 has become isolated, the ALUA access states for LIF 160-4 from POV of cluster nodes 104-1, 104-2, and 104-3 may not be reported (-) for LUNs 106-1, 106-2, 106-3, and 106-4. From POV of cluster node 104-4, however, all paths remains unchanged.

Figure 3D:
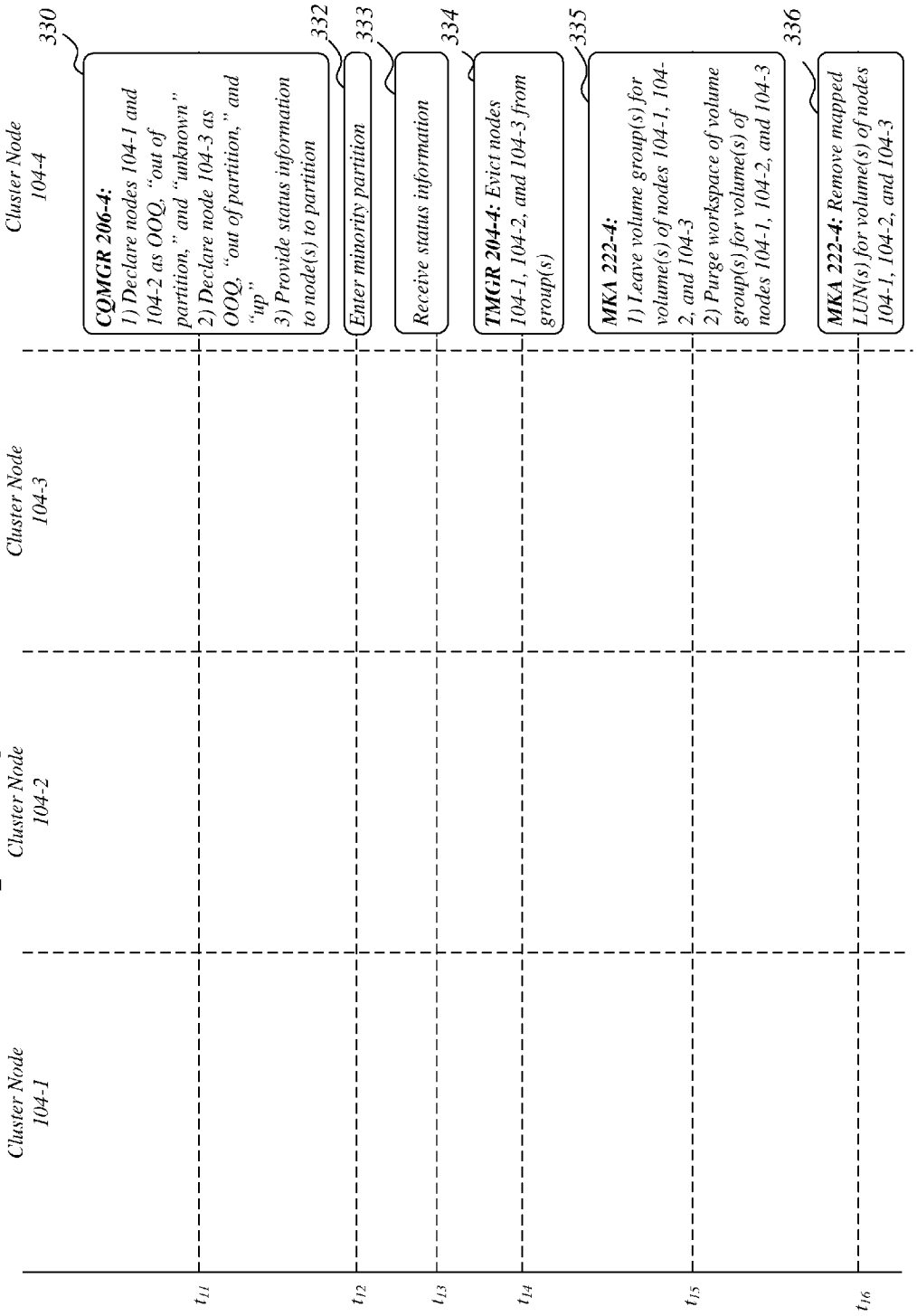
FIG. 3D illustrates another continuation of the operating environment in the non-disruptive cluster storage system during an interconnect failure.

FIG. 3D illustrates a continuation of the embodiment of the operating environment 300 for non-disruptive cluster storage system 175 staring at time $t_{11}$. At time $t_{11}$, CQMGR 206-4 of cluster node 104-4 may 1) declare nodes 104-1 and 104-2 as OOQ, "out of partition," and "unknown," 2) declare node 104-3 as OOQ, "out of partition," and "up," and provide status information to node(s) to partition 330. For example, the cluster quorum manager component 206-4, as a master cluster quorum manager component, may declare that cluster nodes 104-1 and 104-2 as OOQ, "out of partition," and "unknown" and cluster node 104-3 as OOQ, "out of partition," and "up" after determining that cluster node 104-1, 104-2, and 104-3 failed to respond to a threshold value (e.g., 4 heartbeat signals) of heartbeat signals. The cluster quorum manager component 206-4 may also provide quorum status information to at least one cluster node such as cluster node 104-4. The quorum status information may include, without limitation, the quorum state information indicating that cluster nodes 104-1, 104-2, and 104-3 are OOQ, the connectivity state information indicating that cluster nodes 104-1, 104-2, and 104-3 are "out of partition," and operational state information indicating that cluster nodes 104-1 and 104-2 are "unknown" and cluster node 104-3 is "up." It may be appreciated that the cluster node 104-4 may determine whether cluster node 104-3 is "up" (i.e., operational) via the high availability interconnect 156-2 during the interconnect failure 304 as previously discussed. The cluster quorum manager component 206-4 may also begin partitioning the cluster nodes into a majority partition and one or more minority partitions.

At time $t_{12}$, cluster node 104-4 may enter minority partition 332. For example, the cluster quorum manager component 206-4, as a master cluster quorum manager component, may determine that cluster node 104-4 is isolated from cluster nodes 104-1, 104-2, and 104-3 and accordingly, do not meet the criteria to maintain quorum to remain or transition to the majority partition (i.e., cluster node 104-4 is OOQ). Additionally, to protect data integrity, the BII component 228-4 may begin fencing off access to any non-local LUN(s) (e.g., LUNs 106-1, LUN 106-2, and LUN 106-3) hosted, owned, and/or managed by cluster nodes 104-1, 104-2, and 104-3.

At time $t_{13}$, one or more components of cluster node 104-4 may receive status information 333. For example, one or more components such as BII component 228-4 and transaction manager component 204-4 of cluster node 104-4 may receive quorum status information from its event manager components 240-4. Additionally, to protect data integrity, the BII component 228-4 may communicate with and notify SCSI component 224-4 to begin fencing off access via LIF 160-4 to any LUN owned or managed by cluster nodes 104-1, 104-2, 104-3 such as, for example, LUNs 106-1, 106-2, and 106-3, in response to one or more access requests received via LIF 160-4 from one or more hosts (e.g., host 102-1).

At time $t_{14}$, TMGR 204-4 of cluster node 104-4 may evict nodes 104-1, 104-2, and 104-3 from group(s) 334. For example, transaction manager component 204-4 may evict one or more components (e.g., management kernel agent components 222-1, 222-2, and 222-3 and/or SCSI-T components 224-1, 224-2, and 224-3) of cluster nodes 104-1, 104-2, and 104-3, which may be represented as group members in one or more groups (e.g., distributed Vserver groups, distributed volume groups, and distributed LU groups) so that the one or more components of the cluster nodes 104-1, 104-2, and 104-3 are no longer group members of the one or more groups (e.g., distributed Vserver group managing Vserver 120-1, distributed volume group managing volume 116-4, and distributed LU group managing LUN 106-4). Moreover, because cluster nodes 104-1, 104-2, and 104-3 are no longer part of any distributed Vserver group(s), any distributed Vserver group(s) involving cluster nodes 104-1, 104-2, and 104-3 will now become static or immutable by management kernel agent component 222-4 and/or transaction manager component 204-4 not allowing any changes to the Vserver configuration information to occur. Thus, the management kernel agent component 222-4 and/or transaction manager component 204-4 may prevent modifications to Vserver configuration information associated with a Vserver (e.g., Vserver 120-1), when cluster nodes 104-1, 104-2, and 104-3 are involved with that Vserver (e.g., Vserver 120-1). Additionally, because cluster nodes 104-1, 104-2, and 104-3 are no longer members of any distributed volume group(s), any transactions requiring a volume hosted, owned, and/or managed by cluster nodes 104-1, 104-2, and 104-3 (e.g., volumes 116-1, 116-2, and 116-3) will fail.

At time $t_{15}$, MKA 222-4 of cluster node 104-4 may 1) leave volume group(s) for volume(s) of nodes 104-1, 104-2, and 104-3 and 2) purge workspace of volume group(s) for volume(s) of nodes 104-1, 104-2, and 104-3 335. For example, the management kernel agent component 222-4 may leave volume group(s) associated with volume(s) (e.g., volumes 116-1, 116-2, and 116-3) residing on and/or managed by cluster nodes 104-1, 104-2, and 104-3, respectively. Additionally, the management kernel agent component 222-4 may also purge workspace(s) of the distributed volume group(s) associated with volumes 116-1, 116-2, and 116-3 so that any configuration information associated with the volumes 116-1, 116-2, and 116-3 may no longer be accessible and/or stored by cluster node 104-4.

At time $t_{16}$, MKA 222-4 of cluster node 104-4 may remove mapped LUN(s) for volume(s) of nodes 104-1, 104-2, and 104-3 336. For example, the management kernel agent component 222-4 may remove mapped LUN(s) for volume(s) that are hosted, owned and/or managed by cluster nodes 104-1, 104-2, and 104-3 from SCSI-T component 224-4. Moreover, the management kernel agent component 222-4 may remove at least a portion of volume configuration information from the SCSI-T component 224-4, the removed portion of volume configuration information may include, without limitation, LUN(s) (e.g., LUNs 106-1, 106-2, and 106-3) mapped to iGroup(s) (e.g., iGroup 162-1) of Vserver(s) (e.g., Vserver 120-1) for volume(s) (e.g., volumes 116-1, 116-2, and 116-3) that are hosted, owned, and/or managed by cluster nodes 104-1, 104-2, and 104-3, respectively.

Figure 3E:
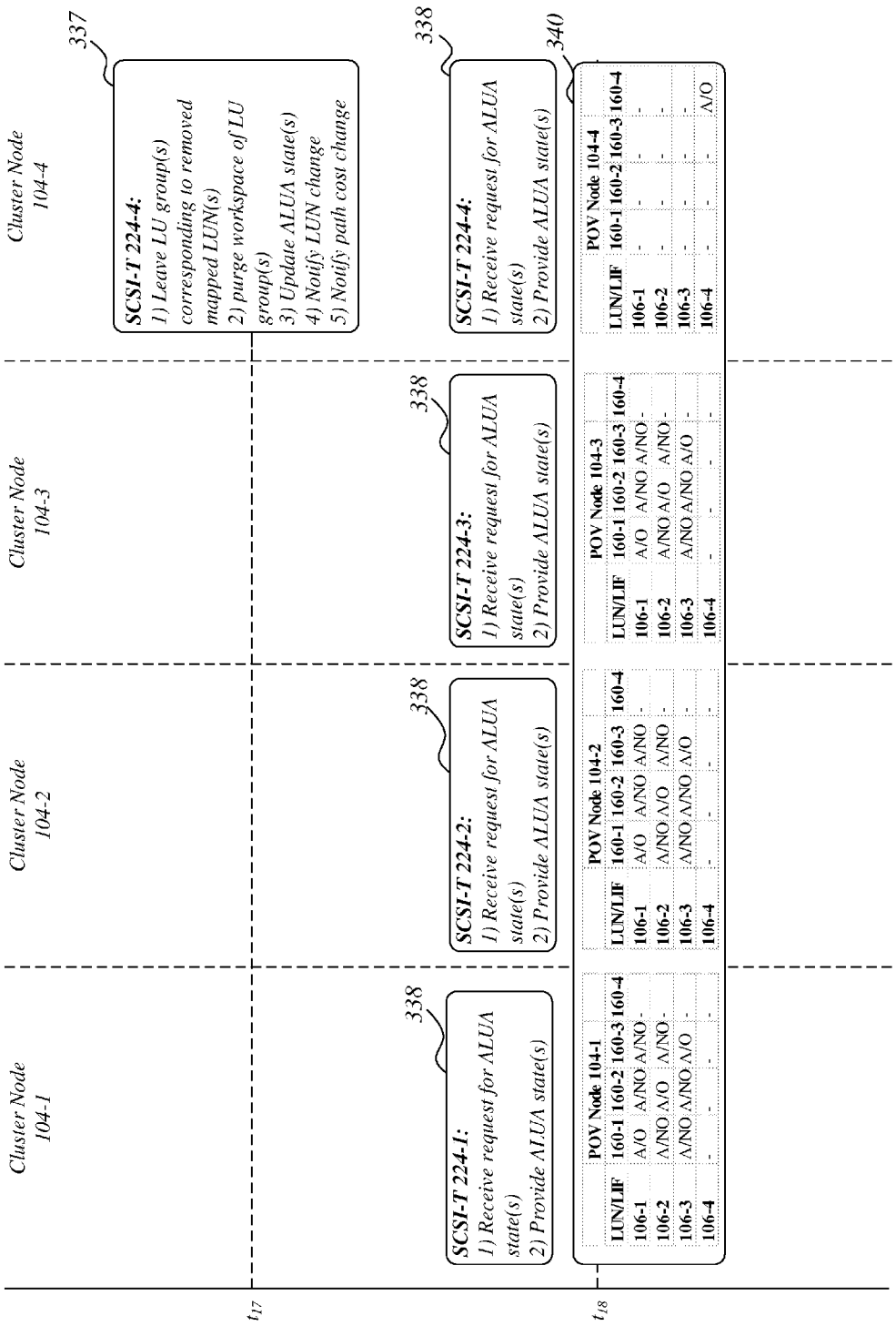
FIG. 3E illustrates yet another continuation of the operating environment in the non-disruptive cluster storage system during an interconnect failure.

FIG. 3E illustrates another continuation of the embodiment of the operating environment 300 for the non-disruptive cluster storage system 175 starting at time $t_{17}$. At time $t_{17}$, SCSI-T 224-4 of cluster node 104-4 may 1) leave LU group(s) corresponding to removed mapped LUN(s), 2) purge workspace of LU groups(s), 3) update ALUA state(s), 4) notify LUN change, and 5) notify path cost change 337. For example, in response to removed portion of volume configuration information, SCSI-T component 224-4 may leave LU group(s) corresponding to mapped LUN(s) (e.g., LUNs 106-1, 106-2, and 106-3) removed by MKA 222-1, 222-2, and 222-3 in order to remove access to any LUN(s) (e.g., LUNs 106-1, 106-2, and 106-3) hosted, owned, and/or managed by cluster nodes 104-1, 104-2, and 104-3 via LIF 160-4. The SCSI-T component 224-4 may also purge workspace of the distributed LU group(s) corresponding to removed mapped LUN(s) (e.g., LUN 106-1, 106-2, and 106-3) so that any configuration information associated with the mapped LUN(s) (e.g., LUNs 106-1, 106-2, and 106-3) may no longer be accessible and/or stored by cluster nodes 104-1, 104-2, and 104-3. The SCSI-T component 224-4 may further update ALUA access state(s) for LIFs 160-1, 160-2, 160-3, and 160-4 with respect to LUNs 106-1, 106-2, 106-3, and 106-4 based on the quorum status information provided by the cluster quorum manager component 206-4 via the event manager component 240-4, the volume access state information stored, updated, and/or provided by the management kernel agent component 222-4, and/or cached volume location information stored, updated, and/or provided by the respective BII component 228-4, as previously discussed. Additionally, SCSI-T component 224-4 may notify hosts 102 of a LUN change indicating a LUN inventory update and that one or more LUNs on one or more LIFs has now become not reported (-) utilizing, for example, SCSI protocol (e.g., set U/A to RLDHC on the I_T) as previously discussed. Further, SCSI-T component 224-4 may also notify the hosts 102 of path cost change indicating that one or more ALUA access states has been changed and/or updated utilizing, for example, SCSI protocol (e.g., set U/A to AASC on I_T_L) as previously discussed.

At time $t_{18}$, cluster nodes 104-1, 104-2, 104-3, and 104-4 may 1) receive request for ALUA state(s) and 2) provide ALUA state(s) 338. For example, cluster nodes cluster nodes 104-1, 104-2, 104-3, and 104-4 may receive requests for updated ALUA access state(s) and provide updated and/or latest ALUA access state(s) as illustrated in ALUA access state table 340. From POV of cluster node 104-1, 104-2, and 104-3 all paths remains unchanged. However, from POV of Cluster node 104-4, LUNs 106-1, 106-2, and 106-3 may be not reported (-) and as such, any access request to LUNs 106-1, 106-2, and 106-3 through LIF 160-4, will no longer be supported. Additionally, because cluster node 104-4 has become isolated, the ALUA access states for LIF 160-1, 160-2, and 160-3 from POV of cluster node 104-4 may not be reported (-) for LUNs 106-1, 106-2, 106-3, and 106-4. It may be appreciated that while access to LUN 106-4 may no longer be possible from LIF 160-1, 160-2, and 160-3, the hosts 120 utilizing the MPIO component 166-1 may still access data or information stored in LUN 160-4 through LIF 160-4 because it remains as an A/O path for LUN 160-4.

Figure 4A:
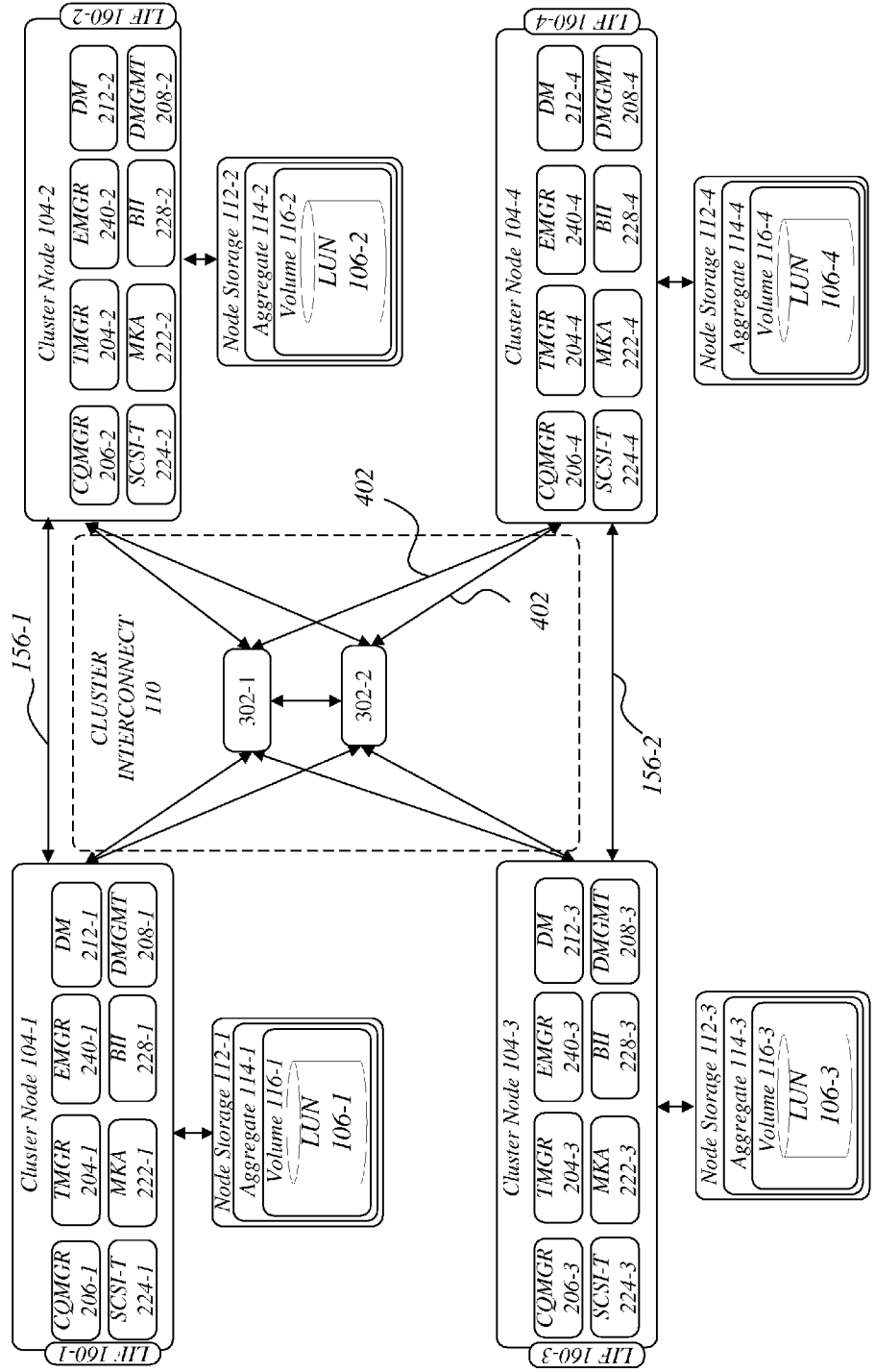
FIG. 4A illustrates an embodiment of an interconnect recovery in the non-disruptive cluster storage system.

FIG. 4A illustrates an embodiment of the non-disruptive cluster storage system 175 during interconnect recovery 402 after an interconnect failure 304. In the non-disruptive cluster storage system 175, cluster nodes 104-1, 104-2, 104-3, and 104-4 may be interconnected via the cluster interconnect 110. However, cluster node 104-4 may be initially isolated from cluster nodes 104-1, 104-2, and 104-3 due to the interconnect failure 304. During the interconnect recovery 402, cluster node 104-4 may no longer be isolated, and will begin transitioning from a separate partition (e.g., a minority partition) to the same partition as cluster nodes 104-1, 104-2, and 104-3 (e.g., a majority partition).

Figure 4B:
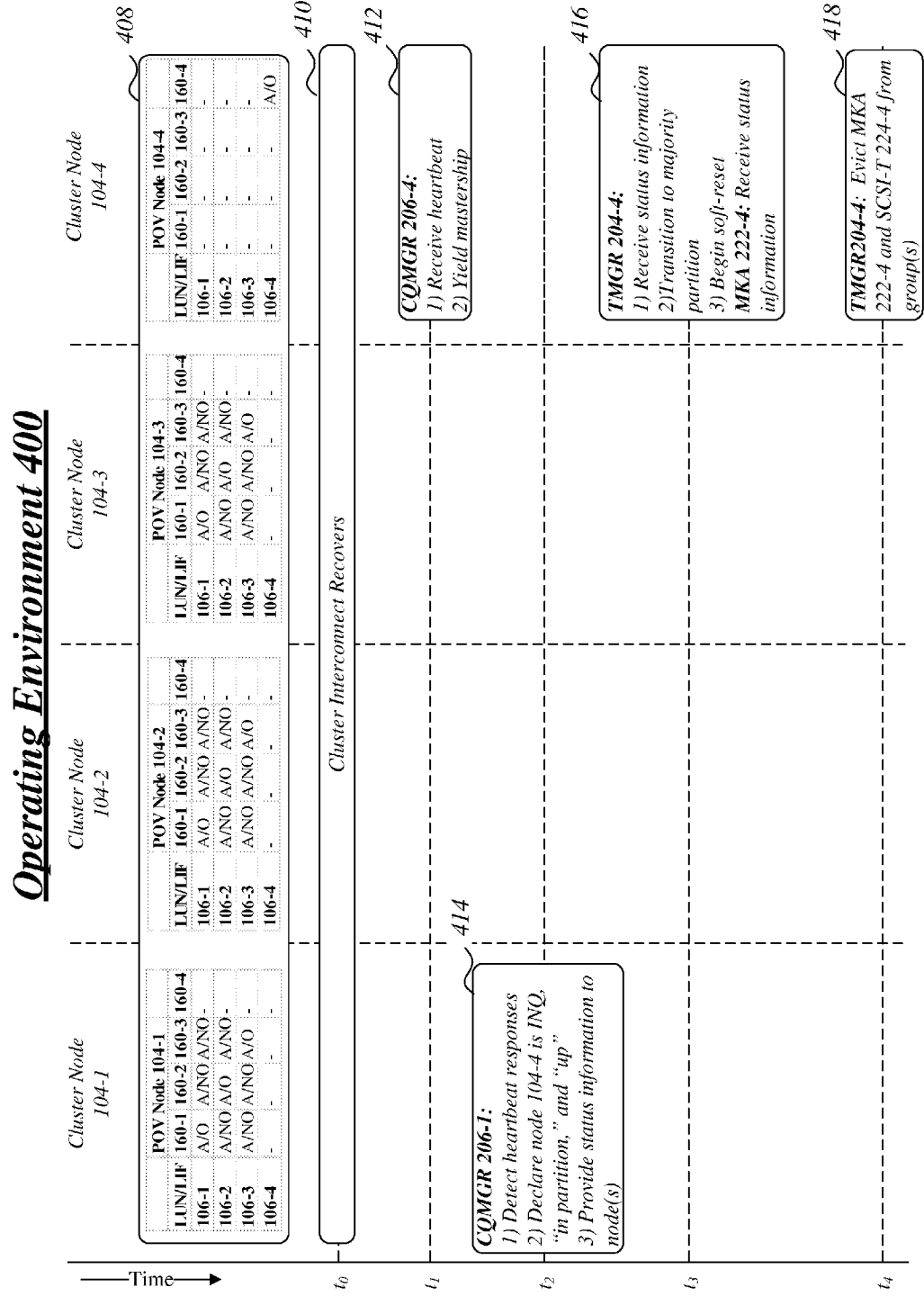
FIG. 4B illustrates an operating environment in the non-disruptive cluster storage system during an interconnect recovery.

FIG. 4B illustrates an embodiment of an operating environment 400 for the non-disruptive cluster storage system 175. The operating environment 400 illustrates operations of the cluster nodes 104-1, 104-2, 104-3, and 104-4 and one or more components of the cluster 104-1, 104-2, 104-3, and 104-4 when interconnect recovery 402 occurs.

As shown in FIG. 4A, assuming that before interconnect recovery 402 occurs, the ALUA access states from the point of view (POV) of cluster nodes 104-1, 104-2, 104-3, 104-4 are as illustrated in the ALUA access states table 408. Moreover, from POV of cluster nodes 104-1, 104-2, and 104-3, LUN 106-4 may be not reported (-) and as such, any access request to LUN 106-4 through LIF 160-1, LIF 160-2 and LIF 160-3, may no longer be supported. Additionally, because cluster node 104-4 has become isolated from cluster nodes 104-1, 104-2, 104-3 the ALUA access states for LIF 160-4 from POV of cluster nodes 104-1, 104-2, and 104-3 may be unsupported for LUNs 106-1, 106-2, 106-3, and 106-4. From POV of cluster node 104-4, LUNs 106-1, 106-2, and 106-3 may be not reported (-) and as such, access request to LUNs 106-1, 106-2, and 106-3 through LIF 160-4, may no longer be supported. Further, because cluster node 104-4 has become isolated, the ALUA access states for LIF 160-1, 160-2, and 160-3 from POV of cluster node 104-4 may not be reported (-) for LUNs 106-1, 106-2, 106-3, and 106-4. It may be appreciated that while access to LUN 106-4 may no longer be possible from LIF 160-1, 160-2, and 160-3, the hosts 120 utilizing the MPIO component 166-1 may still access data stored in LUN 160-4 through LIF 160-4 because it remains as an A/O path for LUN 160-4.

At time $t_0$, the cluster interconnect recovers 410. For example, cluster interconnect 110 as shown in FIG. 4A may recover such that cluster node 104-4 is no longer isolated from cluster nodes 104-1, 104-2, and 104-3.

At time $t_1$, CQMGR 206-4 of cluster node 104-4 may 1) receive heartbeat and 2) yield mastership 412. For example, the cluster quorum manager component 206-4, which may be a master cluster quorum manager component, and may begin to detect heartbeat signals from cluster quorum manager component 206-1, which may also be a master cluster quorum manager component, of cluster node 104-1. Upon detecting one or more heartbeat signals (e.g., four or more) from cluster quorum manager component 206-1, the cluster quorum manager component 206-4 may begin providing one or more heartbeat response signals to cluster quorum manager component 206-1 of cluster node 104-1. After receiving a threshold number of heartbeat signals from cluster quorum manager component 206-1, the cluster quorum manager component 206-4 may yield mastership.

At time $t_2$, CQMGR 260-1 of cluster node 104-1 may 1) detect heartbeat responses, 2) declare node 104-1 INQ, "in partition," and "up," and 3) provide status information to other node(s) 414. For example, the cluster quorum manager component 206-1, as a master cluster quorum manager component, may detect that heartbeat response signals from cluster node 104-4. After receiving a threshold value of heartbeat response signals (e.g., four or more consecutive heartbeat response signals) from cluster quorum manager component 206-4 of cluster node 104-4, cluster quorum manager component 206-1 may declare that cluster node 104-4 is INQ, "in partition," and "up." It may be appreciated that the cluster quorum manager component 206-1 may determine whether a cluster node is INQ based at least partially on the number of communicatively accessible and operational cluster node(s) in a partition as compared to the entire cluster as previously discussed. The cluster quorum manager component 206-1 may also provide quorum status information to cluster nodes 104-1, 104-2, 104-3, and 104-4, which may include, without limitation, the quorum state information indicating cluster node 104-4 is now INQ, the connectivity state information indicating that cluster node 104-4 is now "in partition," and operational state information indicating that the cluster node 104-4 is now "up."

At time $t_3$, TMGR 204-4 of cluster node 104-4 may 1) receive status information, 2) transition to majority partition, and 3) begin soft-reset. Furthermore, at time $t_3$ and MKA 222-4 of cluster node 104-4 may receive status information 416. For example, one or more components of cluster nodes 104-4 such as transaction manager component 204-4 and management kernel agent component 222-4 and may receive a quorum status information from event manager component 240-4. Additionally, to transition from minority partition to the majority partition, the transaction manager component 204-4 may be configured to fence any incoming request by providing a response indicating that the transaction manager component 204-4 is currently in a closed state. Further, the transaction manager component 204-4 may begin the soft-reset procedure as previously discussed.

At time $t_4$, cluster node 104-4 may evict MKA 222-4 and SCSI-T 224-4 from group(s) 418. For example, transaction manager component 204-4 of cluster node 104-4 may perform the soft-reset procedure by evicting group members representing management kernel agent component 222-4 and/or SCSI-T component 224-4 from one or more distributed groups having persistent type attribute 264 (e.g., distributed Vserver group managing Vserver 120-1). During the soft-reset procedure, the transaction manager component 204-4 may also fence any proposed transactions by indicating that the transaction manager component 204-4 is in a closed state. Further, the transaction manager component 204-4 may remove and/or dissolve the one or more distributed groups having persistent type attribute 264 (e.g., distributed Vserver group managing Vserver 120-1), remove any stored distributed group information associated with management of distributed groups, and remove any GC in one or more distributed groups and JPC for the minority partition. In addition, at the completion of the soft-reset procedure, the transaction manager component 204-4 may provide event information to the event manager component 240-4 indicating that the transaction manager component 204-4 is in an open state.

Figure 4C:
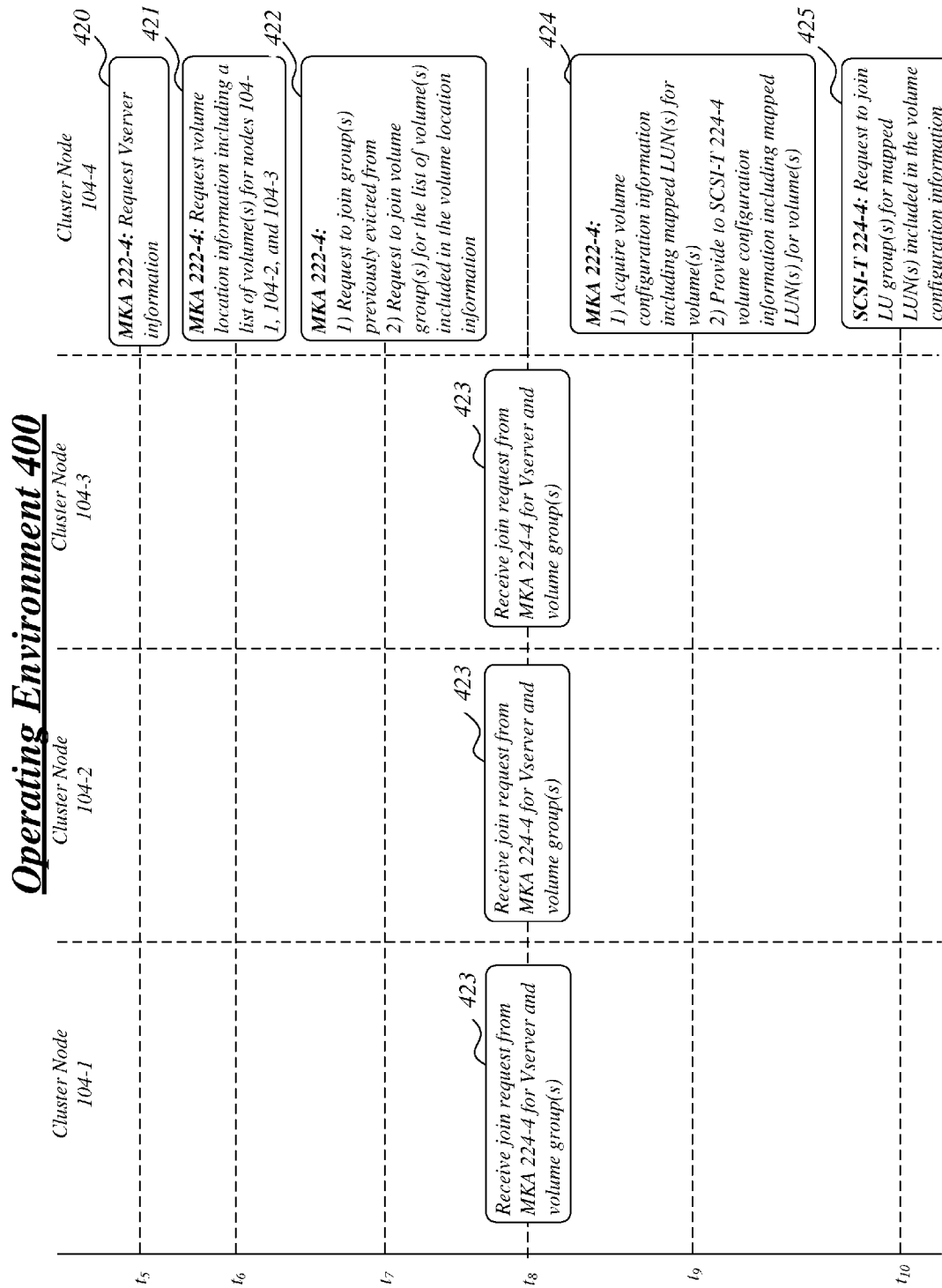
FIG. 4C illustrates a continuation of the operating environment in the non-disruptive cluster storage system during an interconnect recovery.

FIG. 4C illustrates a continuation of the embodiment of the operating environment 400 for the non-disruptive cluster storage system 175 starting at time $t_5$. At time $t_5$, MKA 222-4 of cluster node 104-4 may request Vserver information 420. For example, in response to the previously received quorum status information, the management kernel agent component 222-4 may request latest Vserver information from distributed management component 208-4 to enable the management kernel agent component 222-4 to join the distributed Vserver group(s) cluster node 104-4 is involved with, such as, for example, distributed Vserver group managing Vserver 120-1. The Vserver information may include, without limitation, a list of Vserver(s) including associated Vserver identifiers (e.g., Vserver names), one or more cluster management LIFs (not shown) or any other information cached by management kernel agent component 222-4 that is not specific to the SAN subsystem of cluster 150.

At time $t_6$, MKA 222-4 of cluster node 104-4 may request volume location information including a list of volume(s) for nodes 104-1, 104-2, and 104-3 421. For example, in response to the previously received quorum status information, the management kernel agent component 222-4 may also request volume location information from BII component 228-4, the volume location information may include, without limitation, a list of volume(s) residing on and/or managed by cluster nodes 104-1, 104-2, and 104-3. It may be appreciated that when no data mobility event or any other event that may modify the hosting, ownership, and/or management of one or more volumes 116 of the one or more cluster nodes 104 during the partition event (e.g., interconnect failure 304), the cached volume location information comprising the list of volume(s) of cluster nodes 104-1, 104-2, and 104-3 provided by BII component 228-4 may remain the same as before the partition event (e.g., interconnect failure 304). Thus, the list of volume(s) may include, without limitation, volume 116-1, 116-2, and 116-3, which are hosted, owned, and/or managed by cluster nodes 104-1, 104-2, and 104-3, respectively.

At time $t_7$, MKA 222-4 of cluster node 104-4 may request 1) to join group(s) previously evicted from and 2) request to join volume group(s) for the list of volume(s) included in the volume location information 422. For example, the management kernel agent component 222-4 may request to join one or more distributed group(s) the management kernel agent component 222-4 was previously evicted from, such as, for example, distributed Vserver group managing Vserver 120-1. The management kernel agent component 222-4 may also request to join distributed volume group(s) for the list of volume(s) included in the volume location information and received from BIT component 228-4. Moreover, the management kernel agent component 222-4 may join distributed volume groups managing volume(s) (e.g., volumes 116-1, 116-2, and 116-3) contained in the list of volume(s) that are hosted, owned, and/or managed by cluster nodes 104-1, 104-2, and 104-3, respectively.

At time $t_8$, cluster nodes 104-1, 104-2, and 104-3 may receive join requests from MKA 222-4 for Vserver and volume group(s) 423. For example, management kernel agent components 222-1, 222-2, and 222-3 as group members of one or more distributed groups, may receive join request via their respective transaction manager component 204-1, 204-2, and 204-3 from the management kernel agent component 222-4 to join the one or more distributed groups, such as, for example, distributed Vserver group managing Vserver 120-1 and/or distributed volume groups managing volumes 116-1, 116-2, and 116-3.

At time $t_9$, MKA 222-4 of cluster node 104-4 may 1) acquire volume configuration information including mapped LUN(s) for volume(s), and 2) provide to SCSI-T 224-4 volume configuration information including mapped LUN(s) for volume(s) 424. For example, management kernel agent component 222-4 may acquire volume configuration information for each successfully joined volume group managing the volume(s) (e.g., volumes 116-1, 116-2, and 116-3), the volume configuration information may include, without limitation, LUN(s) (e.g., LUNs 106-1, 106-2, and 106-3) that are mapped to iGroup(s) (e.g., iGroup 162-1) of Vserver(s) (e.g., Vserver 120-1) for the volume(s) (e.g., volumes 116-1, 116-2, and 116-3). The management kernel agent component 222-4 may then provide or seed the volume configuration information for volume(s) to SCSI-T component 224-4. Moreover, the management kernel agent component 222-4 may provide mapped LUN(s) (e.g., LUNs 106-1, 106-2, and 106-3) for volume(s) (e.g., volumes 116-1, 116-2, and 116-3) to SCSI-T component 224-4 so that the SCSI-T component 224-4 may request to join one or more LU group(s) associated with the mapped LUN(s).

At time $t_{10}$, SCSI-T 224-4 of cluster node 104-4 may request to join LU group(s) for mapped LUN(s) included in the volume configuration information 425. For example, SCSI-T component 224-4 may request to join distributed LU group(s) for mapped LUN(s) (e.g., LUNs 106-1, 106-2, and 106-3) included in the volume configuration information provided by management kernel agent component 224-4. Moreover, the SCSI-T component 224-4 may request to join distributed LU group(s) managing LUN(s) (e.g., LUNs 106-1, 106-2, and 106-3) hosted, owned, and/or managed by cluster nodes 104-1, 104-2, and 104-3 and mapped to iGroup(s) (e.g., iGroup 162-1) of Vserver(s) (e.g., Vserver 120-1).

Figure 4D:
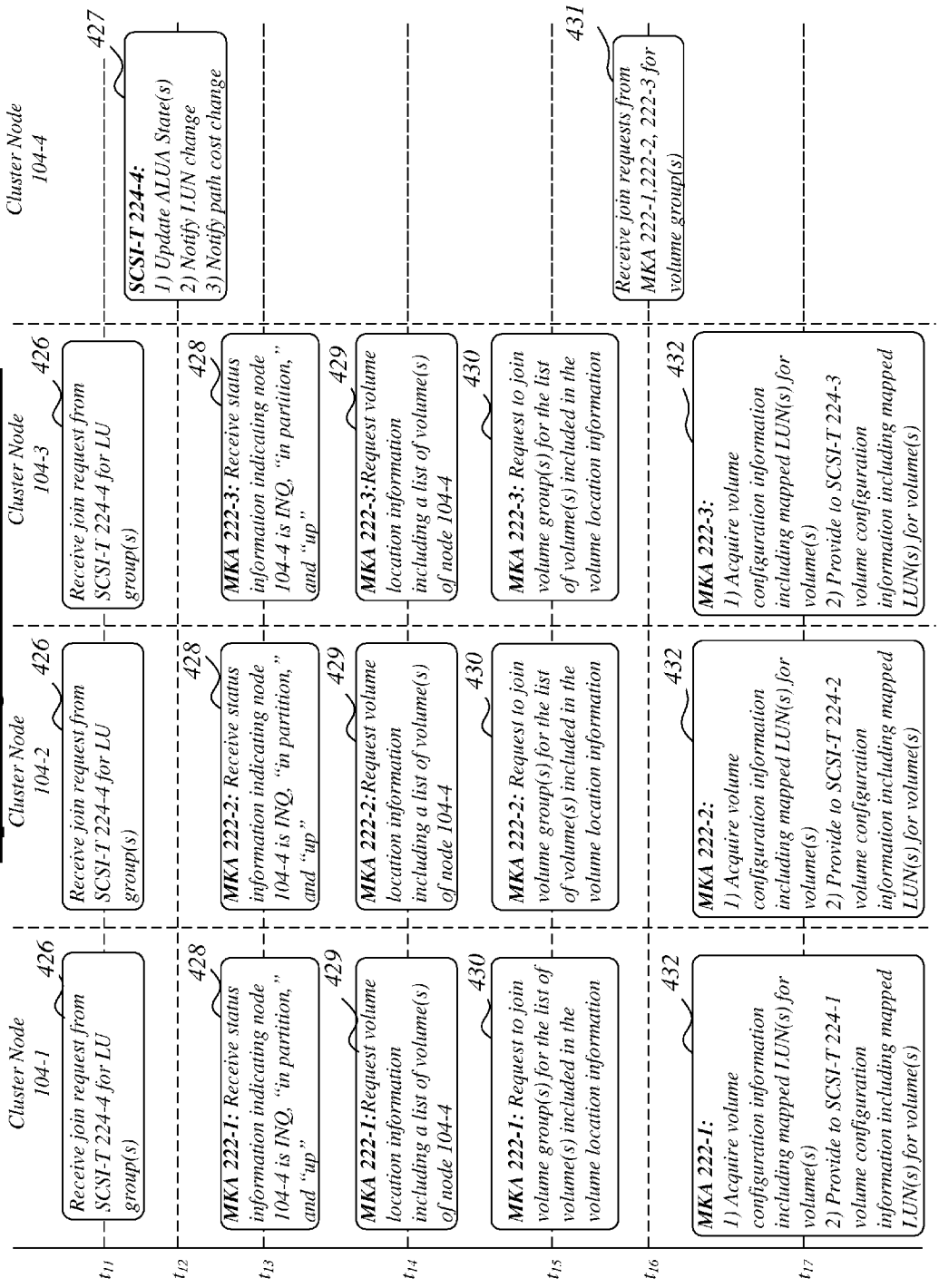
FIG. 4D illustrates another continuation of the operating environment in the non-disruptive cluster storage system during an interconnect recovery.

FIG. 4D illustrates a continuation of the embodiment of the operating environment 400 for the non-disruptive cluster storage system 175 starting at time $t_{11}$. At time $t_{11}$, cluster nodes 104-1, 104-2, and 104-3 may receive join requests from SCSI-T component 224-4 for LU group(s) 426. For example, SCSI-T components 224-1, 224-2, and 224-3 as group members of one or more distributed groups, may receive join requests via the respective transaction manager components 204-1, 204-2, and 204-3, from SCSI-T component 224-4 to join one or more distributed LU groups managing LUNs 106-1, 106-2, and 106-3.

At time $t_{12}$, SCSI-T 224-4 of cluster node 104-4 may 1) update ALUA state(s), 2) notify LUN change, and 3) notify path cost change 427. For example, the SCSI-T component 224-4 may update ALUA access state(s) for LIFs 160-1, 160-2, 160-3, and 160-4 with respect to LUNs 106-1, 106-2, 106-3, and 106-4 based on the quorum status information provided by the cluster quorum manager component 206-4 via the event manager component 240-4, the volume access state information stored, updated, and/or provided by the management kernel agent component 222-4, and/or cached volume location information stored, updated, and/or provided by the respective BII component 228-4, as previously discussed. The SCSI-T component 224-4 may notify hosts 102 of a LUN change indicating a LUN inventory update and that one or more LUNs on one or more LIFs has now become accessible through one or more A/O paths and/or A/NO paths utilizing, for example, the SCSI protocol (e.g., set U/A to RLDHC on the I_T) as previously discussed. Further, SCSI-T component 224-4 may also notify the hosts 102 of path cost change indicating that one or more ALUA access states has been changed and/or updated utilizing, for example, SCSI protocol (e.g., set U/A to AASC on I_T_L) as previously discussed.

At time $t_{13}$, MKA 222-1, 222-2, and 222-3 of cluster nodes 104-1, 104-2, 104-3, and 104-4 may receive status information indicating node 104-4 is INQ, "in partition," and "up" 428. For example, management kernel agent components 222-1, 222-2, and 222-3 may receive quorum status information from respective event manager components 240-1, 240-2, and 240-3, the quorum status information may include, without limitation, quorum state information indicating cluster node 104-4 is INQ, connectivity state information indicating that the cluster node 104-4 is "in partition," and operational state information indicating that the cluster node is 104-4 is "up."

At time $t_{14}$, MKA 222-1, 222-2, and 222-3 of cluster nodes 104-1, 104-2, and 104-3, respectively, may request volume location information including a list of volume(s) of node 104-4 429. For example, the management kernel agent components 222-1, 222-2, and 222-3 may request volume location information including a list of volume(s) residing on and/or managed by cluster node 104-4 (e.g., volume 116-4) from BII components 228-1, 228-2, and 228-3, respectively.

At time $t_{15}$, MKA 222-1, 222-2, and 222-3 of cluster nodes 104-1, 104-2, and 104-3, respectively, may request to join volume group(s) for the list of volume(s) included in the volume location information 430. For example, the management kernel agent components 222-1, 222-2, and 222-3 may request to join distributed volume group(s) for the list of volume(s) included in the volume location information and received from BII components 228-1, 228-2, and 228-3. Moreover, the management kernel agent components 222-1, 222-2, and 222-3 may request to join distributed volume group(s) managing volume(s) (e.g., volume 116-4) contained in the list of volume(s) that are hosted, owned, and/or managed by cluster node 104-4.

At time $t_{16}$, cluster node 104-4 may receive join requests from MKA 222-1, 222-2, and 222-3 for volume group(s) 431. For example, management kernel agent component 222-4 as a group member of one or more distributed groups, may receive join requests, via the transaction manager component 204-4, from the management kernel agent components 222-1, 222-2, and 222-3 to join distributed volume group(s) managing volume(s) (e.g., volume 116-4) hosted, owned and/or managed by cluster node 104-4.

At time $t_{17}$, MKA 222-1, 222-2 and 222-3 of cluster nodes 104-1, 104-2, and 104-3 may 1) acquire volume configuration information including mapped LUN(s) for volume(s) and 2) provide to SCSI-T 224-1, SCSI-T 224-2, and 224-3 volume configuration information including mapped LUN(s) for volume(s) 432. For example, management kernel agent components 222-1, 222-2, and 222-3 may acquire volume configuration information for each successfully joined distributed volume group managing the volume(s) (e.g., volume 116-4). The management kernel agent components 222-1, 222-2, and 222-3 may then provide or seed the volume configuration information for volume(s) (e.g., volume 116-4) to SCSI-T components 224-1, 224-2, and 224-3, respectively, the volume configuration information may include, without limitation, LUN(s) (e.g., LUN 106-4) that are mapped to iGroup(s) (e.g., iGroup 162-1) of Vserver(s) (e.g., Vserver 120-1) for volume(s) (e.g., volume 116-4). Moreover, the management kernel agent components 222-1, 222-2, and 222-3 may provide mapped LUN(s) (e.g., LUN 106-4) to SCSI-T components 224-1, 224-2, and 224-3 so that the SCSI-T components 224-1, 224-2, and 224-3 may request to join one or more LU distributed group(s) associated with the LUN(s).

Figure 4E:
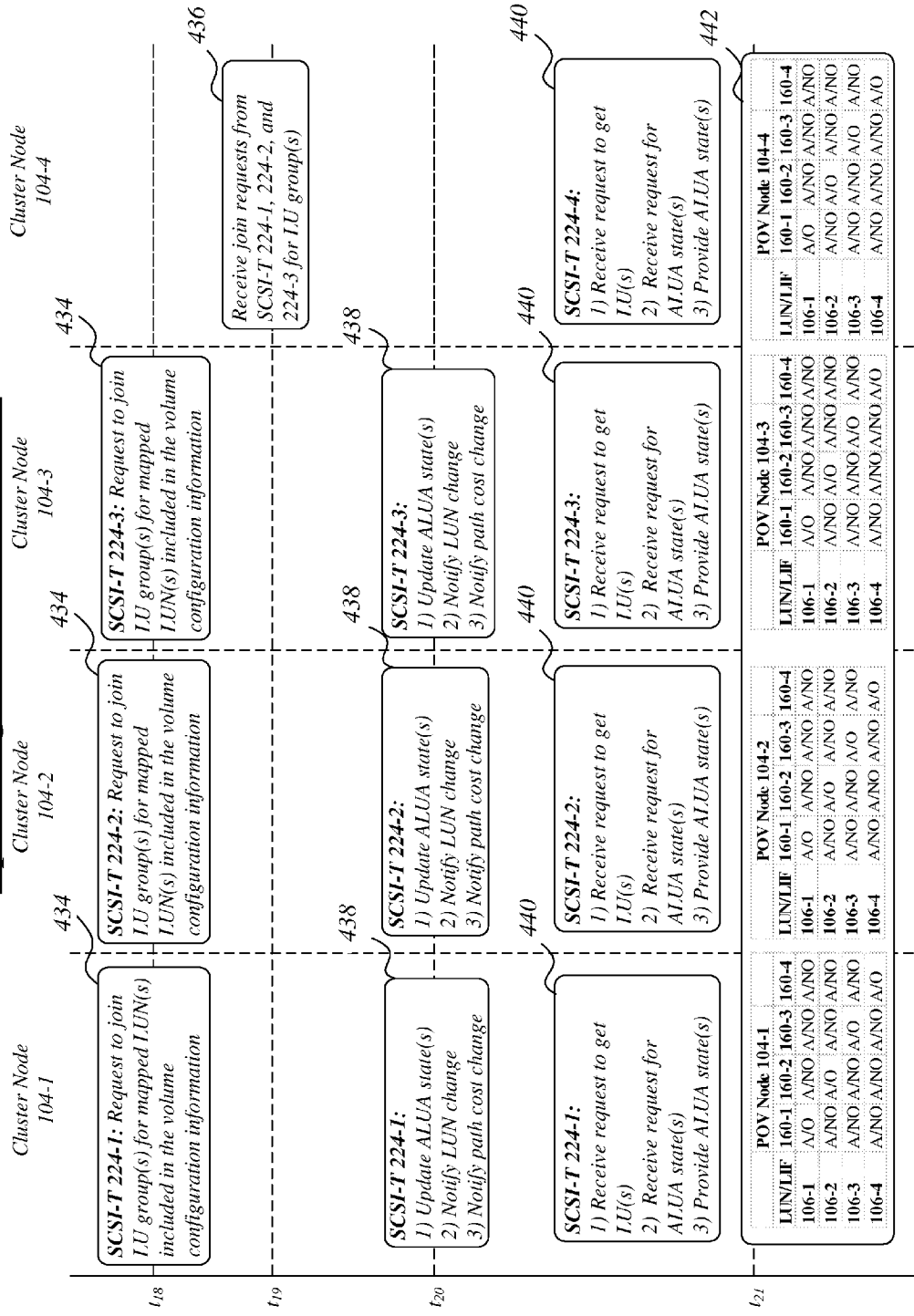
FIG. 4E illustrates yet another continuation of the operating environment in the non-disruptive cluster storage system during an interconnect recovery.

FIG. 4E illustrates a continuation of the embodiment of the operating environment 400 for the non-disruptive cluster storage system 175 starting at time $t_{18}$. At time $t_{18}$, SCSI-T 224-1, 224-2, and 224-3 of cluster nodes 104-1, 104-2, and 104-3, respectively, may request to join LU group(s) for mapped LUN(s) included in the volume configuration information 434. For example, SCSI-T components 224-1, 224-2, and 224-3 may request to join distributed LU group(s) for mapped LU(s) included in the volume configuration information provided by management kernel agent components 224-1, 224-2, and 224-3. Moreover, the SCSI-T components 224-1, 224-2, and 224-3 may request to join distributed LU group(s) managing LUN(s) (e.g., LUN 106-4) that are hosted, owned, and/or managed by cluster node 104-4 and mapped to iGroup(s) (e.g., iGroup 162-1) of Vserver(s) (e.g., Vserver 120-1).

At time $t_{19}$, cluster node 104-4 may receive join requests from SCSI-T components 224-1, 224-2, and 224-3 for LU group(s) 436. For example, SCSI-T components 224-4 as a group member of one or more distributed groups, may receive join request via the transaction manager component 204-4 from the SCSI-T components 224-1, 224-2, and 224-3 to join distributed LU group(s) managing LUN(s) (e.g., a distributed LU group managing LUN 106-4) hosted, owned, and/or managed by cluster node 104-4.

At time $t_{20}$, SCSI-T 224-1, 224-2, and 224-3 of cluster nodes 104-1, 104-2, and 104-3 may 1) notify LUN change, 2) notify path cost change 438. For example, the SCSI-T components 224-1, 224-2, and 224-3 may update ALUA access state(s) for LIFs 160-1, 160-1, 160-2, 160-3, and 160-4 with respect to LUNs 106-1, 106-2, 106-3, and 106-4 from their respective POVs based on the quorum status information provided by the respective cluster quorum manager components 206-1, 206-2, and 206-3 via the respective event manager components 240-1, 240-2, and 240-3, the volume access state information stored, updated, and/or provided by the respective management kernel agent components 222-1, 222-2, and 222-3, and/or cached volume location information stored, updated, and/or provided by the respective BII components 228-1, 228-2, and 228-3, as previously discussed. The SCSI-T components 224-1, 224-2, and 224-3 may further notify one or more hosts 102 of a LUN change indicating a LUN inventory update and that one or more LUNs on one or more LIFs has now become accessible through one or more A/O paths and/or A/NO paths utilizing, for example, the SCSI protocol (e.g., set U/A to RLDHC on the I_T) as previously discussed. Further, SCSI-T components 224-1, 224-2, and 224-3 may also notify the one or more hosts 102 of path cost change indicating that one or more ALUA access states has been changed and/or updated utilizing, for example, SCSI protocol (e.g., set U/A to AASC on I_T_L) as previously discussed.

At time $t_{21}$, SCSI-T components 224-1, 224-2, 224-3, and 224-4 of cluster nodes 104-1, 104-2, 104-3, and 104-4 may 1) receive request to get LU(s), 2) receive request for ALUA state, and 3) provide ALUA state(s) 440. For example, SCSI-T components 224-1, 224-2, 224-3, and 224-4 of cluster nodes 104-1, 104-2, 104-3, and 104-4 may receive requests from host(s) to retrieve or get the latest LU(s) inventory. To retrieve or get the latest LU(s) inventory utilizing SCSI protocol, host(s) (e.g., host 102-1) may send a REPORT_LUN request. Additionally, SCSI-T components 224-1, 224-2, 224-3, and 224-4 of cluster nodes 104-1, 104-2, 104-3, and 104-4 may also receive request for updated and/or latest ALUA access state(s) and in response, provide the updated and/or latest ALUA access state(s) as illustrated in ALUA access state table 442. Moreover, from POV of cluster nodes 104-1, 104-2, and 104-3, access to LUN 106-4 is now possible through LIFs 160-1, 160-2, and 160-3 utilizing one or more A/NO paths. From POV of cluster node 104-4 access to LUNs 106-1, 106-2, and 16-3 through LIF 160-4 is also now possible utilizing one or more A/NO paths. Additionally, from POV of cluster node 104-4 access to LUNs 106-1, 106-2, and 106-3, through LIFs 160-1, 160-2, and 160-3, is also now possible utilizing one or more A/O paths and/or A/NO paths. Accordingly, as a result of the interconnect recovery 402, host(s) (e.g., host 102-1) can now access any of the LUNs 106-1, 106-2, 106-3, and 106-4 through any of the LIFs 160-1, 160-2, 160-3, and 160-4.

Figure 5A:
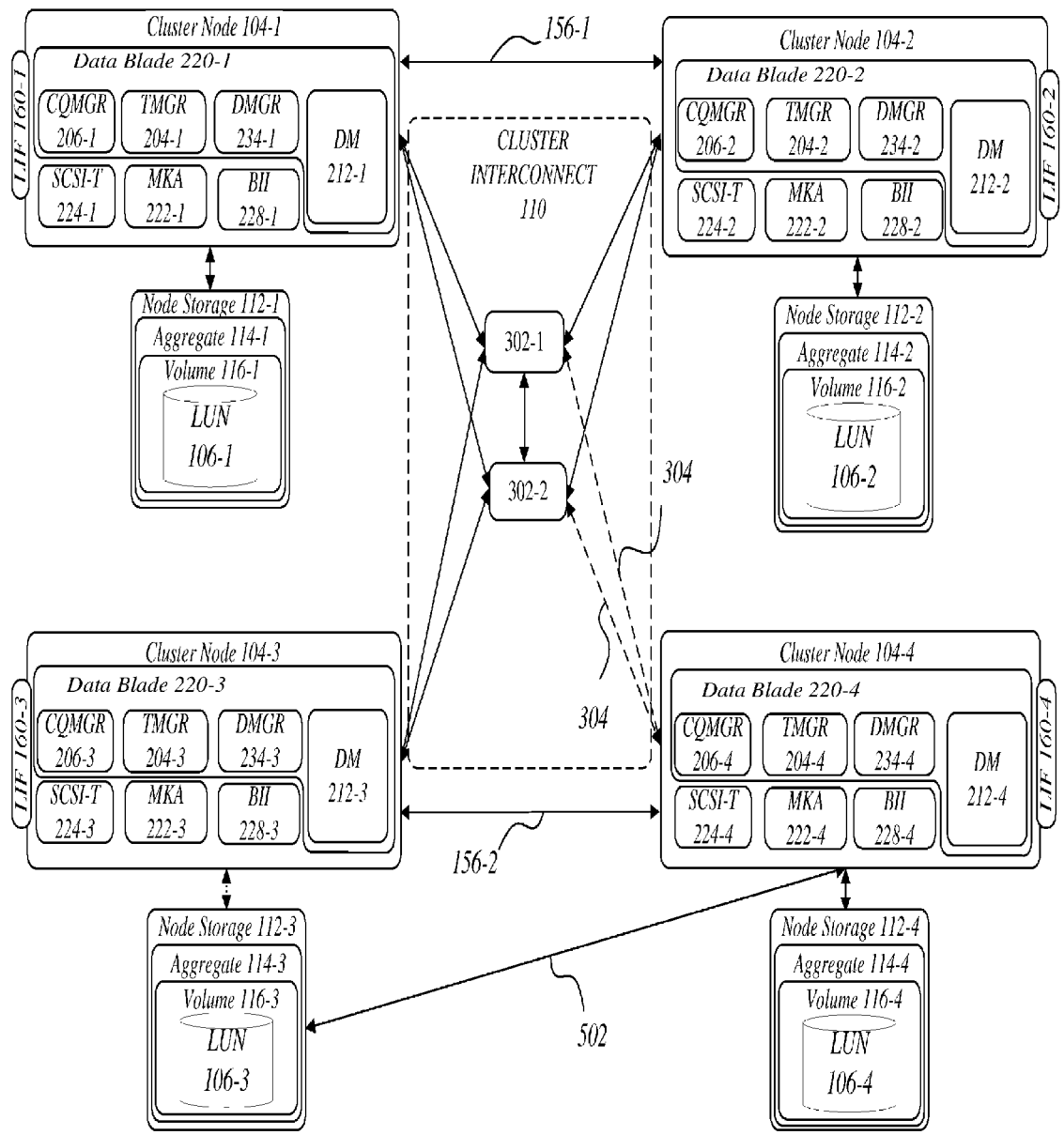
FIG. 5A illustrates an embodiment of a data mobility event and interconnect failure in the non-disruptive cluster storage system.

FIG. 5A illustrates an embodiment of the non-disruptive cluster storage system 175, when a cluster interconnect failure 304 occurs while a data mobility event 502 occurs that relocates a storage unit from cluster node 104-3 (i.e., the source cluster node 104-3) to cluster node 104-4 (i.e., destination cluster node 104-4) via the high availability interconnect 156-2 and/or cluster interconnect 110. In the non-disruptive cluster storage system 175, cluster nodes 104-1, 104-2, 104-3 and 104-4 may be interconnected via the cluster interconnect 110. During the cluster interconnect failure 304, which may be a transient interconnect failure, source cluster node 104-4 may become an isolated cluster node, and may begin transitioning from the same partition (e.g., a majority partition) as cluster nodes 104-1, 104-2, and 104-3 into its separate partition (e.g., a minority partition). A data mobility event 502 relocating storage unit(s) such as, for example, the aggregate 114-3, volume 116-3, and/or LUN 106-3 from the source cluster node 104-3 to the destination cluster node 104-4 may also occur during the interconnect failure 304. It may be appreciated that during the interconnect failure 304, while the cluster 150 may be logically partitioned into a majority partition and minority partition, the data mobility event 502 may still be able to proceed and complete. Additionally or alternatively, the data mobility event 502 may have started and is in progress before the interconnect failure 304 occurred and is concluding afterwards.

Figure 5B:
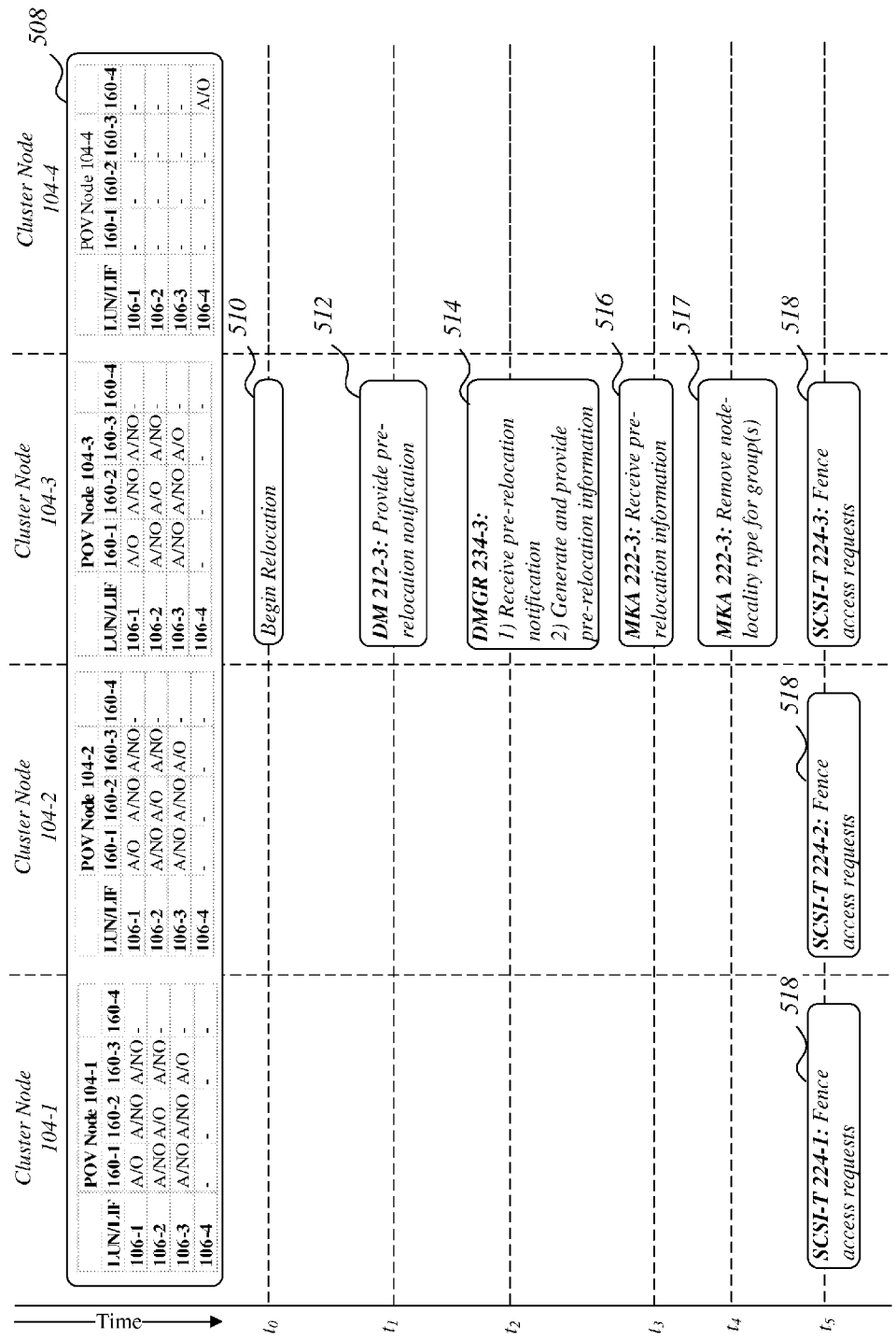
FIG. 5B illustrates a first operating environment in the non-disruptive cluster storage system during a data mobility event and an interconnect failure.

FIG. 5B illustrates an embodiment of an operating environment 500 for the non-disruptive cluster storage system 175. The operating environment 500 illustrates operations of the cluster nodes 104-1, 104-2, 104-3, and 104-4 and one or more components of the cluster 104-1, 104-2, 104-3, and 104-4 when cluster interconnect fails 304 and a data mobility event 502 that relocates the aggregate 114-3, volume 116-3 and/or LUN 106-3 from source cluster node 104-3 to destination cluster node 104-4.

As shown in FIG. 5A, the ALUA access states from the point of view (POV) of cluster nodes 104-1 and 104-2, and source cluster node 104-3 and destination cluster node 104-4 during the cluster interconnect failure 304 are as illustrated in the ALUA access states table 508. Moreover, from POV of cluster nodes 104-1, 104-2, and 104-3, LUN 106-4 is not reported (-), and any access request to LUN 106-4 through LIF 160-1, LIF 160-2 and LIF 160-3, may not be supported. Additionally, because destination cluster node 104-4 has become isolated, the ALUA access states for LIF 160-4 from POV of cluster nodes 104-1, 104-2, and 104-3 may not be reported (-) for LUNs 106-1, 106-2, and 106-3. From POV of destination cluster node 104-4 for LIF 160-4, LUNs 106-1, 106-2, and 106-3 are not reported (-) and as such, any access request to LUNs 106-1, 106-2, and 106-3 through LIF 160-4 may not be supported. Additionally, because destination cluster node 104-4 may be isolated, the ALUA access states from POV of destination cluster node 104-4 for LIF 160-1, 160-2, and 160-3 may not be reported (-) for LUNs 106-1, 106-2, 106-3, and 106-4. It may be appreciated that while access to LUN 106-4 may no longer be possible via LIF 160-1, 160-2, and 160-3, the host(s) (e.g., host 102-1) utilizing an MPIO component (e.g., MPIO component 166-1) may still access data stored in LUN 160-4 through LIF 160-4 because it remains as an A/O path for a host to access LUN 160-4.

At time $t_0$, source cluster node 104-3 may begin relocation 510. For example, data mobility component 212-3 (i.e., aggregate relocate component, volume relocate component, and/or LUN relocate component of cluster node 104-3) may begin moving storage unit(s) (e.g., aggregate 114-3, volume 116-3, and/or LUN 106-3) from source cluster node 104-3 to destination cluster node 104-4 during an interconnect failure 304 in the cluster interconnect 110.

At time $t_1$, DM 212-3 of source cluster node 104-3 may provide pre-relocation notification 512. For example, data mobility component 212-3 may provide to the disk manager component 234-3 a pre-relocation notification (e.g., a PRE-COMMIT notification) indicating that storage unit(s) (e.g., aggregate 114-3, volume 116-3, and/or LUN 106-3) are relocating to the destination cluster node 104-4.

At time $t_2$, DMGR 234-3 of source cluster node 104-3 may 1) receive a pre-relocation notification and 2) generate and provide pre-relocation information 514. For example, the disk manager component 234-3 may receive the pre-relocation notification (e.g., a PRE-COMMIT notification) from data mobility component 212-3 indicating the storage unit(s) (e.g., aggregate 114-3, volume 116-3, and/or LUN 106-3) that are relocating from source cluster node 104-3 to the destination cluster node 104-4. In response, the disk manager component 234-3 may generate pre-relocation information, which may include, without limitation, a list of relocating storage unit(s) (e.g., a list of volume(s) which may include, without limitation, volume 116-3 containing LUN 106-3), an identifier associated with the Data Blade component 220-3 of the source cluster node 104-3, and/or an identifier associated with the Data Blade component 220-4 of the destination cluster node 104-4. Additionally, the disk manager component 234-3 may provide the pre-relocation information to one or more components of cluster node 104-3.

At time $t_3$, MKA 222-3 of cluster node 104-3 may receive the pre-relocation information 516. For example, the management kernel agent component 222-3 may receive the pre-relocation information which may include, without limitation, the list of relocating storage unit(s). Moreover, the list of relocating storage unit(s) may include, without limitation, a list of relocating volume(s) (e.g., volume 116-3) that is being relocated from source cluster node 104-3 to destination cluster node 104-4.

At time $t_4$, MKA 222-3 of cluster node 104-3 may remove node-locality type attribute for group(s) 517. For example, the management kernel agent component 222-3 may remove the node-locality (i.e., super member) type attribute 266 from one or more distributed groups managing one or more relocating storage units (e.g., volume 116-3) being relocated from source cluster node 104-3 to destination cluster node 104-4 based on the pre-relocation information because source cluster node 104-3 will not continue to host, own, and/or manage one or more relocating storage units. Additionally, any transactions associated with transaction manager 204-3 requiring the one or more relocating storage unit(s) (e.g., volume 116-3) will now begin to fail.

At time $t_5$, SCSI-T components 224-1, 224-2, and 224-3 of cluster nodes 104-1 and 104-2, and source cluster node 104-3 may fence access requests 518. For example, the SCIS-T components 224-1, 224-2, and 224-3 may fence any access requests for one or more LUNs (e.g., LUN 106-3) of one or more volumes (e.g., volume 116-3) being relocated. Moreover, to fence access to the host(s) (e.g., host 102-1) for one or more LUNs of one or more volumes being relocated utilizing SCSI protocol, SCSI-T components 224-1, 224-2, and 224-3 may set TEST_UNIT_READY (TUR) to return TRANSITIONING (e.g., asymmetric access state transition (AAST)) so that SCSI-T components 224-1, 224-2, and 224-3 may prevent media access to LUNs (e.g., LUN 106-3) by responding to all media access commands from hosts with TRANSITIONING (e.g., asymmetric access state transition (AAST)).

Figure 5C:
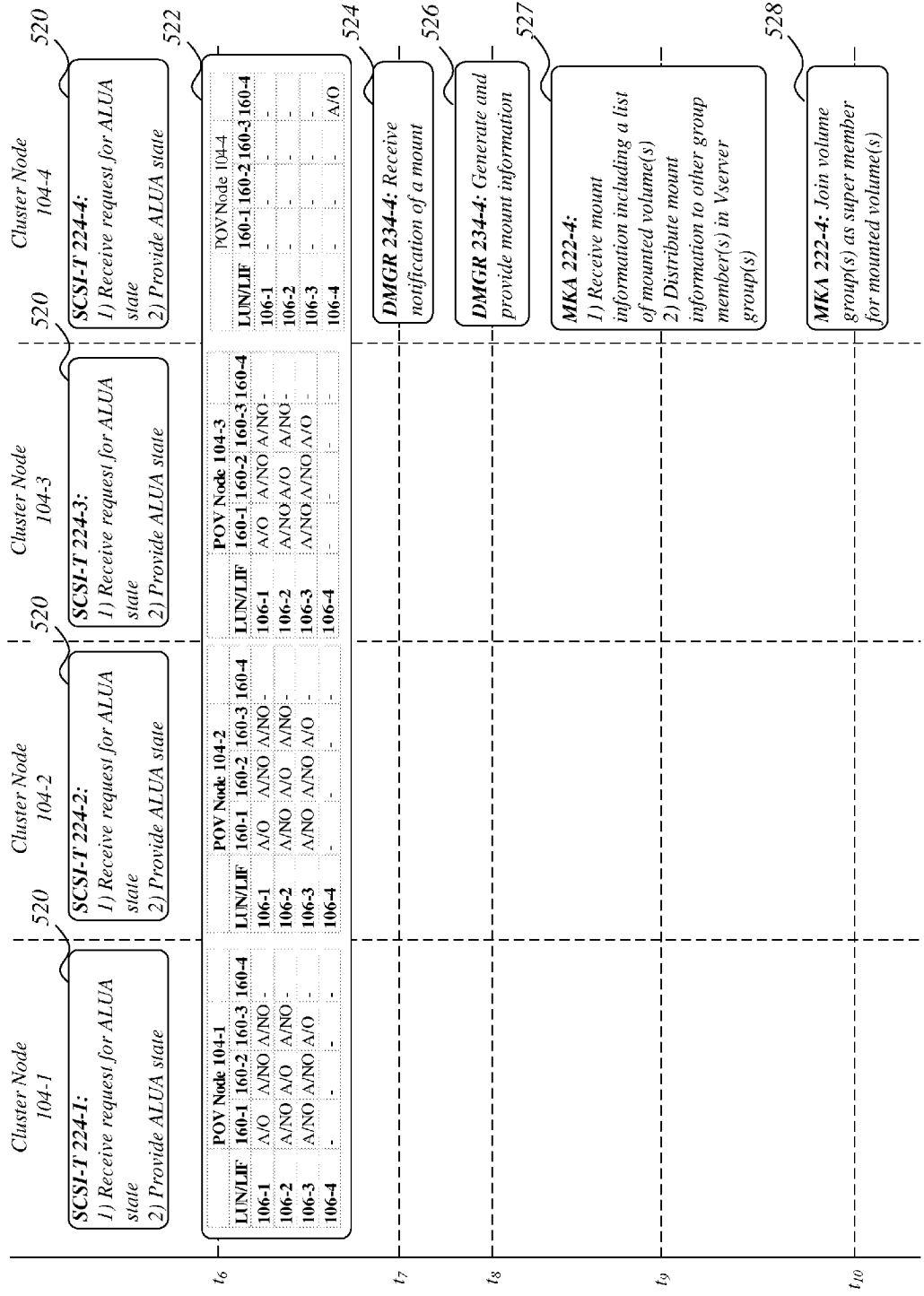
FIG. 5C illustrates a continuation of the first operating environment during the data mobility event and the interconnect failure.

FIG. 5C illustrates a continuation of the embodiment of the operating environment 500 for the non-disruptive cluster storage system 175 starting at time $t_6$. At time $t_6$, SCSI-T 224-1, 224-2, 224-3, and 224-4 of cluster nodes 104-1, 104-2, 104-3, and 104-4 may 1) receive request for ALUA state(s) and 2) provide ALUA state(s) 520. For example, SCSI-T components 224-1, 224-2, 224-3, and 224-4 of cluster nodes 104-1, 104-2, 104-3, and 104-4 may receive requests for updated and/or latest ALUA access state(s) and provide updated and/or latest ALUA access state(s) as illustrated in ALUA access state table 522. From POV of cluster nodes 104-1, 104-2, 104-3, and 104-4 all ALUA access states continues to remain the same.

At time $t_7$, DMGR 234-4 of destination cluster node 104-4 may receive notification of a mount 524. For example, disk manager component 234-4 may receive notification from storage interface component 232-4 (not shown) of the destination cluster node 104-4 that one or more storage units (e.g., volume 116-3) has been mounted and as such, the one or more storage units (e.g., volume 116-3) are now being hosted, owned, and/or managed by the destination cluster node 104-4.

At time $t_8$, DMGR 234-4 of destination cluster node 104-4 may generate and provide mount information 526. For example, in response to receiving notification of a mount, the disk manager component 234-4 may generate the mount information which may include, without limitation, a list of relocated storage unit(s), an associated identifier of the Data Blade component 220-3 of the source cluster node 104-3, and/or an associated identifier of the Data Blade component 220-4 of the destination cluster node 104-4. The list of relocated storage unit(s) may include, without limitation, a list of volume(s) (e.g., volume 116-3) that is now under ownership and/or management of cluster node 104-4. Additionally, the disk manager component 234-4 may also provide the mount information to one or more components (e.g., management kernel agent component 222-4) of one or more cluster nodes (e.g., cluster node 104-4) to indicate the availability of relocated volume(s) (e.g., volume 116-3).

At time $t_9$, MKA 222-4 of destination cluster node 104-4 may 1) receive information including a list of mounted volume(s), and 2) distribute mount information to other group member(s) in Vserver group(s) 527. For example, management kernel agent component 222-4 may receive the mount information from the disk manager component 234-4, the mount information may include, without limitation, a list of relocated volume(s) that have been mounted (e.g., volume 116-3) and is now "available" at the destination cluster node 104-4. In response, the management kernel agent component 222-3 may optionally distribute the mount information to other group member(s) (e.g., other management kernel agent components 222 of other cluster nodes 104, in the same majority partition as cluster node 104-4) in Vserver group(s) (e.g., Vserver group for Vserver 120-1) utilizing one or more transactions (e.g., an informative proposal transaction) for cluster nodes 104 that may also be involved in the same Vserver(s) as cluster node 104-4 and as such, are group member(s) in the same Vserver group(s).

At time $t_{10}$, MKA 222-4 of destination cluster node 104-4 may join volume group(s) as super member for mounted volume(s) 528. For example, based on the mount information, the management kernel agent component 222-4 may join distributed volume group(s) as a super member for newly mounted volume(s) (e.g., volume 116-3) that has been relocated to destination cluster node 104-4 by notifying the transaction manager component 204-4 that it is a super member. It may be appreciated that the management kernel agent component 222-4, may join distributed volume group managing a newly mounted volume such as volume 116-3 as a super member because volume 116-3 has been relocated and is now hosted, owned, and/or managed by destination cluster node 104-4. It may also be appreciated that in instances when no distributed volume group(s) currently exists for the management of relocated volume(s), joining a distributed volume group for a relocated volume (e.g., volume 116-3) may also create a distributed volume group(s) for that volume (e.g., volume 116-3). For relocated volume(s) now being hosted, owned, and/or managed by a destination cluster node (e.g., cluster node 104-4), the distributed volume group(s) for those relocated volume(s) may be created with the node-locality type attribute 266 by the cluster node (e.g., cluster node 104-4) managing the one or more relocated volumes (e.g., volume 116-3). In response to joining one or more distributed volume group(s) for newly mounted volume(s), the management kernel agent component 222-4 may also acquire volume configuration information for the newly mounted volume(s). Additionally, any transactions associated with transaction manager 204-4 requiring the newly mounted relocated volume(s) will now begin to succeed.

Figure 5D:
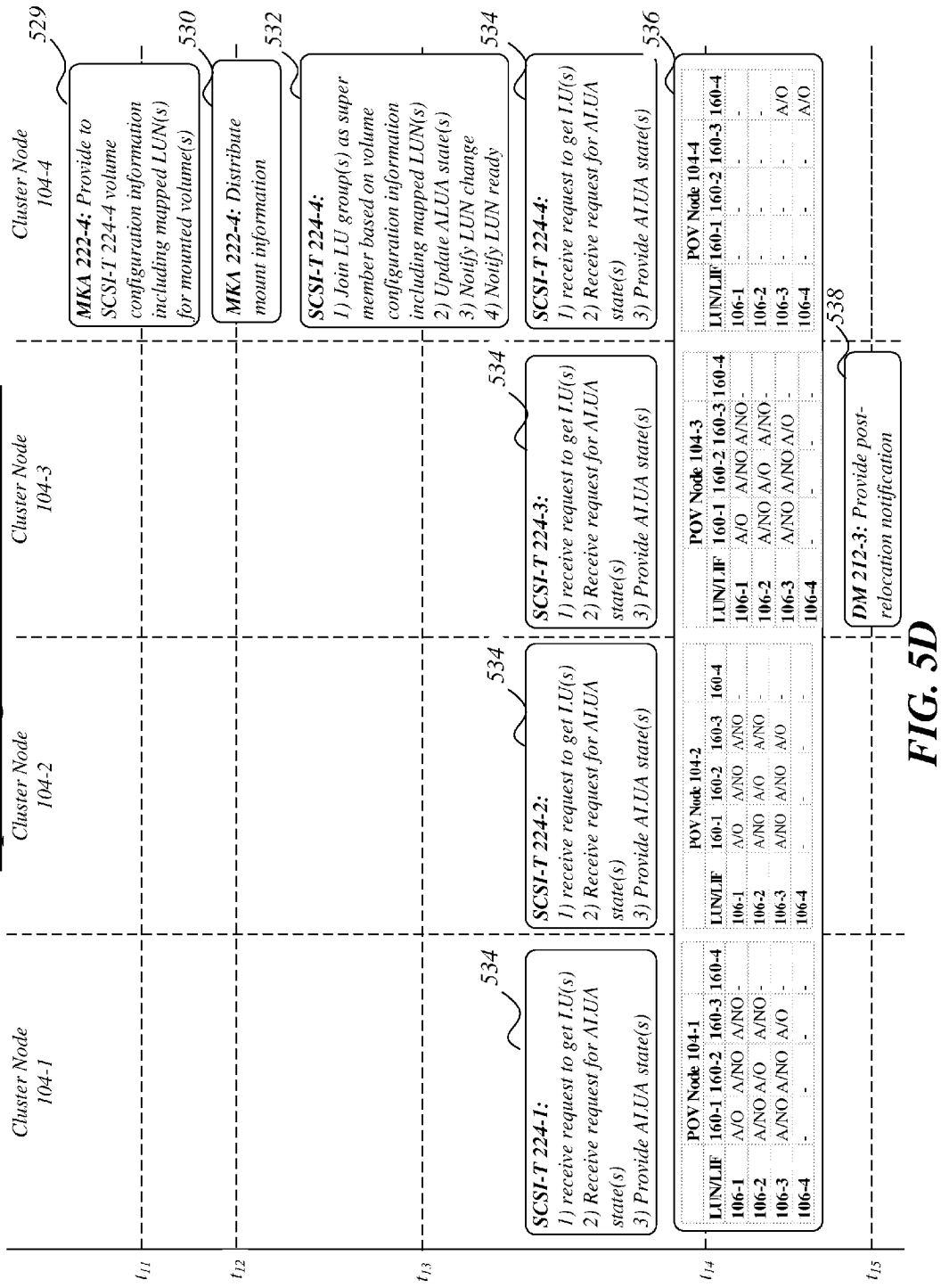
FIG. 5D illustrates another continuation of the first operating environment during the data mobility event and the interconnect failure.

FIG. 5D illustrates another continuation of the embodiment of the operating environment 500 for the non-disruptive cluster storage system 175 starting at time $t_{11}$. At time $t_{11}$, MKA 222-4 of destination cluster node 104-4 may provide to SCSI-T 224-4 volume configuration information including mapped LUN(s) for mounted volume(s) 529. For example, the management kernel agent component 222-4 may provide or seed the volume configuration information for newly mounted volume(s) to SCSI-T component 224-4, the volume configuration information may include, without limitation, LUN(s) (e.g., LUN 106-3) that are mapped to iGroup(s) (e.g., iGroup 162-1) of Vserver(s) (e.g., Vserver 120-1). Moreover, the management kernel agent component 222-4 may provide the mapped LUN(s) (e.g., LUN 106-3) for mounted volume(s) (e.g., volume 116-3) to SCSI-T component 224-4 so that the SCSI-T component 224-4 may request to join one or more distributed LU group(s) associated with the mapped LUN(s) (e.g., LUN 106-3).

At time $t_{12}$, MKA 222-4 of destination cluster node 104-4 may distribute mount information 530. For example, management kernel agent component 222-4 may distribute the mount information to one or more components of the source cluster node 104 (e.g., BII component 228-4, SCSI-T component 224-4 of source cluster node 104-4, etc.). Moreover, the management kernel agent component 222-4 may distribute the mount information so that the BII component 228-4 may at least update the cached volume location information for the one or more relocated volumes (e.g., volume 116-3) and the SCSI-T component 224-4 may update ALUA access states to provide access to host(s) (e.g., host 102-1) to the one or more LUNs (e.g., LUN 106-3) contained in the one or more relocated volumes.

At time $t_{13}$, SCSI-T component 224-4 of destination cluster node 104-4 may 1) join LU group(s) as super member based on volume configuration information including mapped LUN(s), 2) Update ALUA State(s), 3) notify LUN change, and 4) notify LUN ready 532. For example, SCSI-T component 224-4 may join distributed LU group(s) as a super member for mapped LUN(s) included in the volume configuration information of mounted volume(s) provided by management kernel agent component 224-4. To join the distributed LU group(s) for mapped LUN(s) (e.g., LUN 106-3) as a super member, SCSI-T component 224-4 may notify the transaction manager component 204-4 that it is a super member for that distributed LU group. It may be appreciated that the SCSI-T component 224-4 may join the distributed LU group managing LUN 106-3 as a super member because cluster node 104-4 now hosts, owns, and/or manages LUN 106-3 contained in the relocated volume 116-3. The SCSI-T component 224-4 may further update ALUA access state(s) for LIFs 160-1, 160-2, 160-3, and 160-4 with respect to LUNs 106-1, 106-2, 106-3, and 106-4 based on the quorum status information provided by the cluster quorum manager component 206-4 via the event manager component 240-4 (not shown), the volume access state information stored, updated, and/or provided by the management kernel agent component 222-4, and/or cached volume location information stored, updated, and/or provided by the respective BII component 228-4, as previously discussed. Additionally, SCSI-T component 224-4 may notify one or more hosts (e.g., host 102-1) of a LUN change indicating a LUN inventory update and that one or more LUNs on one or more cluster nodes 104 have now become accessible utilizing, for example, the SCSI protocol (e.g., set U/A on I_T with RLDHC and/or set U/A on I_T_L with AASC) as previously discussed. Further, SCSI-T component 224-4 may notify host(s) that one or more LUNs contained in the one or more relocated volumes are also now ready for access. For example, to notify the host(s) (e.g., host 102-1) that one or more LUNs contained in the one or more relocated volumes is now ready for access utilizing SCSI protocol, SCSI-T component 224-4 may set U/A on the I_T_L for all new LUs with POWER_ON_RESET. It may be appreciated that any transactions associated with transaction manager component 204-4 requiring the newly mounted LUN(s) (e.g., LUN 106-3) will now begin to succeed.

At time $t_{14}$, SCSI-T 224-1, 224-2, 224-3, and 224-4 of cluster nodes 104-1 and 104-2, 104-3 and 104-4 may 1) receive request to get LU(s), 2) receive request for ALUA state(s), and 3) provide ALUA state(s) 534. For example, SCSI-T components 224-1, 224-2, 224-3, and 224-4 of cluster nodes 104-1, 104-2, 104-3, and 104-4 may receive requests to get the latest LU(s) inventory, receive request for updated and/or latest ALUA access state(s) and in response, provide updated and/or latest ALUA access state(s) as illustrated in ALUA access state table 536. Moreover, from POV of destination cluster node 104-4, accessing LUN 106-3 through LIF 160-4 has now become an A/O path because one or more storage units, such as, for example, aggregate 114-3, volume 116-3, and/or LUN 106-3 has been successfully relocated to cluster node 104-4. However, since other cluster nodes 104-1, 104-2, and 104-3 has not yet been notified of the completion of the data mobility event 502, ALUA access states from POV of cluster nodes 104-1 and 104-2, and source cluster node 104-3 remain the same.

At time $t_{15}$, DM 212-3 of source cluster node 104-3 may provide post-relocation notification 538. For example, data mobility component 212-3 (i.e., aggregate relocate component, volume relocate component, and/or LUN relocate component of cluster node 104-3) may provide post-relocation notification (e.g., a POST-COMMIT notification) to disk manager component 234-3 of source cluster node 104-3.

Figure 5E:
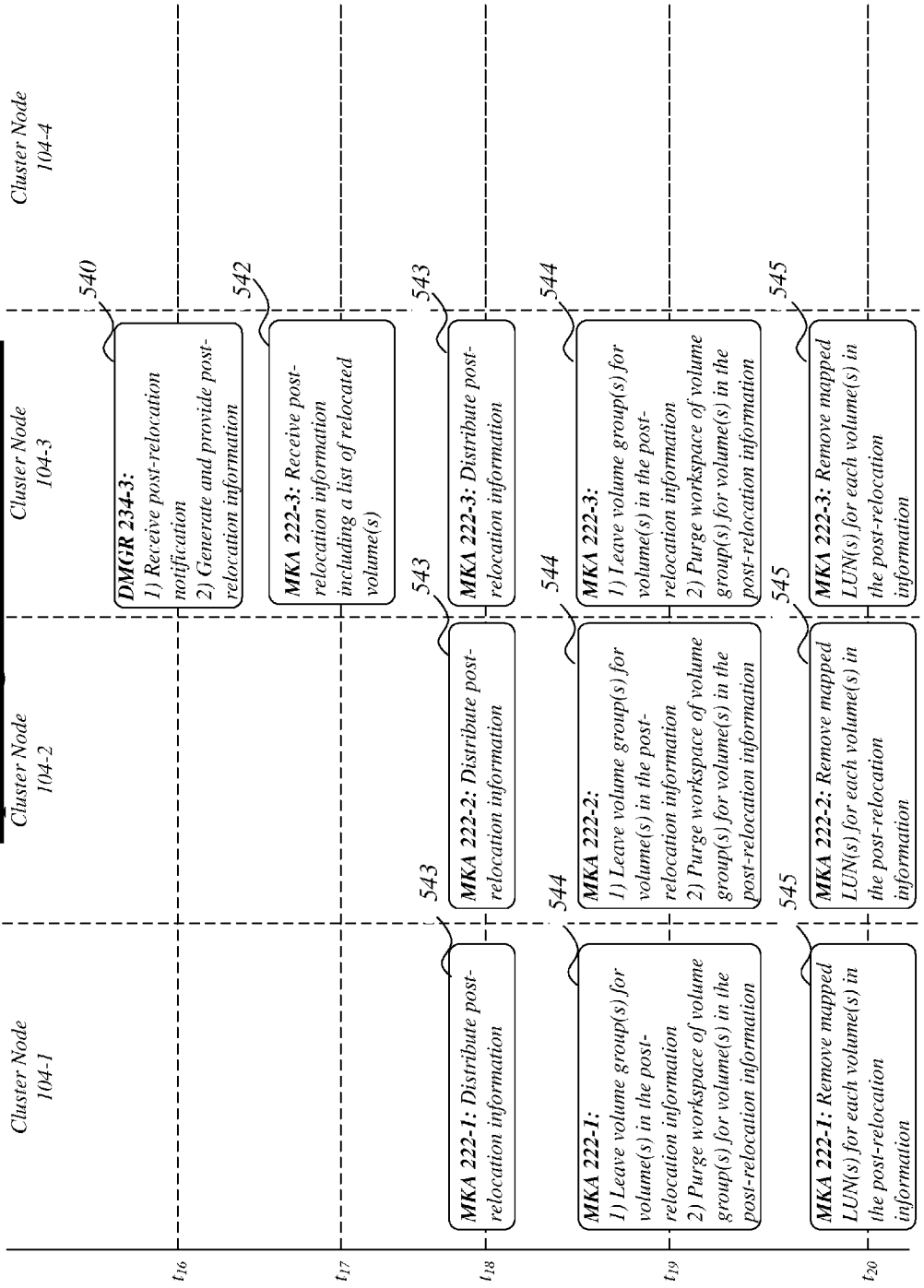
FIG. 5E illustrates yet another continuation of the first operating environment during the data mobility event and the interconnect failure.

FIG. 5E illustrates yet another continuation of the embodiment of the operating environment 500 for the non-disruptive cluster storage system 175 starting at time $t_{16}$. At time $t_{16}$, DMGR 234-3 of source cluster node 104-3 may 1) receive post-relocation notification and 2) generate and provide post-relocation information 540. For example, disk manager component 234-3 may receive post-relocation notification (e.g., a POST-COMMIT notification) from data mobility component 212-3 and in response, generate post-relocation information, which may include, without limitation, a list of relocated storage unit(s), an associated identifier of the Data Blade component 220-3 of the source cluster node 104-3, and/or an associated identifier of the Data Blade component 220-4 of the destination cluster node 104-4. The list of relocated storage unit(s) may include, without limitation, a list of relocated volume(s) (e.g., volume 116-3) that is now under ownership and/or management of destination cluster node 104-4. Additionally, the disk manager component 234-3 may also provide the post-relocation information to one or more components (e.g., management kernel agent component 222-4) of one or more cluster nodes (e.g., cluster node 104-1) to indicate the unavailability of the relocated volume(s) (e.g., volume 116-3).

At time $t_{17}$, MKA 222-3 of cluster node 104-3 may receive post-relocation information 542. For example, management kernel agent component 222-3 may receive post-relocation information from disk manager component 234-3.

At time $t_{18}$, MKA 222-1, 222-2, and 222-3 of cluster nodes 104-1 and 104-2, and source cluster node 104-3, respectively, may distribute post-relocation information 543. For example, management kernel agent components 222-1, 222-2, and 222-3 may distribute the post-relocation information to one or more components of cluster nodes 104-1 and 104-2, and source cluster node 104-3 (e.g., BII components 228-1, 228-2, and 228-3, SCSI-T components 224-1, 224-2, and 224-3, etc.). Moreover, the management kernel agent components 222-1, 222-2, and 222-3 may distribute the post-relocation information so that the BII components 228-1, 228-2, and 228-3 may at least update the cached volume location information with the one or more relocated volumes (e.g., volume 116-3) and SCSI-T components 224-

1, 224-2, and 224-3 may remove access to the one or more LUNs (e.g., LUN 106-3) contained in the one or more relocated volumes (e.g., volume 116-3).

At time $t_{19}$, MKA 222-1, 222-2, and 222-3 of cluster nodes 104-1 and 104-2, and source cluster node 104-3 may 1) leave volume group(s) for volume(s) in the post-relocation information and 2) purge workspace of volume group(s) for volume(s) in the post-relocation information 544. For example, the management kernel agent components 222-1, 222-2, and 222-3 may leave distributed volume group(s) associated with relocated volume(s) (e.g., volume 116-3) included in the post-relocation information. Additionally, the management kernel agent components 222-1, 222-2, and 222-3 may purge workspace of the distributed volume group(s) that managed relocated volume(s) (e.g., volume 116-3) included in the post-relocation information so that any configuration information associated with the relocated volume(s) (e.g., volume 116-3) may no longer be accessible and/or stored by cluster nodes 104-1 and 104-2, and source cluster node 104-3.

At time $t_{20}$, MKA 222-1, 222-2, and 222-3 of cluster nodes 104-1 and 104-2, and source cluster node 104-3 may remove mapped LUN(s) for each volume(s) in the post-relocation information 545. For example, the management kernel agent components 222-1, 222-2, and 222-3 may remove mapped LUN(s) (e.g., LUN 106-3) from SCSI-T components 224-1, 224-2, and 224-3, respectively, for each volume listed in the post-relocation information (e.g., volume 116-3).

Figure 5F:
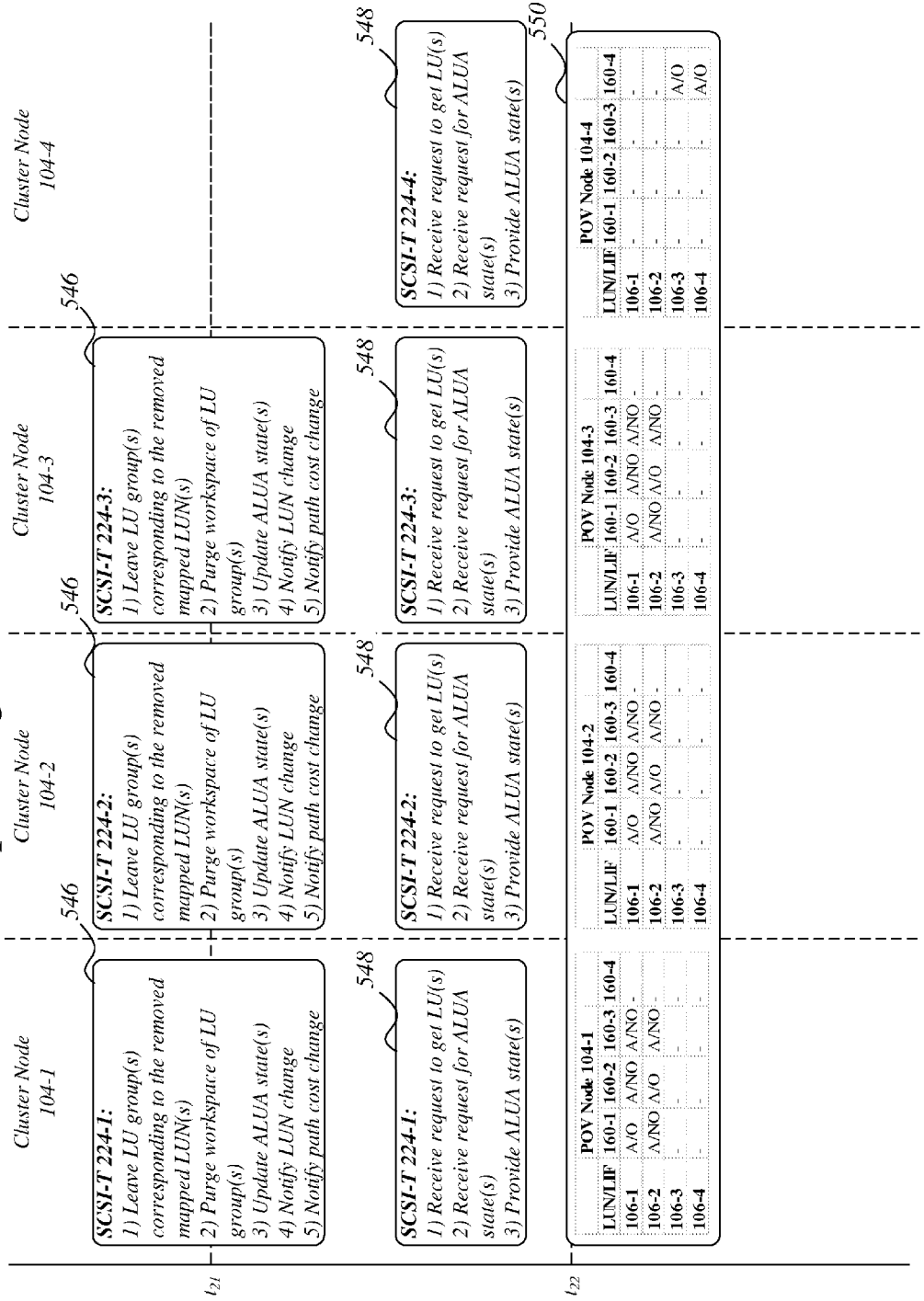
FIG. 5F illustrates yet another continuation of the first operating environment during the data mobility event and the interconnect failure.

FIG. 5F illustrates yet another continuation of the embodiment of the operating environment 500 for the non-disruptive cluster storage system 175 starting at time $t_{21}$. At time $t_{21}$, SCSI-T 224-1, 224-2, and 224-3 of cluster nodes 104-1 and 104-2, and source cluster node 104-3 may 1) leave LU group(s) corresponding to the removed mapped LUN(s), 2) purge workspace of LU group(s), 3) update ALUA state(s), 4) notify LUN change, and 5) notify path cost change 546. For example, in response to the removed mapped LUN(s), the SCSI-T components 224-1, 224-2, and 224-3 may leave distributed LU group(s) corresponding to the removed mapped LUN(s) (e.g., LUN 106-3) that were removed by management kernel agent components 222-1, 222-2, and 222-3, respectively, in order to remove access to the removed mapped LUN(s) (e.g., LUN 106-3) via LIFs 160-1, 160-2, and 160-3. Additionally, SCSI-T components 224-1, 224-2, and 224-3 may also purge workspace of the distributed LU group(s) corresponding to removed mapped LUN(s) (e.g., LUN 106-3) so that any configuration information associated with the mapped LUN(s) (e.g., LUN 106-3) may no longer be accessible and/or stored by cluster nodes 104-1 and 104-2 and source cluster node 104-3. The SCSI-T components 224-1, 224-2, and 224-3 may further update ALUA access state(s) for LIFs 160-1, 160-1, 160-2, 160-3, and 160-4 with respect to LUNs 106-1, 106-2, 106-3, and 106-4 from their respective POVs based on the quorum status information provided by the respective cluster quorum manager components 206-1, 206-2, and 206-3 via the respective event manager components 240-1, 240-2, and 240-3 (not shown), the volume access state information stored, updated, and/or provided by the respective management kernel agent components 222-1, 222-2, and 222-3, and/or cached volume location information stored, updated, and/or provided by the respective BII components 228-1, 228-2, and 228-3, as previously discussed. Furthermore, SCSI-T components 224-1, 224-2, and 224-3 may notify host(s) (e.g., host 102-1) of a LUN inventory update indicating that access to one or more LUNs on one or more LIFs has now become not reported (-) utilizing, for example, SCSI protocol (e.g., set U/A to RLDHC on the I_T) as previously discussed. In addition, SCSI-T components 224-1, 224-2, and 224-3 may also notify the host(s) (e.g., host 102-1) of path cost change indicating that one or more ALUA access states has been changed utilizing, for example, SCSI protocol (e.g., set U/A to AASC on I_T_L) as previously discussed.

At time $t_{22}$, SCSI-T 224-1, 224-2, 224-3, and 224-4 of cluster nodes 104-1, 104-2, 104-3, and 104-4 may 1) receive request to get LU(s), 2) receive request for ALUA state(s), and 3) provide ALUA state(s) 548. For example, SCSI-T 224-1, 224-2, 224-3, and 224-4 of cluster nodes 104-1, 104-2, 104-3, and 104-4 may receive requests to get the latest LU inventory, receive request for updated and/or latest ALUA access state(s), and in response, provide updated and/or latest ALUA access states as illustrated in ALUA access state table 550. Moreover, from POV of cluster node 104-4, accessing LUN 106-3 through LIF 160-4 remains as the A/O path. However, because storage unit(s) (e.g., aggregate 114-3, volume 116-3, and/or LUN 106-3) have been relocated from source cluster node 104-3 to destination cluster node 104-4 during an interconnect failure 304, the ALUA access states for LUN 160-3 from POV of cluster nodes 104-1 and 104-2 and source cluster node 104-3 have been updated to not reported (-) and accordingly, any access to LUN 106-3 through LIF 160-1, 160-2, and 160-3 will no longer be supported. It may be appreciated that host(s) (e.g., host 102-1) may continue to access LUNs 106-1 and 106-2 using A/NO paths via LIF 160-3 because source cluster node 104-3 hosting the LIF 160-3 is in same the partition (i.e., majority partition) as cluster nodes 104-1 and 104-2.

Figure 6A:
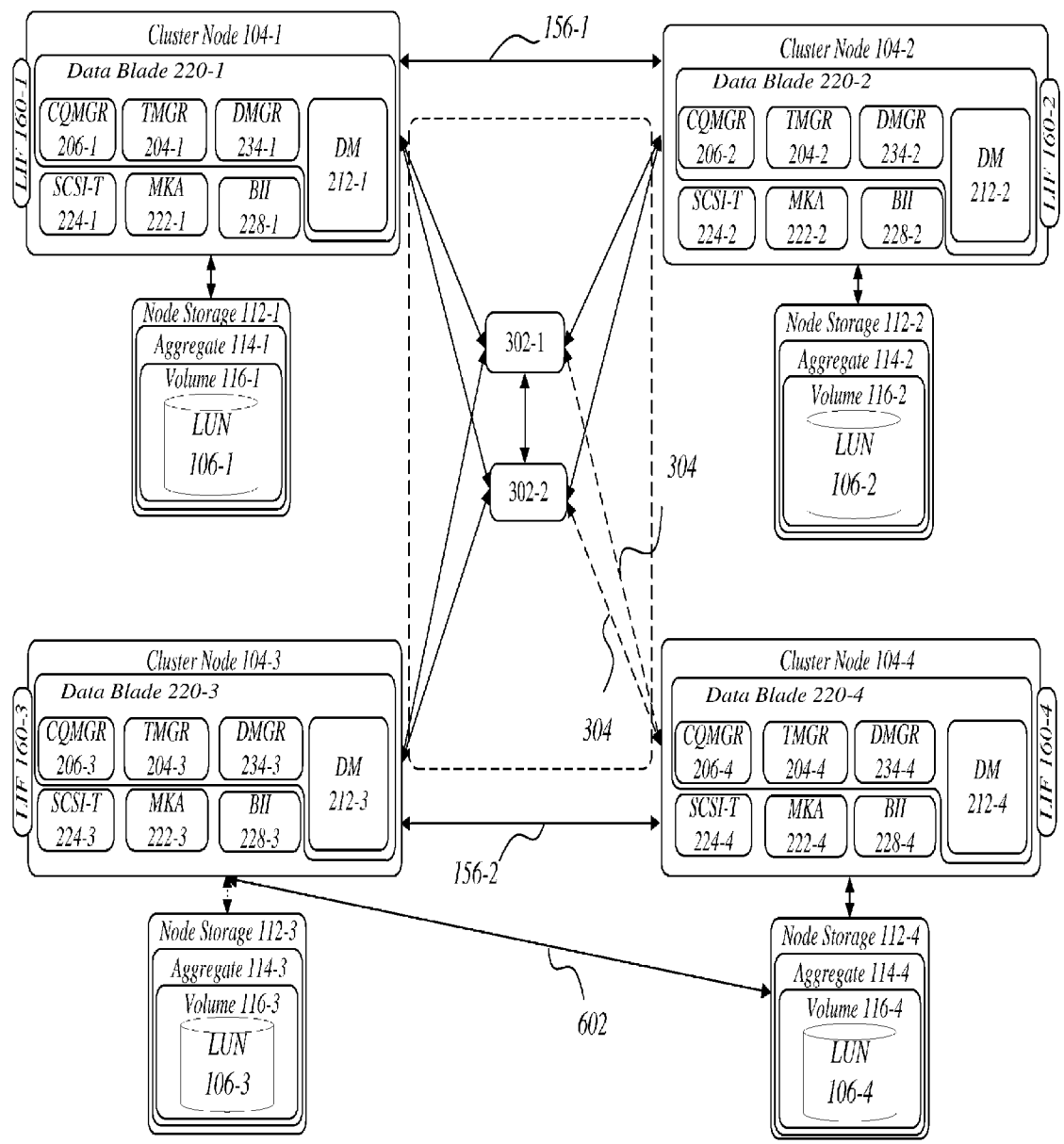
FIG. 6A illustrates another embodiment of a data mobility event and interconnect failure in the non-disruptive cluster storage system.

FIG. 6A illustrates an embodiment of the non-disruptive cluster storage system 175, when a cluster interconnect failure 304 occurs while a data mobility event 602 occurs that relocates a storage unit from cluster node 104-4 (i.e., the source cluster node 104-4) to cluster node 104-3 (i.e., the destination cluster node 104-3) via the high availability interconnect 156-2 and/or cluster interconnect 110. In the non-disruptive cluster storage system 175, cluster nodes 104-1, 104-2, 104-3, and 104-4 may be interconnected via the cluster interconnect 110. During the cluster interconnect failure 304, which may be a transient interconnect failure, source cluster node 104-4 may become an isolated cluster node, and may begin transitioning from the same partition (e.g., a majority partition) as cluster nodes 104-1, 104-2, and 104-3 into its separate partition (e.g., a minority partition). A data mobility event 602 relocating storage unit(s) such as, for example, aggregate 114-4, volume 116-4, and/or LUN 106-4 from source cluster node 104-4 to destination cluster node 104-3 may also occur during the interconnect failure 304. It may be appreciated that during such interconnect failure 304, while the cluster 150 may be logically partitioned into a majority partition and minority partition, the data mobility event 602 may still be able to proceed and complete. Additionally or alternatively, the data mobility event 602 may have started and is in progress before the interconnect failure 304 occurred and is concluding afterwards.

Figure 6B:
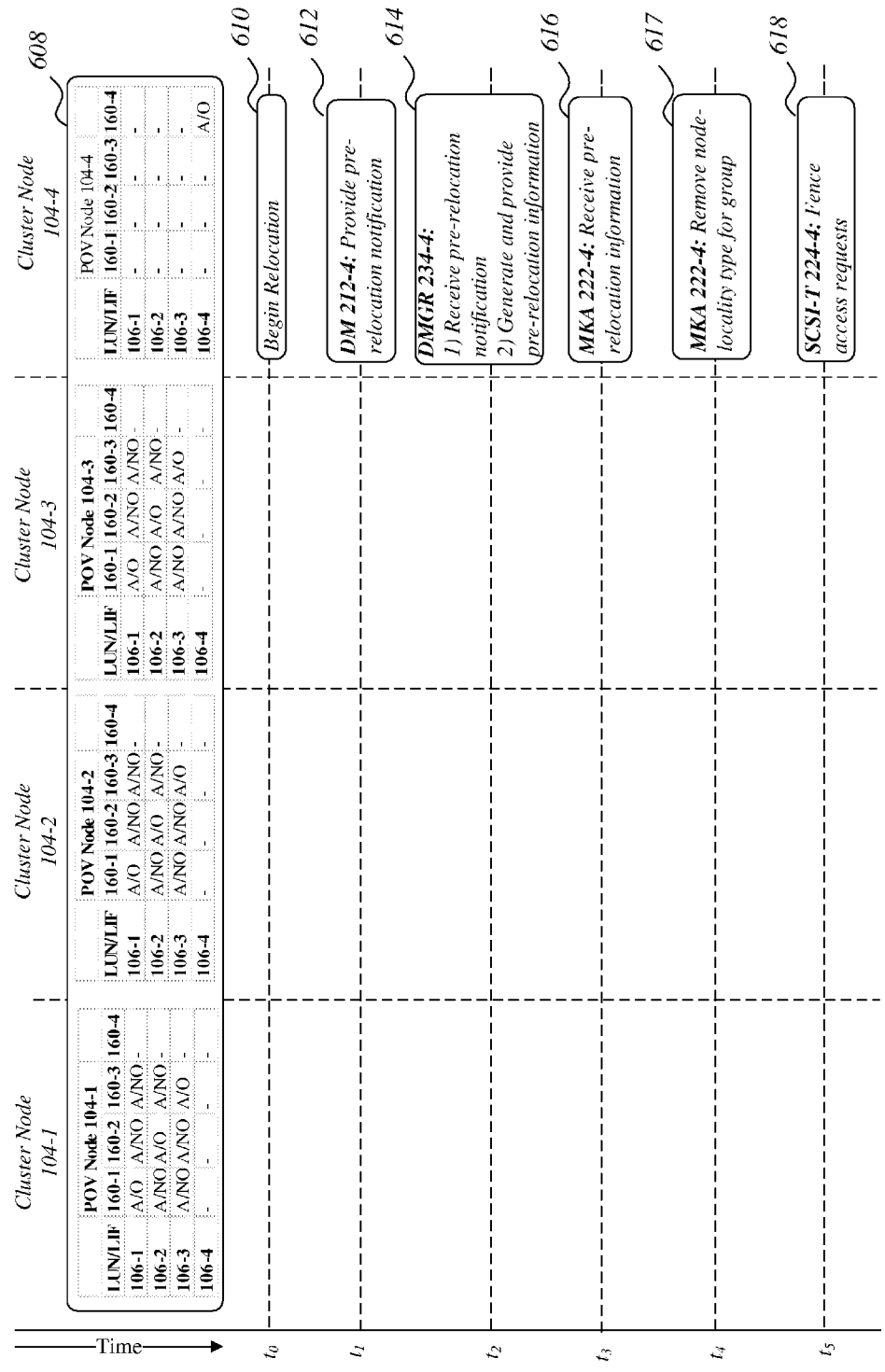
FIG. 6B illustrates a second operating environment in the non-disruptive cluster storage system during a data mobility event and an interconnect failure.

FIG. 6B illustrates an embodiment of an operating environment 600 for the non-disruptive cluster storage system 175. The operating environment 600 illustrates operations of the cluster nodes 104-1, 104-2, 104-3 and 104-4 and one or more components of the cluster nodes 104-1, 104-2, 104-3, and 104-4 when cluster interconnect fails 304 and a data mobility event 602 that relocates the aggregate 114-4, volume, 116-4 and/or LUN 106-4 from source cluster node 104-4 to destination cluster node 104-3.

As shown in FIG. 6A, the ALUA access states from the point of view (POV) of cluster nodes 104-1, 104-2, 104-3, and 104-4 during the cluster interconnect failure 304 are as illustrated in the ALUA access states table 608. Moreover, from POV of cluster nodes 104-1, 104-2, and 104-3, LUN 106-4 is not reported (-) and as such, any access request to LUN 106-4 through LIF 160-1, LIF 160-2 and LIF 160-3, will not be supported. Additionally, because cluster node 104-4 has become isolated, the ALUA access states for LIF 160-4 from POV of cluster node 104-1, 104-2, and 104-3 may not be reported (-) for LUNs 106-1, 106-2, 106-3, and 106-4. From POV of source cluster node 104-4 for LIF 160-4, LUNs 106-1, 106-2, and 106-3 are not reported (-) and as such, any access request to LUNs 106-1, 106-2, and 106-3 through LIF 160-4 may not be supported. Additionally, because cluster node 104-4 may be isolated, the ALUA access states for LIF 160-1, 160-2, and 160-3 from POV of source cluster node 104-4 may not be reported (-) for LUNs 106-1, 106-2, 106-3, and 106-4. It may be appreciated that while access to LUN 106-4 may no longer be possible from LIFs 160-1, 160-2, and 160-3, the host(s) (e.g., host 102-1) utilizing an MPIO component (e.g., MPIO component 166-1) may still access data stored in LUN 160-4 through LIF 160-4 because it remains as an A/O path for a host to access LUN 160-4.

At time $t_0$, cluster node 104-4 may begin relocation 610. For example, data mobility component 212-4 (i.e., aggregate relocate component, volume relocate component, and/or LUN relocate component of cluster node 104-4) may begin moving storage units such as, for example, aggregate 114-4, volume 116-4 and/or LUN 106-4 from source cluster node 104-4 to destination cluster node 104-3 during an interconnect failure 304 in the cluster interconnect 110.

At time $t_1$, DM 212-4 of source cluster node 104-4 may provide pre-relocation notification 612. For example, data mobility component 212-4 may provide to the disk manager component 234-4 a pre-relocation notification (e.g., a PRE-COMMIT notification) indicating that the aggregate 114-4, volume 116-4 and/or LUN 106-4 is relocating to the destination cluster node 104-3.

At time $t_2$, DMGR 234-4 of source cluster node 104-4 may 1) receive pre-relocation notification, and 2) generate and provide pre-relocation information 614. For example, the disk manager component 234-4 may receive the pre-relocation notification (e.g., a PRE-COMMIT notification) from data mobility component 212-4 indicating a storage unit such as aggregate 114-4, volume 116-4, and/or LUN 106-4 is relocating from source cluster node 104-4 to destination cluster node 104-3. In response, the disk manager component 234-4 may generate pre-relocation information which may include, without limitation, a list of relocating storage unit(s) (e.g., a list of volume(s) which may include, without limitation, volume 116-4 containing LUN 106-4), an identifier associated with the Data Blade component 220-4 of the source cluster node 104-4, and an identifier associated with the Data Blade component 220-3 of the destination cluster node 104-3. Additionally, the disk manager component 234-4 may provide the pre-relocation information to one or more components of cluster node 104-4.

At time $t_3$, MKA 222-4 of source cluster node 104-4 may receive the pre-relocation information 616. For example, the management kernel agent component 222-4 may receive the pre-relocation information which may include, without limitation, the list of relocating storage unit(s). Moreover, the list of relocating storage unit(s) may include, without limitation, a list of relocating volume(s) (e.g., volume 116-4) that is being relocated from source cluster node 104-4 to destination cluster node 104-3.

At time $t_4$, MKA 222-4 of source cluster node 104-4 may remove node-locality type attribute for group 617. For example, based on the pre-relocation information, the management kernel agent component 222-4 may remove the node-locality (i.e., super member) type attribute 266 from one or more distributed groups managing one or more relocating storage unit(s) (e.g., volume 116-4) being relocated to destination cluster node 104-3 because the source cluster node 104-4 will not continue to host, own, and/or manage the one or more relocating storage units. Additionally, any transactions associated with transaction manager 204-4 requiring the one or more relocating storage unit(s) (e.g., volume 116-4) will begin to fail.

At time $t_5$, SCSI-T component 224-4 of source cluster node 104-4 may fence access requests 618. For example, the SCIS-T component 224-4 may fence any access requests for one or more LUNs (e.g., LUN 106-4) of one or more volumes (e.g., volume 116-4) being relocated. Moreover, to fence access to the host(s) (e.g., host 102-1) for one or more LUNs of one or more volumes being relocated utilizing SCSI protocol, SCSI-T component 224-4 may set TEST_UNIT_READY (TUR) to return TRANSITIONING (e.g., AAST) so that SCSI-T component 224-4 may prevent media access to LUN(s) (e.g., LUN 106-4) by responding to all media access commands from hosts with TRANSITIONING (e.g., AAST).

FIG. 6C illustrates a continuation of the embodiment of the operating environment 600 for the non-disruptive cluster storage system 175 starting at time $t_6$. At time $t_6$, SCSI-T 224-1, 224-2, 224-3, and 224-4 of cluster nodes 104-1, 104-2, 104-3, and 104-4 may 1) receive request for ALUA state(s) and 2) provide ALUA state(s) 620. For example, SCSI-T 224-1, 224-2, 224-3, and 224-4 of cluster nodes cluster nodes 104-1, 104-2, 104-3, and 104-4 may receive requests for updated and/or latest ALUA access state(s) provide updated and/or latest ALUA access state(s) as illustrated in ALUA access state table 622. From POV of cluster nodes 104-1, 104-2, 104-3, and 104-4 all ALUA access states continues to remain the same.

At time $t_7$, DMGR 234-3 of destination cluster node 104-3 may receive notification of mount 624. For example, disk manager component 234-3 may receive notification from storage interface component 232-3 (not shown) of cluster node 104-3 that one or more storage units (e.g., volume 116-4) has been mounted and as such, the one or more storage units (e.g., volume 116-4) are now being hosted, owned, and/or managed by the destination cluster node 104-3.

At time $t_8$, DMGR 234-3 of destination cluster node 104-3 may generate and provide mount information 626. For example, the disk manager component 234-3 may generate the mount information which may include, without limitation, a list of relocated storage unit(s), an associated identifier of the Data Blade component 220-4 (not shown) of the source cluster node 104-4, and/or an associated identifier of the Data Blade component 220-3 (not shown) of the destination cluster node 104-3. The list of relocated storage unit(s) may include, without limitation, a list of volume(s) (e.g., volume 116-4) that is now under ownership and management of cluster node 104-3. Additionally, the disk manager component 234-3 may also provide the mount information to one or more components (e.g., management kernel agent components 222-1, 222-2, and 222-3) of one or more cluster nodes (e.g., cluster nodes 104-1, 104-2, and 104-3) to indicate the availability of relocated volume(s) (e.g., volume 116-4).

At time $t_9$, MKA 222-1, 222-2, and 222-3 of cluster nodes 104-1 and 104-2, and destination cluster node 104-3, respectively, may 1) receive mount information including a list of mounted volume(s), and 2) distribute mount information to other group member(s) in Vserver group(s) 628. For example, management kernel agent component 222-3 may receive the mount information from the disk manager component 234-3, the mount information may include, without limitation, a list of relocated volume(s) (e.g., volume 116-4) that have been mounted (e.g., volume 116-4) and is now "available" at the destination cluster node 104-3. In response, the management kernel agent component 222-3 may distribute the mount information to other group member(s) (e.g., other management kernel agent components 222-1 and 222-2 of cluster nodes 104-1 and 104-2, respectively, in the same majority partition as cluster node 104-3) in Vserver group(s) (e.g., Vserver group for Vserver 120-1) utilizing one or more transactions (e.g., an informative proposal transaction) for cluster nodes 104 (e.g., cluster nodes 104-1 and 104-2) that may also be involved in the same Vserver(s) as cluster node 104-3 and as such, are group member(s) in the same Vserver group(s).

At time $t_{10}$, MKA 222-1 and 222-2 of cluster nodes 104-1 and 104-2, respectively, may 1) receive mount information including a list of mounted volumes, and 2) join volume group(s) for mounted volume(s); MKA 222-3 of destination cluster node 104-3 may join volume group(s) for mounted volume(s) 629. For example, based on the mount information, the management kernel agent component 222-3 may join distributed volume group(s) as a super member for newly mounted volume(s) (e.g., volume 116-4) that has been relocated to destination cluster node 104-3 by notifying the transaction component 204-3 that it is a super member. It may be appreciated that the management kernel agent component 222-3, may join distributed volume group managing volume 116-4 as a super member because volume 116-4 has been relocated and is now hosted, owned, and/or managed by destination cluster node 104-3. The management kernel agent components 222-1 and 222-2, may receive the mount information including a list of newly mounted volume(s) and join the distribute volume group(s) for newly mounted volume(s) that has been relocated to cluster node 104-3. However, it may be appreciated that management kernel agent components 222-1 and 222-2 may not join as super members because they do not host, own, and/or manage the newly mounted volume(s) (e.g., volume 116-4). It may also be appreciated that in instances when no distributed volume group(s) currently exists for the management of relocated volume(s), joining a distributed volume group for a relocated volume (e.g., volume 116-4) may also create a distributed volume group(s) for that volume (e.g., volume 116-4). For relocated volume(s) now being hosted, owned, and/or managed by a destination cluster node (e.g., destination cluster node 104-3), the distributed volume group(s) for those relocated volume(s) may be created with the node-locality (i.e., super member) type attribute 266 by the cluster node (e.g., destination cluster node 104-3) managing the one or more relocated volumes (e.g., volume 116-4). Additionally, any transactions associated with transaction manager 204-4 requiring the newly mounted relocated volume(s) will now begin to succeed.

Figure 6D:
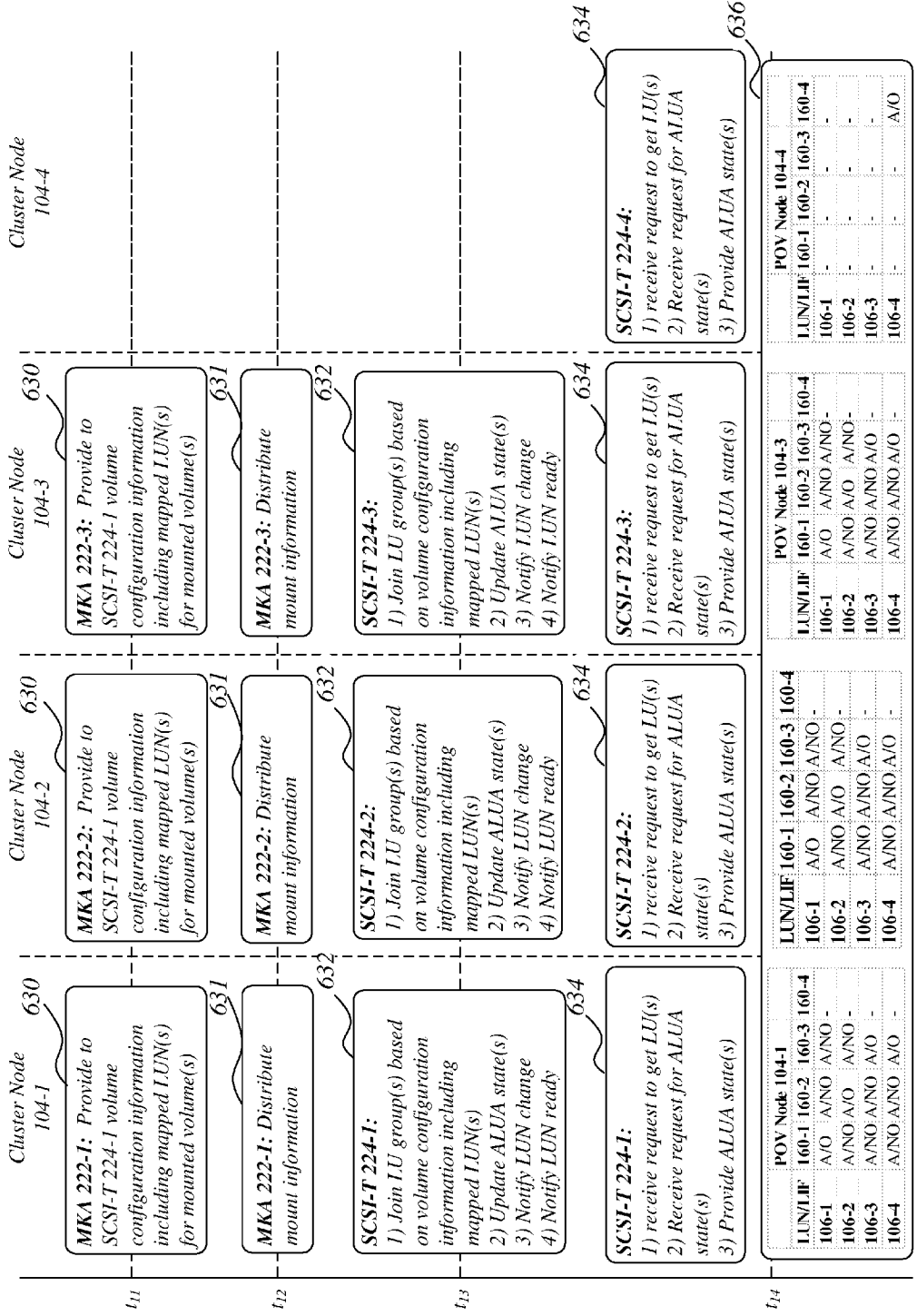
FIG. 6D illustrates another continuation of the second operating environment during the data mobility event and the interconnect failure.

FIG. 6D illustrates another continuation of the embodiment of the operating environment 600 for the non-disruptive cluster storage system 175 starting at time $t_{11}$. At time $t_{11}$, MKA 222-1, 222-2, and 222-3 of cluster nodes 104-1 and 104-2, and destination cluster node 104-3, respectively, may provide to SCSI-T 224-1, 224-2, 224-3 volume configuration information including mapped LUN(s) for mounted volume(s) 630. For example, the management kernel agent components 222-1, 222-2, and 222-3 may provide or seed the volume configuration information for newly mounted volume(s) to SCSI-T components 224-1, 224-2, and 224-3, respectively, the volume configuration information may include, without limitation, LUN(s) (e.g., LUN 106-4) that are mapped to iGroup(s) (e.g., iGroup 162-1) of Vserver(s) e.g., (Vserver 120-1). Moreover, the management kernel agent components 222-1, 222-2, and 222-3 may provide the mapped LUN(s) (e.g., LUN 106-4) for mounted volume(s) (e.g., volume 116-4) to SCSI-T components 224-1, 224-2, and 224-3 so that the SCSI-T components 224-1, 224-2, and 224-3, may request to join to one or more LU group(s) associated with the mapped LUN(s) (e.g., LUN 106-4).

At time $t_{12}$, MKA 222-1, 222-2, and 222-3 of cluster nodes 104-1 and 104-2, and destination cluster node 104-3 may distribute mount information 631. For example, the management kernel agent components 222-1, 222-2, and 222-3 may distribute the mount information to one or more components of cluster nodes 104-1 and 104-2, and destination cluster node 104-3. Moreover, the management kernel agent components 222-1, 222-2, and 222-3 may distribute the mount information so that BII components 228-1, 228-2, and 228-3 may update the cached volume location information for the one or more relocated volumes (e.g., volume 116-4) and SCSI-T components 224-1, 224-2, and 224-3 may provide access to host(s) (e.g., host 102-1) to the one or more LUNs (e.g., LUN 106-4) contained in the one or more relocated volumes.

At time $t_{13}$, SCSI-T components 224-1, 224-2, and 224-3 of cluster nodes 104-1 and 104-2, and destination cluster node 104-3, respectively, may 1) join LU groups(s) based on volume configuration information including mapped LUN(s), 2) update ALUA state(s), 3) notify LUN change, and 4) notify LUN ready 632. For example, SCSI-T components 224-1, 224-2, and 224-3 may join the distributed LU group(s) as a super member for the mapped LUN(s) (e.g., LUN 106-4) included in the volume configuration information of mounted volume(s) (e.g., volume 116-4). To join the distributed LU group(s) for mapped LUN(s) (e.g., LUN 106-4) as a super member, SCSI-T component 224-3 may notify the transaction manager component 204-3 that it is a super member for that distributed LU group. It may be appreciated that the management kernel agent component 222-3 may join distributed LU group managing LUN 106-4 as a super member because destination cluster node 104-3 now hosted, owned, and/or managed by LUN 106-4. The management kernel agent components 222-1 and 222-2 may also join the distribute LU group(s) for one or more LUNs (e.g., LUN 106-4) in the one or more volumes (e.g., 116-4) that has been relocated to cluster node 104-3. However, it may be appreciated that management kernel agent components 222-1 and 222-2 may not join as super members because they do not host, own, and/or manage the LUN(s) (e.g., LUN 106-4) contained in the relocated volume(s) (e.g., volume 116-4). It may also be appreciated that in instances when no distributed LU group(s) currently exists for the management of LUN(s) in the relocated volume(s), joining a distributed LU group for a LUN in a relocated volume (e.g., volume 116-4) may also create a distributed LU group(s) for that LUN (e.g., LUN 106-4). For LUN(s) now being hosted, owned, and/or managed by a destination cluster node (e.g., destination cluster node 104-3), the distributed LU group(s) for those LUNs may be created with the node-locality (i.e., super member) type attribute 266 by the destination cluster node (e.g., destination cluster node 104-3) managing the one or more LUNs (e.g., LUN 106-4).

With continued reference to time at $t_{13}$, the SCSI-T components 224-1, 224-2, and 224-3 may further update ALUA access state(s) for LIFs 160-1, 160-1, 160-2, 160-3, and 160-4 with respect to LUNs 106-1, 106-2, 106-3, and 106-4 from their respective POVs based on the quorum status information provided by the respective cluster quorum manager components 206-1, 206-2, and 206-3 via the respective event manager components 240-1, 240-2, and 240-3, the volume access state information stored, updated, and/or provided by the respective management kernel agent components 222-1, 222-2, and 222-3, and/or cached volume location information stored, updated, and/or provided by the respective BII components 228-1, 228-2, and 228-3, as previously discussed. Additionally, the SCSI-T components 224-1, 224-2, and 224-3 may notify host(s) of a LUN change indicating a LUN inventory update and access to one or more LUNs via one or more cluster nodes 104 have now become available utilizing, for example, the SCSI protocol (e.g., set U/A on I_T with RLDHC and/or set U/A on I_T_L with AASC) as previously discussed. Further, SCSI-T components 224-1, 224-2, and 224-3 may notify hosts 102 that one or more LUNs contained in the one or more relocated volumes is now ready for access utilizing, for example, SCSI protocol as previously discussed. It may be appreciated that any transactions associated with transaction manager component 204-3 requiring the newly mounted LUN(s) (e.g., LUN 106-4) will now begin to succeed.

At time $t_{14}$, SCSI-T 224-1, 224-2, 224-3, and 224-4 of cluster nodes 104-1, 104-2, 104-3, and 104-4 may 1) receive request to get LU(s), 2) receive request for ALUA state(s), and 3) provide ALUA state(s) 634. For example, cluster nodes 104-1, 104-2, 104-3, and 104-4 may receive requests to get the latest LU inventory, receive request for updated and/or latest ALUA access state(s) and in response, provide updated and/or latest ALUA access state(s) as illustrated in ALUA access state table 636. Moreover, from POV of cluster nodes 104-1, 104-2, and 104-3, accessing LUN 106-4 through LIF 160-3 has now become an A/O path because the aggregate 114-4, volume 116-4, and/or LUN 106-4 has been successfully relocated to cluster node 104-3. Additionally, because LUN 106-4 is now hosted, owned, and/or managed by destination cluster node 104-3 which is in the same partition as cluster nodes 104-1 and 104-2, from POV of cluster nodes 104-1 and 104-2, accessing LUN 106-4 through LIF 160-1 and 160-2 is now possible utilizing A/NO paths. However, since cluster node 104-4 has not been notified of the completion of the data mobility event 602, ALUA access states from POV of cluster node 104-4 remains the same.

Figure 6E:
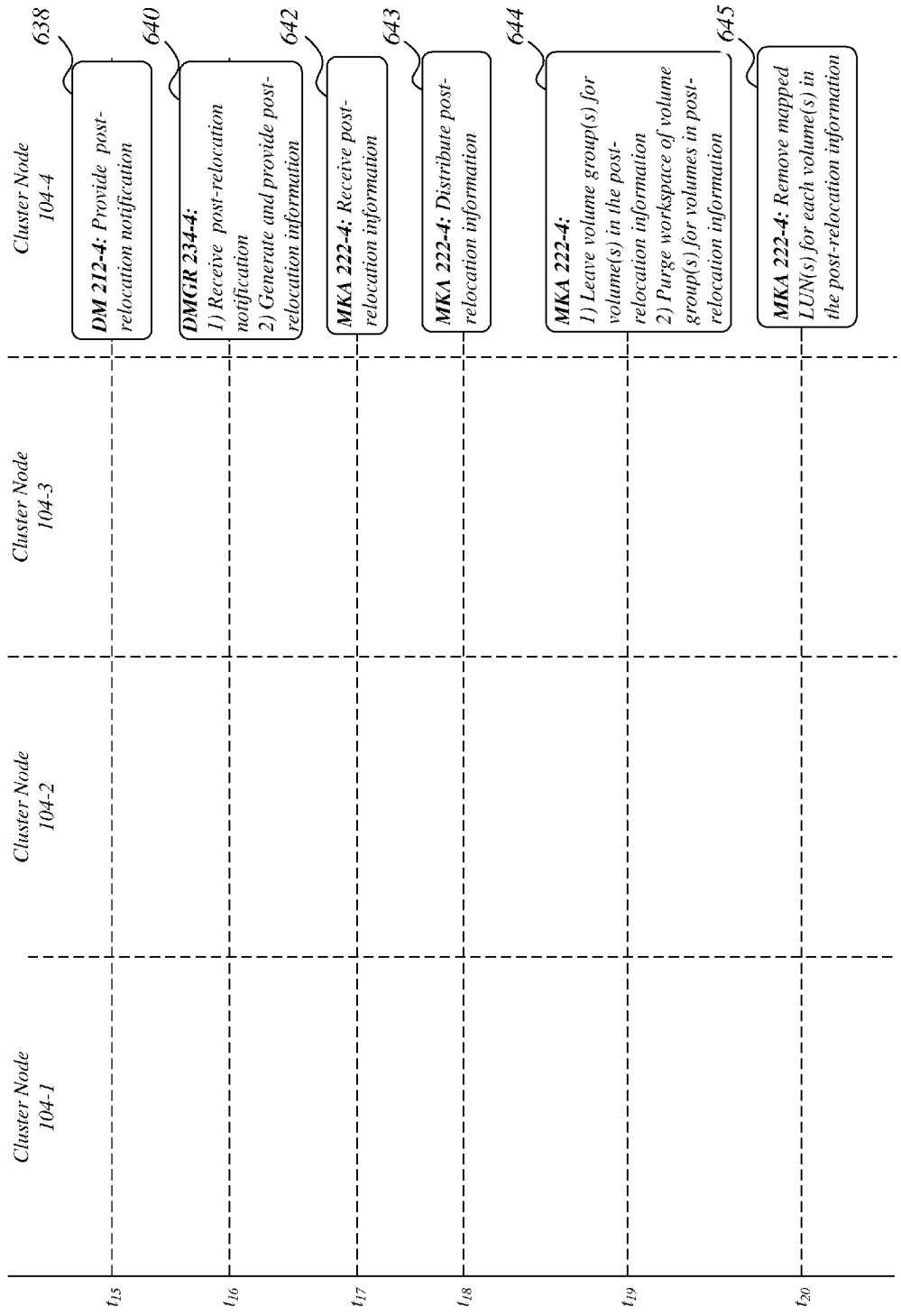
FIG. 6E illustrates yet another continuation of the second operating environment during the data mobility event and the interconnect failure.

FIG. 6E illustrates yet another continuation of the embodiment of the operating environment 600 for the non-disruptive cluster storage system 175 starting at time $t_{15}$. At time $t_{15}$, DM 212-4 of source cluster node 104-4 may provide post-relocation notification 638. For example, data mobility component 212-4 (i.e., aggregate relocate component, volume relocate component, and/or LUN relocate component of cluster node 104-4) may provide post-relocation notification (e.g., a POST-COMMIT notification) to disk manager component 234-4.

At time $t_{16}$, DMGR 234-4 of source cluster node 104-4 may 1) receive post-relocation notification and 2) generate and provide post-relocation information 640. For example, disk manager component 234-4 may receive post-relocation notification (e.g., a POST-COMMIT notification) from data mobility component 212-4, and in response, generate post-relocation information, which may include, without limitation, a list of relocated storage unit(s), an associated identifier of the Data Blade component 220-4 (not shown) of the source cluster node 104-4, and/or an associated identifier of the Data Blade component 220-3 (not shown) of the destination cluster node 104-3. The list of relocated storage unit(s) may include without limitation, a list of relocated volume(s) (e.g., volume 116-4) that is now under ownership and/or management of cluster node 104-3. Additionally, the disk manager component 234-4 may also provide the post-relocation information to one or more components (e.g., management kernel agent component 222-4) of one or more cluster nodes (e.g., cluster node 104-4) to indicate the unavailability of the relocated volume(s) (e.g., volume 116-4).

At time $t_{17}$, MKA 222-4 of source cluster node 104-4 may receive the post-relocation information 642. For example, management kernel agent component 222-4 may receive post-relocation information from disk manager component 234-4.

At time $t_{18}$, MKA 222-4 of source cluster node 104-4 may distribute post-relocation information 643. For example, management kernel agent 222-4 may distribute the post-relocation information to one or more components of cluster node 104-4 (e.g., BII component 228-4, SCSI-T component 224-4, etc.). Moreover, the management kernel agent component 222-4 may distribute the post-relocation information so that the BII component 228-4 may at least update the cached volume location information with the one or more relocated volumes (e.g., volume 116-4) and SCSI-T component 224-4 may remove access to the one or more LUNs (e.g., LUN 106-4) contained in the one or more relocated volumes (e.g., volume 116-4).

At time $t_{19}$, MKA 222-4 of source cluster node 104-4 may 1) leave volume group(s) for volume(s) in the post-relocation information and 2) purge workspace of volume group(s) for volume(s) in the post-relocation information 644. For example, the management kernel agent component 222-4 may leave volume group(s) associated with volume(s) (e.g., volume 116-4) included in the post-relocation information. Additionally, the management kernel agent component 222-4 may purge workspace of the distributed volume group(s) managing volume(s) (e.g., volume 116-4) included in the post-relocation information so that any configuration information associated with the volume(s) (e.g., volume 116-4) may no longer be accessible and/or stored by cluster node 104-4.

At time $t_{20}$, MKA 222-4 of source cluster node 104-4 may remove mapped LUN(s) for each volume(s) in the post-relocation information 656. For example, the management kernel agent components 222-4 may remove mapped LUN(s) (e.g., LUN 106-4) from SCSI-T component 224-4 for each volume(s) listed in the post-relocation information (e.g., volume 116-4).

Figure 6F:
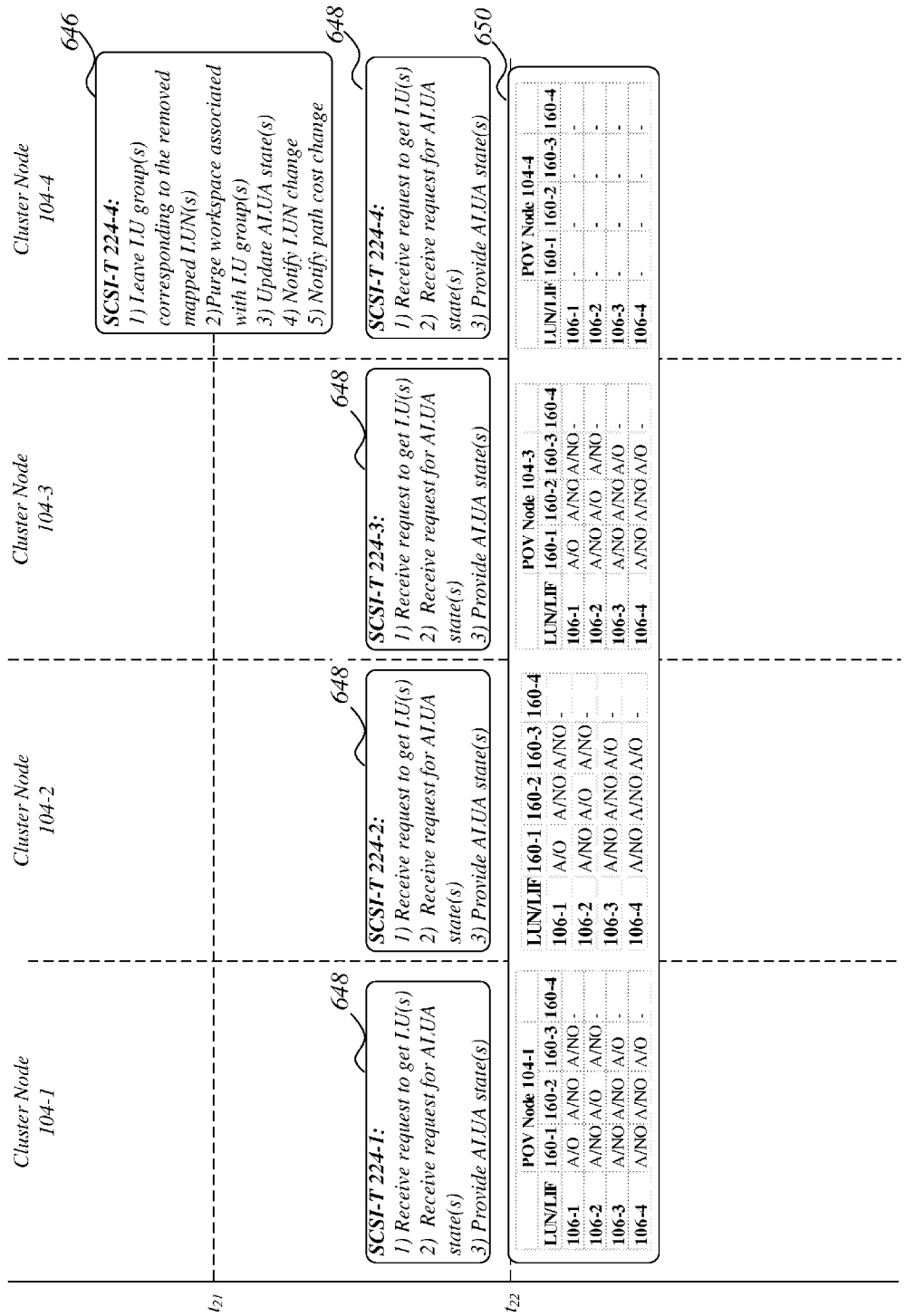
FIG. 6F illustrates yet another continuation of the second operating environment during the data mobility event and the interconnect failure.

FIG. 6F illustrates yet another continuation of the embodiment of the operating environment 600 for the non-disruptive cluster storage system 175 starting at time $t_{21}$. At time $t_{21}$, SCSI-T 224-4 of cluster node 104-4 may 1) leave LU group(s) corresponding to the removed mapped LUN(s), 2) purge workspace of LU group(s), 3) Update ALUA state(s), 4) notify LUN change, and 5) notify path cost change 646. For example, in response to the removed mapped LUN(s), the SCSI-T component 224-4 may leave distributed LU group(s) corresponding to the removed mapped LUN(s) (e.g., LUN 106-4) that were removed by management kernel agent component 222-4 in order to remove access to the removed mapped LUN(s) (e.g., LUN 106-4) via at least LIF 160-4. Additionally, SCSI-T component 224-4 may also purge workspace of the distributed LU group(s) corresponding to removed mapped LUN(s) (e.g., LUN 106-4) so that any configuration information associated with the mapped LUN(s) (e.g., LUN 106-4) may no longer be accessible and/or stored by cluster node 104-4. The SCSI-T component 224-4 may further update ALUA access state(s) for LIFs 160-1, 160-2, 160-3, and 160-4 with respect to LUNs 106-1, 106-2, 106-3, and 106-4 based on the quorum status information provided by the cluster quorum manager component 206-4 via the event manager component 240-4, the volume access state information stored, updated, and/or provided by the management kernel agent component 222-4, and/or cached volume location information stored, updated, and/or provided by the respective BII component 228-4, as previously discussed. Furthermore, SCSI-T component 224-4 may notify hosts (e.g., host 102-1) of a LUN inventory update indicating that access to one or more LUNs on one or more LIFs has now become not reported (-) utilizing, for example, SCSI protocol (e.g., set U/A to RLDHC on the I_T) as previously discussed. In addition, SCSI-T component 224-4 may also notify the host(s) (e.g., host 102-1) of path cost change indicating that one or more ALUA access states has been changed, utilizing for example, SCSI protocol (e.g., set U/A to AASC on I_T_L) as previously discussed.

At time $t_{22}$, cluster nodes 104-1, 104-2, 104-3, and 104-4 may 1) receive request to get LU(s), 2) receive request for ALUA state(s), and 2) provide ALUA state(s) 648. For example, cluster nodes 104-1, 104-2, 104-3, and 104-4 may receive requests to get the latest LU inventory, receive request for updated and/or latest ALUA access state(s), and in response, provide updated and/or ALUA access state(s) as illustrated in ALUA access state table 650. Moreover, from POV of cluster nodes 104-1, 104-2, and 104-3, accessing LUN 106-4 through LIF 160-1, 160-2, and 1603 remains the same. However, because storage unit(s) (e.g., aggregate 114-4, volume 116-4, and/or LUN 106-4) have been relocated from source cluster node 104-4 to destination cluster node 104-3 during an interconnect failure 304, the ALUA access states for LUN 106-4 from POV of source cluster node 104 has been updated to not reported (-) and accordingly, any access to LUN 106-4 through LIF 160-4 will no longer be supported. It may be appreciated that host(s) (e.g., host 102-1) may continue to access LUNs 106-1, 106-2, 106-3, and 106-4 using A/O paths or A/NO paths via LIFs 160-1, 160-2 and 160-3 because source cluster node 104-3 now hosts, owns, or manages storage unit(s) (e.g., volume 116-4 and LUN 106-4). However, host(s) may no longer access LUN 106-4 via LIF 160-4 because source cluster node 104-4 no longer host, owns, and/or manages any storage unit(s). Additionally, LUNs 106-1, 106-2, and 106-3 may continue to remain inaccessible to host(s) via LIF 160-4 because source cluster node 104-4 is in a separate partition (i.e., minority partition) with respect to cluster nodes 104-1 and 104-2, and destination cluster node 104-3.

It may be appreciated that one technical advantage of the non-disruptive cluster storage system that may be realized is the ability for the system to provide data or information access to node storages 112 from cluster nodes 104 that are members of the cluster 150 that may have become isolated due to connectivity issues. Moreover, typically, when a cluster node (e.g., cluster node 104-4) becomes isolated from the cluster 150, data or information access (e.g., data Input/Output (I/O), data read/write (R/W), etc.) to that isolated cluster node is generally suspended to ensure that the integrity of the data or information stored in node storages 112 managed by that isolated cluster node and cluster configuration are maintained. By allowing access to any local data or information stored in node storages 112 that are local to the isolated cluster node (e.g., node storage 112-4 hosted, owned, and/or managed by isolated cluster node 104-4), while fencing off access to remote data and information stored in remote node storages 112 and ensuring that the integrity of the cluster configuration, non-disruptive cluster storage system may maintain data or information access to hosts during the cluster network degradation and recovery.

Another technical advantage of the non-disruptive cluster storage system that may be realized is that by using ALUA access states and the MPIO component of a host (e.g., host 102-1), the non-disruptive cluster storage system may ensure that the applications and/or components of the hosts that are relying on data or information access may be directed to paths where the data or information stored in one or more node storages 112 are accessible and may not see or experience an interruption in service. Moreover, the non-disruptive cluster storage system may ensure the applications and/or components of the hosts that are relying on data or information access may remain accessible to hosts even during data mobility operations (e.g., aggregate relocate, volume relocate, LUN relocate, planned and/or unplanned takeovers of cluster nodes, give backs, etc.) while the cluster interconnect 110 of the cluster 150 is experiencing connectivity issues, so that the hosts may continue to access their data or information without seeing or experiencing an interruption in their service.

Still a further technical advantage that may be realized is that, if the degradation of the cluster interconnect 110 of the cluster 150 becomes severe enough, the applications and/or components of one or more hosts (e.g., host 102-1) may continue to be informed via ALUA access states regarding the accessibility of their data or information stored in one or more node storages 112 and consequently, continue to ensure that the host can take corrective measures if necessary.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be needed for a novel implementation.

Figure 7A:
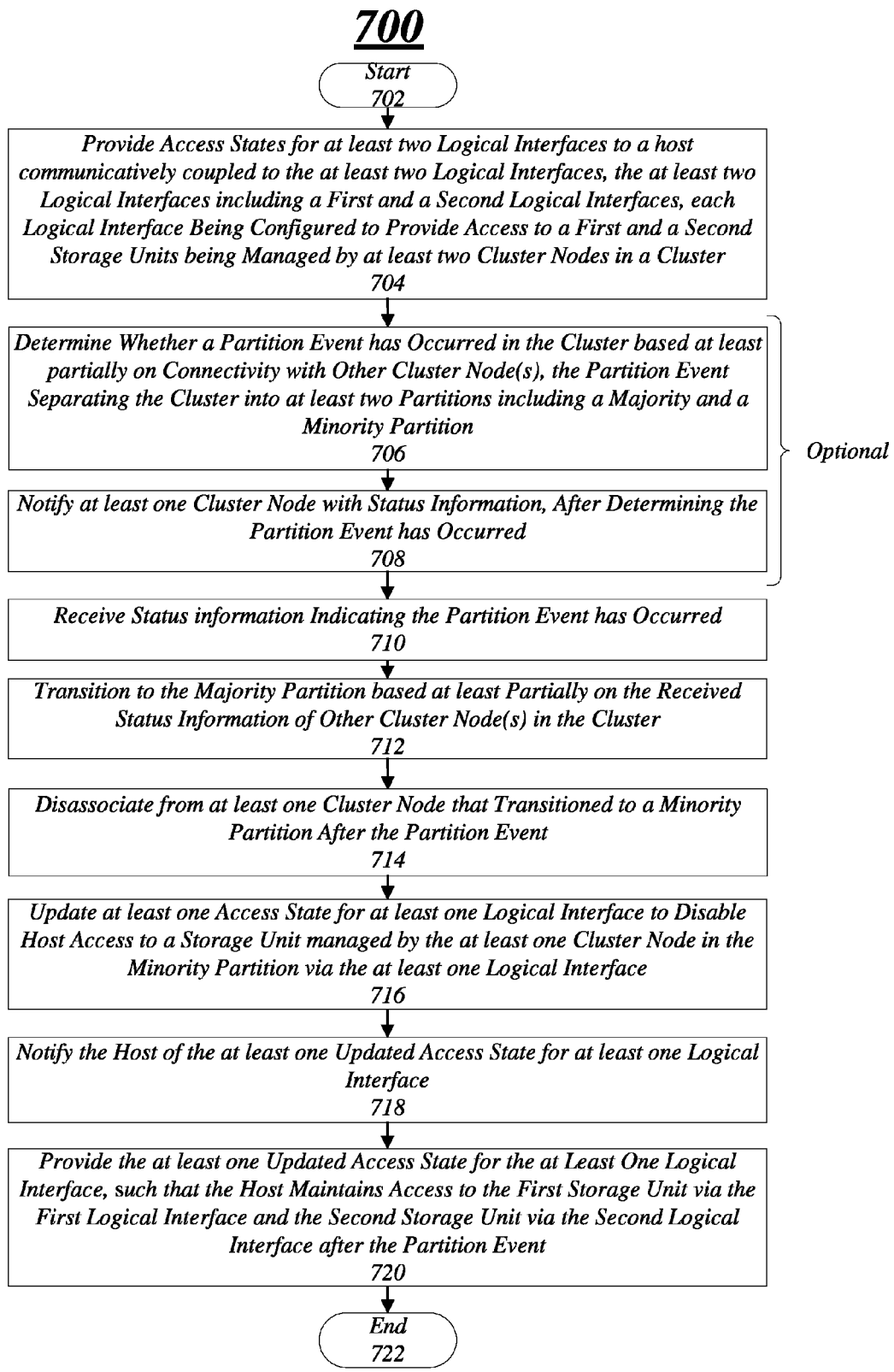
FIG. 7A illustrates an embodiment of a logic flow of the non-disruptive cluster storage system after an interconnect failure.

FIG. 7A illustrates one embodiment of a logic flow 700. The logic flow 700 may be representative of some or all of the operations executed by one or more embodiments described herein.

In the illustrated embodiment shown in FIG. 7A, the logic flow 700 may start at block 702 and may provide access states for at least two logical interfaces to a host communicatively coupled to the at least two logical interfaces, the at least two logical interfaces including a first and a second logical interfaces, each logical interface being configured to provide access to a first and a second storage units being managed by at least two cluster nodes in a cluster at 704. For example, cluster nodes of 104-1, 104-2, 104-3, and 104-4 of cluster 150 may provide ALUA access states for LIFs 160-1, 160-2, 160-3, and 160-4 to host 102-1 communicatively coupled to the LIFs 160-1, 160-2, 160-3, and 160-4. Each of the LIFs 160-1, 160-2, 160-3, and 160-4 may be configured to provide access to LUNs 106-1, 106-2, 106-3, and 106-4 managed by cluster nodes 104-1, 104-2, 104-3, and 104-4, respectively.

The logic flow 700 may optionally determine whether a partition event has occurred in the cluster based at least partially on connectivity with other cluster node(s), the partition event (e.g., interconnect failure 304) separating the cluster into at least two partitions including a majority and a minority partition at 706. For example, cluster quorum manager component 206-1 of cluster node 104-1 may detect heartbeat signals begin to fail to cluster node 104-4 and determine that a partition event has occurred, when the cluster node 104-4 fails to respond to four or more heartbeats signals. The partition event may separate the cluster 150 into a majority partition comprising cluster nodes 104-1, 104-2, and 104-3 and a minority partition comprising cluster node 104-4.

The logic flow 700 may optionally notify at least one cluster node with status information, after determining the partition event has occurred at 708. For example, the cluster quorum manager component 206-1 of cluster node 104-1 may notify at least one cluster node by declaring cluster node 104-4 is OOQ, "out of partition," and "up," and then provide quorum status information indicating that cluster node 104-4 is OOQ, "out of partition," and "up" to one or more components of cluster nodes 104-1, 104-2, and 104-3 in order to separate the cluster 150 into a majority partition comprising cluster nodes 104-1, 104-2, and 104-3 and a minority partition comprising cluster node 104-4 after determining that the partition event (e.g., the interconnect failure 168) has occurred.

The logic flow 700 may receive status information indicating the partition event has occurred at 710. For example, one or more components of cluster nodes 104-1, 104-2, and 104-3 may receive the provided quorum status information indicating that partition event has occurred based at least partially on the quorum status information indicating that cluster node 104-4 is OOQ, "out of partition," and "up."

The logic flow 700 may transition to the majority partition based at least partially on the received status information of the at least one cluster node in the minority partition at 712. For example, transaction manager components 204-1, 204-2, and 204-3 of cluster nodes 104-1, 104-2, and 104-3 may receive quorum status information and based on the received quorum status information indicating that cluster node 104-4 is OOQ, "out of partition", and "up," the cluster nodes 104-1, 104-2, and 104-3 may transition to or remain in the majority partition because the cluster nodes 104-1, 104-2, and 104-3 are "in partition" with only cluster node 104-4 being "out of partition" and as such, meets the criteria for establishing quorum. The cluster nodes 104-1, 104-2, and 104-3 may also fence any access via LIFs 160-1, 160-2, and 160-3 to any storage unit(s) (e.g., LUN 106-4) owned, hosted, and/or managed by cluster node 104-4.

The logic flow 700 may disassociate from at least one cluster node that transitioned to a minority partition after the partition event at 714. For example, transaction manager components of 204-1, 204-2, and 204-3 may disassociate from cluster node 104-4 that transitioned to a minority partition by evicting most, if not all components of cluster node 104-4 from most, if not all distributed groups. The one or more components of cluster node 104-4 being evicted from one or more distributed groups may include, without limitation, at least the kernel agent component 222-4 and/or SCSI-T component 224-4 of cluster node 104-4 from distributed volume groups managing volumes 116-1, 116-2, 116-3 and/or distributed LU groups managing LUN 106-1, 106-2, 106-3. The transaction manager components 204-1, 204-2, and 204-3 may also evict management kernel agent component 224-4 of cluster node 104-4 from distributed Vserver group managing Vserver 120-1. The management kernel agent components 222-1, 222-2, and 222-3 may also leave volume group managing volume 116-4, purge workspace of this volume group, and remove mapped LUN 106-4 for volume 116-4 from SCSI-T components 224-1, 224-2, and 224-3. In response, the SCSI-T components 224-1, 224-2, and 224-3 may leave LU group corresponding to the removed mapped LUN 106-4 and purge workspace of this LU group.

The logic flow 700 may update at least one access state for at least one logical interface to disable host access to a storage unit managed by the at least one cluster node in the minority partition via the at least one logical interface at 716. For example, the SCSI-T components 224-1, 224-2, and 224-3 of cluster nodes 104-1, 104-2, and 104-3 may update at least ALUA access states for LIFs 160-1, 160-2, and 160-3 from the POV of cluster nodes 104-1, 104-2, and 104-3 to disable host access to LUN 106-4 via LIFs 160-1, 160-2, and 160-3 by indicating that the LUN 106-4 managed by cluster node 104-4 is now not reported (-) (i.e., inaccessible) via LIFs 160-1, 160-2, and 160-3. The SCSI-T components 224-1, 224-2, and 224-3 may also update ALUA access states for LIF 160-4 to disable host access to LUNs 106-1, 106-2, and 106-3 via LIF 160-4 by indicating that LUNs 106-1, 106-2, 106-3, and 106-4 are not reported (-) (i.e., inaccessible) from LIF 160-4. It may be appreciated that although SCSI-T components 224-1, 224-2, and 224-3 may indicate to the host 102-1 that LUN 106-4 may is not reported (-) via LIF 160-4 from POV of cluster nodes 104-1, 104-2, and 104-3, the MPIO component 166-1 of host 102-1 may nonetheless be configured to access LUN 106-4 via LIF 160-4 because SCSI-T component 224-4 of cluster node 104-4 in the minority partition, which still hosts, owns, and/or manages LUN 106-4, may continue to indicate to host 102-1 that LUN 106-4 remains accessible (e.g., A/O path) via LIF 160-4. It may be further appreciated that the SCSI-T components 224-1, 224-2, and 224-3 may update the ALUA access states for LIFs 160-1, 160-2, 160-3, and 160-4 based at least partially on the quorum status information, cached volume location information, and/or volume access state information, as previously discussed.

The logic flow 700 may notify the host of the at least one updated access state for at least one logical interface at 718. For example, SCSI-T components 224-1, 224-2, and 224-3 of cluster nodes 104-1, 104-2, and 104-3 may notify the host 102-1 regarding the updated ALUA access states for LIFs 160-1, 160-2, 160-3, and 160-4 from POV of cluster nodes 104-1, 104-2, and 104-3 by notifying the host 102-1 that there is a LUN change indicating a LUN inventory update and LUN 106-4 is now inaccessible (e.g., not reported (-)) via LIFs 160-1, 160-2, and 160-3 and LUNs 160-1, 106-2, 106-3, and 106-4 is now inaccessible (e.g., not reported (-)) via LIF 160-4. Further, SCSI-T components 224-1, 224-2, and 224-3 may also notify the host 102-1 of path cost change indicating that one or more ALUA access states has been changed utilizing, for example, SCSI protocol as previously discussed.

The logic flow 700 may provide the at least one updated access state for the at least one logical interface, such that the host maintains access to the first storage unit via the first logical interface and the second storage unit via the second logical interface after the partition event (e.g., interconnect failure 304) at 720 and end at 722. For example, SCSI-T components 224-1, 224-2, and 224-3 may provide updated ALUA access states indicating that LUNs 106-1, 106-2, and 106-3 remains accessible via any of the LIFs 160-1, 160-2, and 160-3, such that the host may maintain access to LUNs 106-1, 106-2, and 106-3 via LIFs 160-1, 160-2, and 160-3 during the interconnect failure 168. The embodiments are not limited to these examples.

Figure 7B:
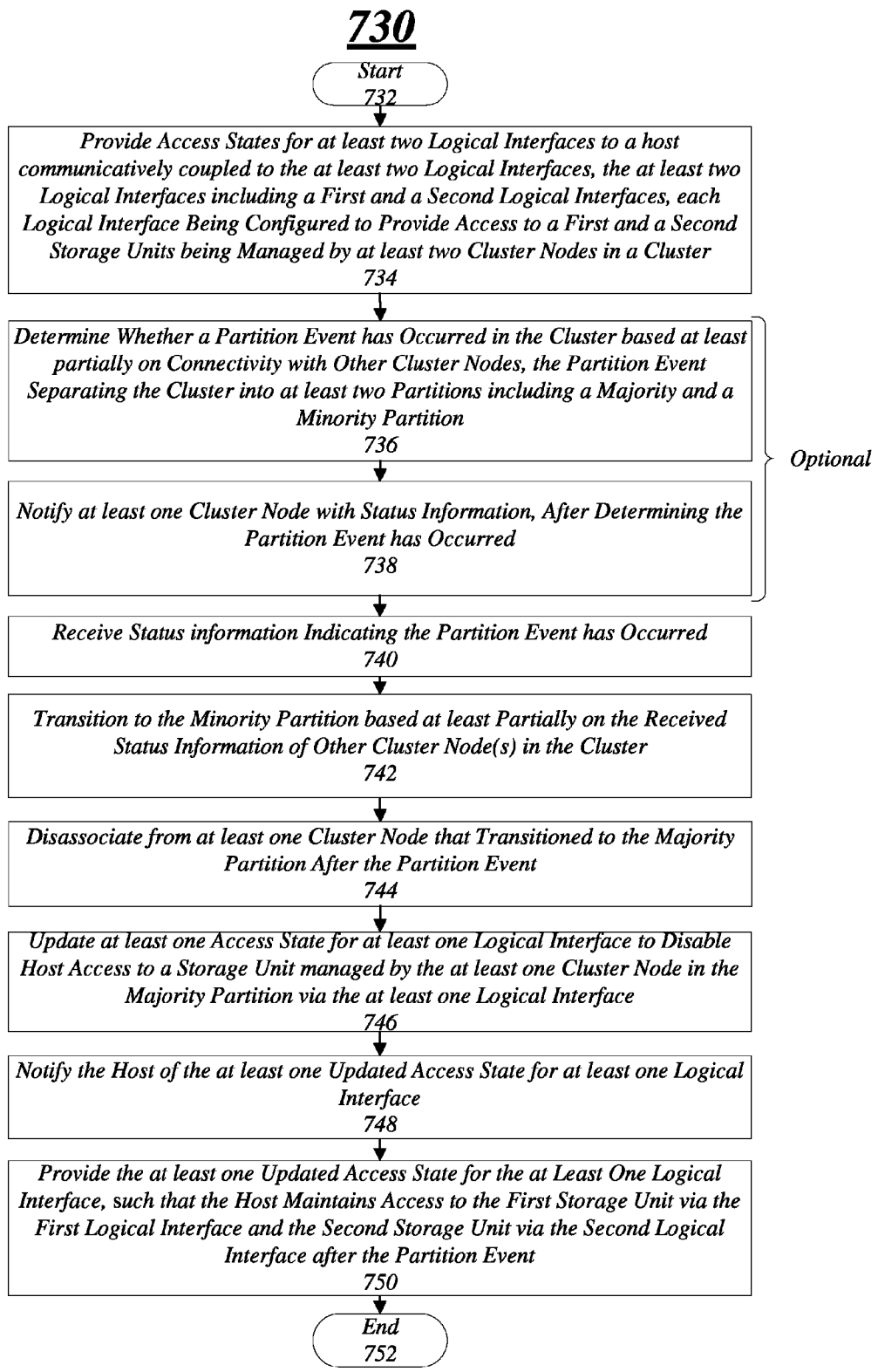
FIG. 7B illustrates another embodiment of a logic flow of the non-disruptive cluster storage system after an interconnect failure.

FIG. 7B illustrates one embodiment of a logic flow 730. The logic flow 730 may be representative of some or all of the operations executed by one or more embodiments described herein.

In the illustrated embodiment shown in FIG. 7B, the logic flow 730 may start at block 732 and may provide access states for at least two logical interfaces to a host communicatively coupled to the at least two logical interfaces, the at least two logical interfaces including a first and a second logical interfaces, each logical interface being configured to provide access to a first and a second storage units being managed by at least two cluster nodes in a cluster at 734. For example, cluster nodes of 104-1, 104-2, 104-3, and 104-4 of cluster 150 may provide ALUA access states for LIFs 160-1, 160-2, 160-3, and 160-4 to host 102-1 communicatively coupled to the LIFs 160-1, 160-2, 160-3, and 160-4. Each of the LIFs 160-1, 160-2, 160-3, and 160-4 may be configured to provide access to LUNs 106-1, 106-2, 106-3, and 106-4 managed by cluster nodes 104-1, 104-2, 104-3, and 104-4, respectively.

The logic flow 730 may optionally determine whether a partition event (e.g., interconnect failure 304) has occurred in the cluster based at least partially on connectivity with other cluster nodes, the partition event separating the cluster into at least two partitions including a majority and a minority partition at 736. For example, cluster quorum manager component 206-4 of cluster node 104-4, upon failing to receive one or more heartbeat signals from cluster quorum manager component 206-1 of cluster node 104-1, may assume a mastership role and begin to prove the partition to determine one or more cluster nodes 104 that may be in the same partition as cluster node 104-4. In proving the partition, the cluster quorum manager component 206-4 of cluster node 104-4 may detect cluster nodes 104-1, 104-2, and 104-3 failing to respond to one or more heartbeat signals and determine that a partition event has occurred, when the cluster nodes 104-1, 104-2, and 104-3 fail to respond to four or more heartbeats signals.

The logic flow 730 may optionally notify at least one cluster with status information, after determining the partition event has occurred at 738. For example, cluster quorum manager component 206-4 of cluster node 104-4 may notify one or more components of cluster node 104-4 by declaring cluster nodes 104-1 and 104-2 are OOQ, "out of partition," and "unknown," and cluster node 104-3 is OOQ, "out of partition," and "up." The cluster quorum manager component 206-4 of cluster node 104-4 may then provide quorum status information to one or more components of cluster node 104-4 in order to separate the cluster 150 into the majority partition and minority partition when an interconnect failure 168 occurs.

The logic flow 730 may receive status information indicating the partition event has occurred at 740. For example, one or more components of cluster node 104-4 may receive the provided quorum status information indicating that cluster nodes 104-1 and 104-2 are OOQ, "out of partition," and "unknown," and cluster node 104-3 is OOQ, "out of partition," and "up."

The logic flow 730 may transition to the minority partition based at least partially on the received status information associated with other cluster node(s) in the cluster at 742. For example, transaction manager component 204-4 of cluster node 104-4 may receive quorum status information and based on the receive quorum status information, may transition to the minority partition because cluster node 104-4 is the only cluster node that is "in partition" in the cluster 150 from POV of cluster node 104-4 and as such, cluster node 104-4, by itself in cluster 150, would not meet the criteria to maintain quorum (i.e., cluster node 104-4 is OOQ). During the transition to the minority partition, the cluster node 104-4 may also protect integrity of information stored in LUNs 106-1, 106-2, and 106-3 and accessed via LIF 160-4 by fencing access requests received from LIF 160-4 for information stored in LUNs 106-1, 106-2, and 106-3.

The logic flow 730 may disassociate from at least one cluster node that transitioned to a different partition after the partition event at 744. For example, transaction manager component 204-4 may disassociate from cluster nodes 104-1, 104-2, and 104-3 that transitioned to or remained in the majority partition by evicting most, if not all components of cluster nodes 104-1, 104-2, and 104-3 from most if not all distributed groups. The one or more components being evicted from one or more distributed groups may include, without limitation, at least the management kernel agent components 222-1, 222-2, and 222-3 and/or SCSI-T components 224-1, 224-2, and 224-3 from distributed volume group managing volume 116-4 and/or distributed LU group managing LUN 106-4. The transaction manager component 204-4 may also evict management kernel agent component 224-4 of cluster node 104-4 from distributed Vserver group managing Vserver 120-1. The management kernel agent component 222-4 may also leave volume group managing volumes 116-1, 116-2, and 116-3, purge workspace of these volume groups, and remove mapped LUNs 106-1, 106-4, 106-3 for volumes 116-1, 116-2, and 116-3 from SCSI-T component 224-4. In response, the SCSI-T component 224-4 may leave distributed LU groups corresponding to the removed mapped LUNs 106-1, 106-2, and 106-3 and purge workspace of these LU groups.

The logic flow 730 may update at least one access state for at least one logical interface to disable host access to a storage unit managed by the at least one cluster node in the different partition is inaccessible via the at least one logical interface at 746. For example, the SCSI-T component 224-4 of cluster node 104-4 may update at least ALUA access states for LIF 160-4 from the POV of cluster node 104-4 to disable host access to LUNs 106-1, 106-2, and 106-3 via LIF 160-4 by indicating that LUNs 106-1, 106-2, and 106-3 managed by cluster node 104-1, 104-2, and 104-3 are not reported (-) (i.e., inaccessible) via LIF 160-4. However, SCSI-T component 224-4 will continue to indicate that LUN 106-4 will remain accessible (e.g., A/O path) via LIF 160-4. SCSI-T component 224-4 of cluster node 104-4 may also update at least access states for LIFs 160-1, 160-2, and 160-3 from POV of cluster node 140-4 to disable host access to LUN 106-4 via LIFs 160-1, 160-2, and 160-3 by indicating that LUN 106-4 managed by cluster node 104-4 is not reported (-) (i.e., inaccessible) via LIFs 160-1, 160-2, and 160-3. It may be appreciated that although SCSI-T component 224-4 may indicate to the host 102-1 that LUNs 106-1, 106-2, 106-3 is not reported (-) via LIF 160-1, 160-2, and 160-3 from POV of cluster node 104-4, the MPIO component 166-1 of host 102-1 may nonetheless be configured to access LUNs 106-1, 106-2, and 106-3 via LIFs 160-1, 160-2, and 160-3 because SCSI-T components 224-1, 224-2, and 224-3 of cluster nodes 104-1, 104-2, and 104-3 in the majority partition, which still host, own, and/or manage LUNs 106-1, 106-2, and 106-3, may continue to indicate to host 102-1 that LUNs 106-1, 106-2, and 106-3 remain accessible (e.g., A/O path and/or A/NO path) via LIFs 160-1, 160-2, and 160-3. It may be further appreciated that the SCSI-T component 224-4 may update the ALUA access states for LIFs 160-1, 160-2, 160-3, and 160-4 based at least partially on the quorum status information, cached volume location information, and/or volume access state information, as previously discussed.

The logic flow 730 may notify the host of the at least one updated access state for at least one logical interface at 748. For example, SCSI-T component 224-4 may notify the host 102-1 regarding the updated ALUA access states for LIFs 160-1, 160-2, 160-3, and 160-4 from POV of cluster node 104-4 by notifying the host 102-1 that there is a LUN change indicating a LUN inventory update and LUN 106-4 is now not reported (-) via LIFs 160-1, 160-2, and 160-3 and LUNs 106-1, 106-2 and 106-3 is also now not reported (-) via LIFs 160-1, 160-2, 160-3, and 160-4. Further, SCSI-T component 224-4 may also notify the host 102-1 of path cost change indicating that one or more ALUA access states has been changed utilizing, for example, SCSI protocol as previously discussed.

The logic flow 700 may provide the at least one updated access state for the at least one logical interface, such that the host maintains access to the first storage unit via the first logical interface and the second storage unit via the second logical interface after the partition event (e.g., interconnect failure 304) at 720 and end at 722. For example, SCSI-T component 224-1, 224-2, and 224-3 may provide updated ALUA access states indicating that LUNs 106-1, 106-2, and 106-3 remains accessible via any of the LIFs 160-1, 160-2, and 160-3, such that the host may maintain access to LUNs 106-1, 106-2, and 106-3 via LIFs 160-1, 160-2, and 160-3 during the interconnect failure 304. Additionally or alternatively, SCSI-T component 224-4 may provide ALUA access states indicating that LUN 106-4 remains accessible via only LIF 160-4, such that the host may maintain access to LUN 106-4 via LIF 160-4 during the interconnect failure 304. The embodiments are not limited to these examples.

Figure 8A:
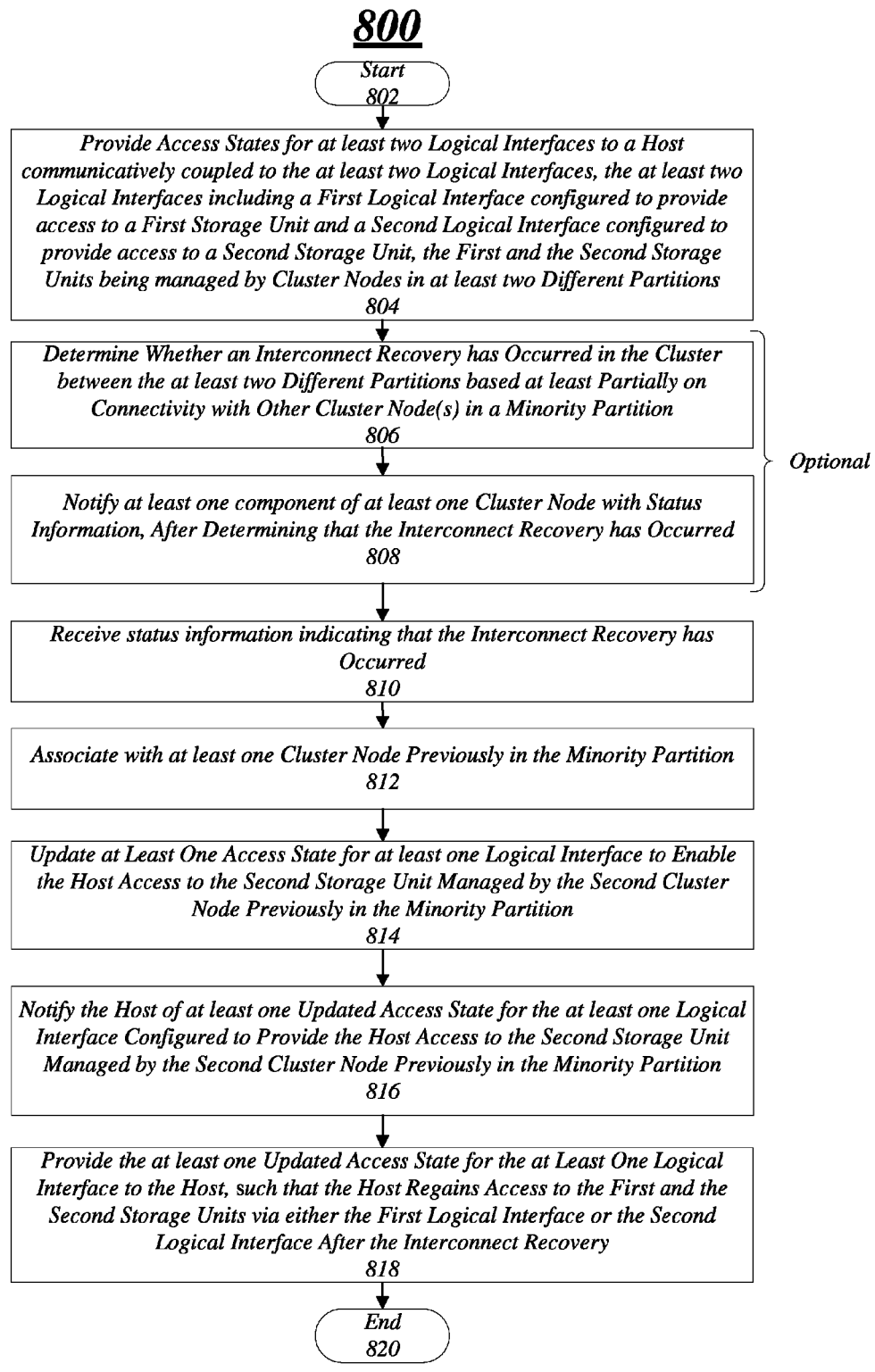
FIG. 8A illustrates an embodiment of a logic flow of the non-disruptive cluster storage system after an interconnect recovery.

FIG. 8A illustrates one embodiment of a logic flow 800. The logic flow 800 may be representative of some or all of the operations executed by one or more embodiments described herein.

In the illustrated embodiment shown in FIG. 8A, the logic flow 800 may start at block 802 and may provide access states for at least two logical interfaces to a host communicatively coupled to the at least two logical interfaces, the at least two logical interfaces including a first logical interface configured to provide access to a first storage unit and a second logical interface configured to provide access to a second storage unit, the first and second storage units being managed by cluster nodes in at least two different partitions at 804. For example, cluster nodes of 104-1, 104-2, 104-3, and 104-4 of cluster 150 may provide ALUA access states for LIFs 160-1, 160-2, 160-3, and 106-4 to host 102-1 communicatively coupled to the LIFs 160-1, 160-2, 160-3, and 160-4. The LIFs 160-1, 160-2, and 160-3 may be configured to provide access to LUNs 106-1, 106-2, and 106-3 managed by cluster nodes 104-1, 104-2, and 104-3, respectively, in the majority partition. The LIFs 160-4 may be configured to provide access to LUN 106-4 managed by cluster node 104-4 in the minority partition. However, because of the interconnect failure 304, LUN 106-4 may be initially inaccessible from LIFs 160-1, 160-2, and 160-3, and LUNs 106-1, 106-2, and 106-3 may be initially inaccessible from LIF 160-4.

The logic flow 800 may optionally determine whether an interconnect recovery has occurred in the cluster between the at least two different partitions based at least partially on connectivity with other cluster node(s) in a minority partition 806. For example, cluster quorum manager component 206-1 of cluster node 104-1 in the majority partition may determine the connectivity with cluster node 104-4 by detecting heartbeat response signals from cluster node 104-4 in the minority partition. After receiving four or more consecutive heartbeat response signals from cluster node 104-4, cluster quorum manager component 206-1 may determine that an interconnect recovery 402 has occurred in the cluster 150.

The logic flow 800 may optionally notify at least one component of at least one cluster node with status information, after determining that the interconnect recovery has occurred at 808. For example, the cluster quorum manager component 206-1 of cluster node 104-1 may notify one or more components of cluster nodes 104-1, 104-2, 104-3, and 104-4 with quorum status information by declaring cluster node 104-4 is INQ, "in partition," and "up" after receiving four or more consecutive heartbeat response signals from cluster node 104-4 and provide quorum status information to one or more components of cluster nodes 104-1, 104-2, 104-3, and 104-4. Moreover, the cluster quorum manager component 206-1 of cluster node 104-1 may provide quorum status information indicating that cluster node 104-4 is INQ, "in partition," and "up" to one or more components of cluster nodes 104-1, 104-2, 104-3, and 104-4, after determining that the interconnect recovery 402 has occurred.

The logic flow 800 may receive status information indicating that the interconnect recovery has occurred at 810. For example, one or more components of cluster nodes 104-1, 104-2, 104-3, and 104-4 may receive quorum status information indicating that interconnect recovery 402 has occurred based at least partially on the quorum status information indicating that cluster node 104-4 previously in the minority partition is now INQ, "in partition," and "up."

The logic flow 800 may associate with at least one cluster node previously in the minority partition before the interconnect recovery at 812. For example, management kernel agent components 222-1, 222-2, and 222-3 of cluster nodes 104-1, 104-2, and 104-3 may associate with cluster node 104-4 previously in the minority partition before the interconnect recovery 402 (i.e., during the partition event) by requesting a list of volume(s) hosted, owned, and/or managed by cluster node 104-4 from BII components 228-1, 228-2, and 228-3, the list of volume(s) may include volume 116-4. The management kernel agent components 222-1, 222-2, and 222-3 may further request to join distributed volume group for volume 116-4, and in response, acquire volume configuration information including mapped LUN 106-4 for volume 116-4. The management kernel agent component 222-1, 222-2, and 222-3 may then provide SCSI-T components 224-1, 224-2, and 224-3 with volume configuration information including mapped LUN 106-4 for volume 116-4. In response, the SCSI-T components 224-1, 224-2, and 224-3 may request to join distributed LU group for mapped LUN 106-4 included in the volume configuration information.

The logic flow 800 may update at least one access state for at least one logical interface to enable the host access to the second storage unit managed by the second cluster node previously in the minority partition at 814. For example, the SCSI-T components 224-1, 224-2, and 224-3 may update at least ALUA access states for LIFs 160-1, 160-2, and 160-3 from the POV of cluster nodes 104-1, 104-2, and 104-3 to enable the host 102-1 access to LUN 106-4 via LIFs 160-1, 160-2, and 160-3 by indicating that the LUN 106-4 managed by cluster node 104-4 is now accessible (e.g., A/NO paths) via LIFs 160-1, 160-2, and 160-3. The SCSI-T components 224-1, 224-2, and 224-3 may also update ALUA access states for LIF 160-4 from the POV of cluster nodes 104-1, 104-2, and 104-3 to enable host access to LUNs 106-1, 106-2, 106-3, and 106-4 via LIF 160-4 by indicating that LUNs 106-1, 106-2, and 106-3 are now accessible (e.g., A/NO paths) via LIF 160-4. It may be appreciated that the SCSI-T components 224-1, 224-2, and 224-3 may update the ALUA access states for LIFs 160-1, 160-2, 160-3, and 160-4 based at least partially on the quorum status information, cached volume location information, and/or volume access state information, as previously discussed.

The logic flow 800 may notify the host of at least one updated access state for the at least one logical interface configured to provide the host access to the second storage unit managed by the second cluster node previously in the minority partition at 816. For example, SCSI-T components 224-1, 224-2, and 224-3 may notify the host 102-1 regarding the updated ALUA access states for LIFs 160-1, 160-2, 160-3, and 160-4 from POV of cluster nodes 104-1, 104-2, and 104-3 configured to provide the host 102-1 access to LUN 106-4 managed by cluster node 104-4 previously in the minority partition. Moreover, SCSI-T components 224-1, 224-2, and 224-3 may notify the host of at least one updated access state by notifying the host 102-1 that there is a LUN change indicating a LUN inventory update and LUN 106-4 is now accessible (e.g., A/NO path) via LIFs 160-1, 160-2, and 160-3, and LUNs 106-1, 106-2 and 106-3 are now accessible (e.g., A/NO paths and/or A/O paths) via LIF 160-4. Further, SCSI-T components 224-1, 224-2, and 224-3 may also notify the host 102-1 of path cost change indicating that one or more ALUA access states has been changed utilizing, for example, SCSI protocol as previously discussed.

The logic flow 800 may provide the at least one updated access state for the at least one logical interface to the host, such that the host regains access to the first and second storage units via either the first logical interface or the second logical interface after the interconnect recovery at 818 and end at 820. For example, SCSI-T components 224-1, 224-2, and 224-3 may provide updated ALUA access states for LIFs 160-1, 160-2, and 160-3 from POV of cluster nodes 104-1, 104-2, and 104-3 indicating to the host 102-1 that LUN 106-4, in addition to LUN 106-1, 106-2, and 106-3, are now all accessible via any of the LIFs 160-1, 160-2, and 160-3, such that the host 102-1 may regain access (e.g., A/NO path) to LUNs 106-1, 106-2, and 106-3 via LIF 160-4 and regain access (e.g., A/NO path) to LUN 106-4 via LIFs 160-1, 160-2, and 160-3 after the interconnect recovery 402. The embodiments are not limited to these examples.

Figure 8B:
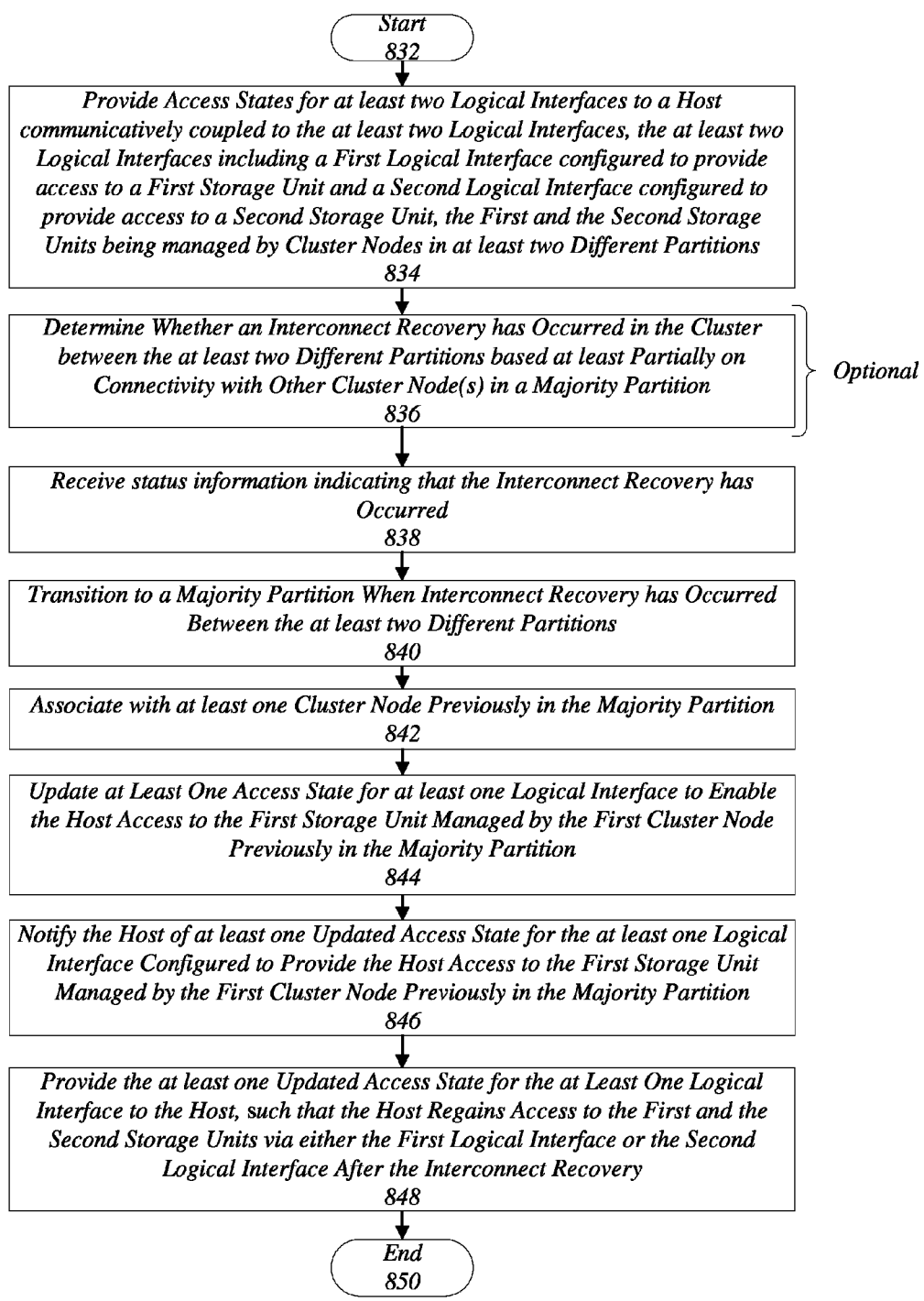
FIG. 8B illustrates another embodiment of a logic flow of the non-disruptive cluster storage system after an interconnect recovery.

FIG. 8B illustrates one embodiment of a logic flow 830. The logic flow 830 may be representative of some or all of the operations executed by one or more embodiments described herein.

In the illustrated embodiment shown in FIG. 8B, the logic flow 830 may start at block 832 and may provide access states for at least two logical interfaces to a host communicatively coupled to the at least two logical interfaces, the at least two logical interfaces including a first logical interface configured to provide access to a first storage unit and a second logical interface configured to provide access to a second storage unit, the first and second storage units being managed by cluster nodes in at least two different partitions at 834. For example, cluster nodes of 104-1, 104-2, 104-3, and 104-4 of cluster 150 may provide access to LUNs 106-1, 106-2, 106-3, and 106-4 to host 102-1 communicatively coupled to the LIFs 160-1, 160-2, 160-3, and 160-4. The LIFs 160-1, 160-2, and 160-3 may be configured to provide access to LUNs 106-1, 106-2, and 106-3 managed by cluster nodes 104-1, 104-2, and 104-3, respectively, in the majority partition. The LIFs 160-4 may be configured to provide access to LUN 106-4 managed by cluster node 104-4 in the minority partition. However, because of the interconnect failure 304, LUN 106-4 may be initially inaccessible from LIFs 160-1, 160-2, and 160-3, and LUNs 106-1, 106-2, and 106-3 may be initially inaccessible from LIF 160-4.

The logic flow 830 may optionally determine whether an interconnect recovery has occurred in the cluster between the at least two different partitions based at least partially on connectivity with other cluster node(s) in a majority partition at 836. For example, cluster quorum manager component 206-4, as a master cluster quorum manager component, of cluster node 104-4 in the minority partition may determine the connectivity with cluster node 104-1 by detecting heartbeat signals from cluster node 104-1 in the majority partition. The cluster quorum manager component 206-4 may also begin providing one or more heartbeat response signals to cluster quorum manager component 206-1 of cluster node 104-1. After receiving four or more consecutive heartbeat signals from cluster node 104-1, cluster quorum manager component 206-4 may determine that an interconnect recovery has occurred in the cluster 150. The cluster quorum manager component 206-4 may further yield its mastership.

The logic flow 830 may receive status information indicating that the interconnect recovery occurred at 838. For example, one or more components of cluster node 104-4 may receive quorum status information from cluster quorum manager component 206-1 of cluster node 104-1 indicating that interconnect recovery has occurred based at least partially on the quorum status information indicating that cluster node 104-4 previously in the minority partition is now INQ, "in partition," and "up."

The logic flow 830 may transition to majority partition when interconnect recovery has occurred between the at least two different partitions at 840. For example, in response to receiving the quorum status information, the transaction manager component 204-4 of cluster node 104-4 may transition to majority partition comprising cluster nodes 104-1, 104-2, and 104-3 when the interconnect recovery has occurred between the majority partition comprising cluster nodes 104-1, 104-2, and 104-3 and the minority partition comprising cluster node 104-4. The cluster node 104-4 may begin transitioning to the majority partition by the transaction manager component 204-4 indicating that the transaction manager component 204-4 is in a closed state, begin the soft-reset procedure as previously discussed, and evict management kernel agent component 222-4 and/or SCSI-T component 224-4 from most, if not all distributed groups managing one or more resources which may include, without limitation, distributed volume group managing volume 116-4 and distributed LU group managing LUN 106-4.

The logic flow 830 may associate with at least one cluster node previously in the majority partition at 842. For example, management kernel agent component 222-4 of cluster node 104-4 may associate with cluster nodes 104-1, 104-2, and 104-3 previously in the majority partition by requesting Vserver configuration information from distributed management component 208-4 and requesting a list of volume(s) hosted, owned, and/or managed by cluster nodes 104-1, 104-2, and 104-3 from BII component 228-4, the list of volume(s) may include volumes 116-1, 116-2, and 116-3. The management kernel agent component 222-4 may further request to join distributed Vserver group for Vserver 120-1 and distributed volume group for volume 116-4, that management kernel agent 222-4 was previously evicted from. Additionally, the management kernel agent component 222-4 may request to join distributed volume groups for volumes 116-1, 116-2, and 116-3. In response, the management kernel agent component 222-4 may acquire volume configuration information including mapped LUNs 106-1, 160-2, 106-3, and 106-4 for volumes 116-1, 116-2, 116-3, and 116-4, respectively. The management kernel agent component 222-4 may then provide SCSI-T component 224-4 with volume configuration information including mapped LUNs 106-1, 106-2, 106-3, and 106-4 for volumes 116-1, 116-2, 116-3, and 116-4. In response, the SCSI-T component 224-4 may request to join distributed LU groups for mapped LUNs 106-1, 106-2, 106-3, and 106-4 included in the volume configuration information.

The logic flow 830 may update at least one access state for at least one logical interface to enable the host access to the first storage unit managed by the first cluster node previously in the majority partition at 844. For example, the SCSI-T component 224-4 may update at least ALUA access states for LIFs 160-1, 160-2, and 160-3 from the POV of cluster node 104-4 to enable the host 102-1 access to LUN 106-4 via LIFs 160-1, 160-2, and 160-3 hosted, owned, and/or managed by cluster nodes 104-1, 104-2, and 104-3 previously in the majority partition by indicating that the LUN 106-4 managed by cluster node 104-4 is now accessible (e.g., A/NO paths) via LIFs 160-1, 160-2, and 160-3. The SCSI-T component 224-4 may also update ALUA access states for LIF 160-4 from the POV of cluster node 104-4 to enable host access to LUNs 106-1, 106-2, and 106-3 hosted, owned, and/or managed by cluster nodes 104-1, 104-2, and 104-3 via LIF 160-4 by indicating that LUNs 106-1, 106-2, and 106-3 are now accessible (e.g., A/NO paths) via LIF 160-4. It may be appreciated that the SCSI-T component 224-4 may update the ALUA access states for LIFs 160-1, 160-2, 160-3, and 160-4 based at least partially on the quorum status information, cached volume location information, and/or volume access state information, as previously discussed.

The logic flow 830 may notify the host of at least one updated access state for the at least one logical interface configured to provide the host access to the first storage unit managed by the first cluster node previously in the majority partition at 846. For example, SCSI-T component 224-4 may notify the host 102-1 regarding the updated ALUA access states for LIFs 160-1, 160-2, 160-3, and 160-4 from POV of cluster node 104-4 configured to provide the host 102-1 access to LUNs 106-1, 106-2, and 106-3 managed by cluster nodes 104-1, 104-2, and 104-3 previously in the majority partition. Moreover, SCSI-T component 224-4 may notify the host of at least one updated access state by notifying the host 102-1 that there is a LUN change indicating a LUN inventory update and LUN 106-4 is now accessible (e.g., A/NO path) via LIFs 160-1, 160-2, and 160-3, and LUNs 106-1, 106-2, and 106-3 are now accessible (e.g., A/O and/or A/NO paths) via LIF 160-4. Further, SCSI-T component 224-4 may also notify the host 102-1 of path cost change indicating that one or more ALUA access states has been changed utilizing, for example, SCSI protocol as previously discussed.

The logic flow 830 may provide the at least one updated access state for the at least one logical interface to the host, such that the host regains access to the first and second storage units via either the first logical interface or the second logical interface after the interconnect recovery at 848 and end at 850. For example, SCSI-T components 224-1, 224-2, and 224-3 may provide updated ALUA access states for LIFs 160-1, 160-2, and 160-3 from POV of cluster nodes 104-1, 104-2, and 104-3 indicating to the host 102-1 that LUNs 106-1, 106-2, 106-3, and 106-4 are accessible via any of the LIFs 160-1, 160-2, and 160-3, such that the host 102-1 may regain access (e.g., A/NO path) to LUNs 106-1, 106-2, and 106-3 via LIF 160-4 and regain access (e.g., A/NO path) to LUN 106-4 via LIFs 160-1, 160-2, and 160-3 after the interconnect recovery 402. The embodiments are not limited to these examples.

Figure 9A:
FIG. 9A illustrates an embodiment of a logic flow of data mobility in the non-disruptive cluster storage system during an interconnect failure.

FIG. 9A illustrates one embodiment of a logic flow 900. The logic flow 900 may be representative of some or all of the operations executed by one or more embodiments described herein.

In the illustrated embodiment shown in FIG. 9A, the logic flow 900 may start at 902 and provide access states for at least two logical interfaces to a host communicatively coupled to the at least two logical interfaces managed by at least two cluster nodes, the at least two logical interfaces including a first logical interface managed by a source cluster node and configured to provide access to a first storage unit, and a second logical interface managed by a destination cluster node configured to provide access to a second storage unit, the source and destination cluster nodes being located in separate partitions at 904. For example, SCSI-T components 224-1, 224-2, 224-3, and 224-4 may provide ALUA access states for LIFs 106-1, 106-2, 106-3, and 106-4 to host 102-1 communicatively coupled to the LIFs 106-1, 106-2, 106-3, and 106-4 managed by cluster nodes 104-1, 104-2, 104-3, and 104-4 and configured to provide access to LUNs 106-1, 106-2, 106-3 and 106-4. Additionally, a partition event (e.g., interconnect failure 304) may further separate the cluster 150 into a majority partition and a minority partition, where the source cluster node 104-3 is located in the majority partition with cluster nodes 104-1 and 104-2 and the destination cluster node 104-4 is located in the minority partition. Furthermore, because of the partition event separating cluster nodes 104 into a majority partition and a minority partition, host 102-1 may access LUN 106-1 106-2, and 106-3 via any of the LIFs 160-1, 160-2, and 160-3, but may not access LUN 106-4 via any of the LIFs 160-1, 160-2, and 160-3. However, the host 102-1 may access LUN 106-4 via LIF 160-4 but may not access LUNs 106-1, 106-2, and 106-3 via LIF 160-4.

The logic flow 900 may optionally provide a pre-relocation information, in response to receiving a pre-relocation notification indicating a data mobility event of the first storage unit from source cluster node to the destination cluster node at 906. For example, disk manager component 234-3 of source cluster node 104-3 may provide pre-relocation information, in response to receiving a pre-relocation notification from data mobility component 213-3 of source cluster node 104-3 by generating the pre-relocation information which may include, without limitation, a list of relocating storage unit(s) such as relocating volume 116-3, an identifier associated with the Data Blade component 220-3 of source cluster node 104-3, and/or an identifier associated with Data Blade component 220-4 of destination cluster node 104-4. The pre-relocation notification may indicate the start or beginning of the data mobility event 502 of a storage unit such as volume 116-3 being relocated from source cluster node 104-3 to destination cluster node 104-4.

The logic flow 900 may optionally remove management responsibility for the first storage unit in response to receiving the pre-relocation information at 908. For example, management kernel agent 222-3 of source cluster node 104-3 may optionally remove management responsibility for the volume 116-3, in response to receiving the pre-relocation information by removing the node-locality (i.e., super member) type attribute 266 from distributed volume group managing volume 116-3. It may be appreciated that because source cluster node 104-3 no longer hosts, owns, and/or manages the volume 116-3, any transactions associated with transaction manager 204-3 of source cluster node 104-3 requiring volume 116-3 will now begin to fail.

The logic flow 900 may protect integrity of information stored in at least the first storage unit and accessed via the first logical interface at 910. For example, the SCIS-T components 224-1, 224-2, and 224-3 may protect the integrity of information stored in the volume 116-3 and accessed via LIFs 160-1, 160-2, and 160-3 by fencing any access requests received via LIFs 160-1, 160-2, and 160-3 to access LUN 106-3 contained in the relocating volume 116-3.

The logic flow 900 may optionally provide post-relocation information, in response to receiving a post-relocation notification indicating the completion of the data mobility event of the first storage unit to the destination cluster node at 912. For example, disk manager component 234-3 of source cluster node 104-3 may provide post-relocation information, in response to receiving a post-relocation notification from data mobility component 212-3 of source cluster node 104-3 indicating the completion of the data mobility event 502 of the first storage unit such as volume 116-3 from source cluster node 104-3 to destination cluster node 104-4. The post-relocation information may include, without limitation, a list of relocated storage unit(s) such as relocated volume 116-3, an identifier associated with the Data Blade component 220-3 of source cluster node 104-3, and/or an identifier associated with Data Blade component 220-4 of destination cluster node 104-4.

The logic flow 900 may disassociate from the first storage unit, in response to receiving the post-relocation information at 914. For example, management kernel agent components 222-1, 222-2, and 222-3 of cluster nodes 104-1 and 104-2, and source cluster node 104-3 may disassociate from the relocated volume 116-3, in response to receiving the post-relocation information by distributing a received post-relocation information to one or more components such as BII components 228-1, 228-2, and 228-3 of cluster nodes 104-1 and 104-2 and source cluster node 104-3 in order to at least update cached volume location information. Additionally, management kernel agent components 222-1, 222-2, and 222-3 may also leave distributed volume group for volume 116-3, and purge workspace of this distributed volume group. Management kernel agent components 222-1, 222-2, and 222-3 may further remove mapped LUN 106-3 for relocated volume 116-3 from SCSI-T components 224-1, 224-2, and 224-3. In response, the SCSI-T components 224-1, 224-2, and 224-3 may leave LU group corresponding to the removed mapped LUN 106-3 and purge workspace of this LU group.

The logic flow 900 may update at least one access state for the first logical interface managed by the source cluster node to disable the host access to the first storage unit via the first logical interface at 916. For example, the SCSI-T components 224-1, 224-2, and 224-3 of cluster node 104-1, 104-2, and source cluster node 104-3, may update at least ALUA access states for LIFs 160-1, 160-2, and 160-3 from the POV of cluster nodes 104-1 and 104-2, and source cluster node 104-3 to disable the host access to LUN 106-3 by indicating that the LUN 106-3 previously managed by source cluster node 104-3 is now not reported (-) (i.e., inaccessible) via LIFs 160-1, 160-2, and 160-3. It may be appreciated that the SCSI-T components 224-1, 224-2, and 224-3 may update the ALUA access states for at least LIFs 160-1, 160-2, and 160-3 based at least partially on the quorum status information, cached volume location information, and/or volume access state information, as previously discussed.

The logic flow 900 may notify the host of at least one updated access state for at least the first logical interface at 918. SCSI-T components 224-1, 224-2, and 224-3 may notify the host 102-1 regarding the updated ALUA access states for LIFs 160-1, 160-2, and 160-3 from POV of cluster nodes 104-1 and 104-2, and source cluster node 104-3 by notifying the host 102-1 that there is a LUN change indicating a LUN inventory update and LUN 106-3 is now inaccessible (e.g., not reported (-)) via LIFs 160-1, 160-2, and 160-3.

The logic flow 900 may provide the at least one updated access state for at least the first logical interface to the host, such that the host maintains access to the first storage unit via at least the second logical interface after the data mobility event at 920 and end at 922. For example, SCSI-T components 224-1, 224-2, and 224-3 of cluster nodes 104-1, 104-2 and source cluster node 104-3 may provide updated ALUA access states for LIFs 160-1, 160-2, and 160-3 from POV of cluster nodes 104-1, 104-2, and source cluster node 104-3 indicating to the host 102-1 that LUN 106-3 is no longer accessible via any of the LIFs 160-1, 160-2, and 160-3. However, SCSI-T component 224-4 of destination cluster node may provide updated ALUA access states for at least LIF 160-4 from POV of cluster node 104-4 indicating to host 102-1 that LUN 106-3 is accessible via at least LIF 160-4, such that the host 102-1 may maintain access (e.g., A/O path) to LUN 106-3 via LIF 160-4 after the data mobility event 502. The embodiments are not limited to these examples.

Figure 9B:
FIG. 9B illustrates another embodiment of a logic flow of data mobility in the non-disruptive cluster storage system during an interconnect failure.

FIG. 9B illustrates one embodiment of a logic flow 930. The logic flow 930 may be representative of some or all of the operations executed by one or more embodiments described herein.

In the illustrated embodiment shown in FIG. 9A, the logic flow 930 may start at 932 and provide access states for at least two logical interfaces to a host communicatively coupled to the at least two logical interfaces managed by at least two cluster nodes, the at least two logical interfaces including a first logical interface managed by a source cluster node and configured to provide access to a first storage unit, and a second logical interface managed by a destination cluster node configured to provide access to a second storage unit, the source and destination cluster nodes being located in separate partitions at 934. For example, SCSI-T components 224-1, 224-2, 224-3, and 224-4 may provide ALUA access states for LIFs 106-1, 106-2, 106-3, and 106-4 to host 102-1 communicatively coupled to the LIFs 106-1, 106-2, 106-3, and 106-4 managed by cluster nodes 104-1, 104-2, 104-3, and 104-4 and configured to provide access to LUNs 106-1, 106-2, 106-3 and 106-4, respectively. Additionally, a partition event (e.g., interconnect failure 168) may further separate the cluster 150 into a majority partition and a minority partition, where the source cluster node 104-3 with cluster nodes 104-1 and 104-2 being located in the majority partition and the destination cluster node 104-4 being located in the minority partition. Furthermore, because of the partition event separating cluster nodes 104 into a majority partition and a minority partition, host 102-1 may access LUN 106-1 106-2, and 106-3 via any of the LIFs 160-1, 160-2, and 160-3, but may not access LUN 106-4 via any of the LIFs 160-1, 160-2, and 160-3. However, the host 102-1 may access LUN 106-4 via LIF 160-4 but may not access LUNs 106-1, 106-2, and 106-3 via LIF 160-4.

The logic flow 930 may optionally provide mount information, in response to receiving a mount notification indicating availability of the first storage unit at the destination cluster node after a data mobility event at 936. For example, the disk manager component 234-4 may provide mount information by generating the mount information which may include, without limitation, a list of relocated storage unit(s) such as relocated volume 116-3, an associated identifier of the Data Blade component 220-3 of the source cluster node 104-3, and/or an associated identifier of the Data Blade component 220-4 of the destination cluster node 104-4, in response to receiving a mount notification from storage interface component 232-4 (not shown) of cluster node 104-4 indicating availability of the relocated volume 116-3 at the cluster node 104-4 after a data mobility event 502. The disk manager component 234-4 may then provide the generated mount information to management kernel agent component 222-4 of cluster node 104-4.

The logic flow 930 may associate with the first storage unit, in response to receiving the mount information at 938. For example, management kernel agent component 222-4 may associate with the relocated volume 116-3, in response to receiving the mount information by joining distributed volume group for volume 116-3 and providing SCSI-T component 224-4 with volume configuration information for volume 116-3 which may include, without limitation, mapped LUN 106-3 for relocated volume 116-3. In response to the volume configuration information, SCSI-T component 224-4 may join the distributed LU group for mapped LUN 106-3. It may be appreciated that during the association with the first storage unit, the management kernel agent component 222-4 may also optionally distribute the received mount information to other management kernel agent components 222 that are in the same partition and involved in the same Vserver 120-1 as the management kernel agent component 222-4, in response to receiving the mount information, so that other cluster nodes 104 may also associate with the first storage unit in a similar manner as discussed above with respect to management kernel agent component 222-4 at 938.

The logic flow 930 may optionally enable management responsibility of the first storage unit, in response to receiving the mount information at 940. For example, management kernel agent component 222-4 may optionally enable management responsibility of the volume 116-3 and/or LUN 106-3, in response to receiving the mount information by configuring the distributed volume group managing relocated volume 116-3 and/or the distributed LU group managing the mapped LUN 106-3 with node-locality (i.e., super member) type attribute 266. Moreover, to enable management responsibility for volume 116-3, the management kernel agent component 222-4 may notify the transaction manager component 204-4 upon joining the distributed volume group managing the relocated volume 116-3 that the management kernel agent component 222-4 is a super member of the distributed volume group managing volume 116-3. Furthermore, to enable management responsibility for mapped LUN 106-3, the SCSI-T component 224-4 may notify the transaction manager component 204-4 upon joining the distributed LU group managing the relocated LUN 106-3 that the SCSI-T component 222-4 is a super member of the distributed LU group managing mapped LUN 106-3.

The logic flow 930 may update at least one access state for the second logical interface managed by the destination cluster node to enable the host access to the first storage unit via the second logical interface at 942. For example, the SCSI-T component 224-4 of destination cluster node 104-4 may update at least ALUA access states for LIF 160-4 from the POV of destination cluster node 104-4 to enable the host access to LUN 106-3 by indicating that the LUN 106-3 previously managed by source cluster node 104-3 is now accessible (-) (e.g., A/O path) via LIF 160-4 managed by destination cluster node 104-4. It may be appreciated that the SCSI-T component 224-4 may update the ALUA access states for a least LIF 160-4 based at least partially on the quorum status information, cached volume location information, and/or volume access state information, as previously discussed.

The logic flow 930 may notify the host of at least one updated access state for at least the second logical interface at 944. SCSI-T component 224-4 of destination cluster node 104-4 may notify the host 102-1 regarding the updated ALUA access states for LIF 160-4 from POV of cluster node 104-4 by notifying the host 102-1 that there is a LUN change indicating a LUN inventory update and LUN 106-3 is now accessible (e.g., A/O path) via LIF 160-4 managed by cluster node 104-4.

The logic flow 930 may provide the at least one updated access state for at least the second logical interface to host, such that the host maintains access to the first storage unit via at least the second logical interface after the data mobility event at 946 and end at 948. For example, SCSI-T components 224-1, 224-2, and 224-3 of cluster nodes 104-1, 104-2 and source cluster node 104-3 may provide updated ALUA access states for LIFs 160-1, 160-2, and 160-3 from POV of cluster nodes 104-1, 104-2, and source cluster node 104-3 indicating to the host 102-1 that LUN 106-3 is no longer accessible via any of the LIFs 160-1, 160-2, and 160-3. However, SCSI-T component 224-4 of the destination cluster node 104-4 may provide updated ALUA access states for at least LIF 160-4 from POV of cluster node 104-4 indicating to host 102-1 that LUN 106-3 is accessible via at least LIF 160-4, such that the host 102-1 may maintain access (e.g., A/O path) to LUN 106-3 via LIF 160-4 after the data mobility event. The embodiments are not limited to these examples.

Figure 10A:
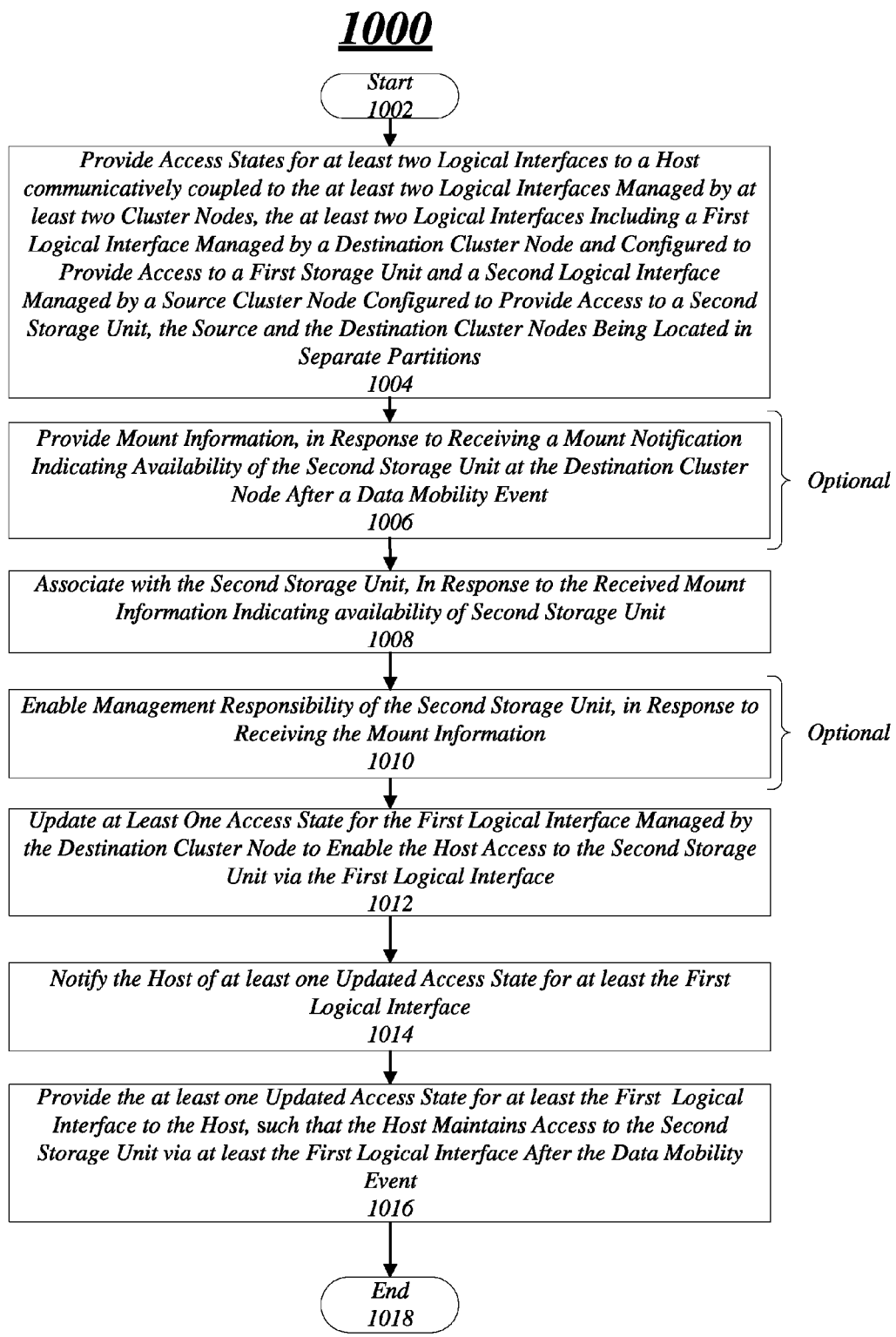
FIG. 10A illustrates yet another embodiment of a logic flow of data mobility in the non-disruptive cluster storage system during an interconnect failure.

FIG. 10A illustrates one embodiment of a logic flow 1000. The logic flow 1000 may be representative of some or all of the operations executed by one or more embodiments described herein.

In the illustrated embodiment shown in FIG. 10A, the logic flow 1000 may start at 1002 and provide access states for at least two logical interfaces to a host communicatively coupled to the at least two logical interfaces managed by at least two cluster nodes, the at least two logical interfaces including a first logical interface managed by a destination cluster node and configured to provide access to a first storage unit, and a second logical interface managed by a source cluster node configured to provide access to a second storage unit, the source and destination cluster nodes being located in separate partitions at 1004. For example, SCSI-T components 224-1, 224-2, 224-3, and 224-4 may provide ALUA access states for LIFs 106-1, 106-2, 106-3, and 106-4 to host 102-1 communicatively coupled to the LIFs 106-1, 106-2, 106-3, and 106-4 managed by cluster nodes 104-1, 104-2, 104-3, and 104-4 and configured to provide access to LUNs 106-1, 106-2, 106-3 and 106-4, respectively. Additionally, a partition event (e.g., interconnect failure 168) may further separate the cluster 150 into a majority partition and a minority partition, where the destination cluster node 104-3 with cluster nodes 104-1 and 104-2 being located in the majority partition and the source cluster node 104-4 being located in the minority partition. Furthermore, because of the partition event separating cluster nodes 104 into a majority partition and a minority partition, host 102-1 may access LUN 106-1 106-2, and 106-3 via any of the LIFs 160-1, 160-2, and 160-3, but may not access LUN 106-4 via any of the LIFs 160-1, 160-2, and 160-3. However, the host 102-1 may access LUN 106-4 via LIF 160-4 but may not access LUNs 106-1, 106-2, and 106-3 via LIF 160-4.

The logic flow 1000 may optionally provide mount information, in response to receiving a mount notification indicating availability of the first storage unit at the destination cluster node after a data mobility event at 1006. For example, the disk manager component 234-3 may provide mount information by generating the mount information which may include, without limitation, a list of relocated storage unit(s) such as relocated volume 116-4, an associated identifier of the Data Blade component 220-4 of the source cluster node 104-4, and/or an associated identifier of the Data Blade component 220-3 of the destination cluster node 104-3, in response to receiving a mount notification from storage interface component 232-3 (not shown) of cluster node 104-3 indicating availability of the relocated volume 116-4 at the cluster node 104-3 after a data mobility event 602. The disk manager component 234-3 may then provide the generated mount information to management kernel agent component 222-3 of cluster node 104-3.

The logic flow 1000 may associate with the second storage unit, in response to receiving the mount information at 1008. For example, management kernel agent component 222-3 may associate with the relocated volume 116-4, in response to receiving the mount information by joining distributed volume group for volume 116-4 and providing SCSI-T component 224-3 with volume configuration information for volume 116-4 which may include, without limitation, mapped LUN 106-4 for relocated volume 116-4. In response to the volume configuration information, SCSI-T component 224-3 may join the distributed LU group for mapped LUN 106-4. It may be appreciated that during the association with the second storage unit, the management kernel agent component 222-3 may also optionally distribute the received mount information to management kernel agent components 222-1 and 222-2 of cluster nodes 104-1 and 104-2 that in the same partition and involved in the same Vserver 120-1 as the management kernel agent component 222-3, in response to receiving the mount information, so that cluster nodes 104-1 and 104-2 may also associate with the second storage unit in a similar manner as discussed above with respect to management kernel agent component 222-3 at 1008.

The logic flow 1000 may optionally enable management responsibility of the first storage unit, in response to receiving the mount information at 1010. For example, management kernel agent component 222-3 may optionally enable management responsibility of the volume 116-4 and/or LUN 106-4, in response to receiving the mount information by configuring the distributed volume group managing relocated volume 11643 and/or the distributed LU group managing the mapped LUN 106-4 with node-locality (i.e., super member) type attribute 266. Moreover, to enable management responsibility for volume 116-4, the management kernel agent component 222-3 may notify the transaction manager component 204-3 upon joining the distributed volume group managing the relocated volume 116-4 that the management kernel agent component 222-3 is a super member of the distributed volume group managing volume 116-4. Furthermore, to enable management responsibility for mapped LUN 106-4, the SCSI-T component 224-3 may notify the transaction manager component 204-3 upon joining the distributed LU group managing the relocated LUN 106-4 that the SCSI-T component 224-3 is a super member of the distributed LU group managing mapped LUN 106-4.

The logic flow 1000 may update at least one access state for the first logical interface managed by the destination cluster node to enable the host access to the second storage unit via the first logical interface at 1012. For example, the SCSI-T component 224-3 of destination cluster node 104-3 may update ALUA access states for at least LIFs 160-1, 160-2, and 160-3 from the POV of destination cluster node 104-3 to enable the host access to LUN 106-4 by indicating that the LUN 106-4 previously managed by source cluster node 104-4 is now accessible (-) (e.g., A/O path and/or A/NO path) via at least LIFs 160-1, 160-2, and 160-3. It may be appreciated that the SCSI-T component 224-4 may update the ALUA access states for a least LIFs 160-1, 160-2, and 160-3 based at least partially on the quorum status information, cached volume location information, and/or volume access state information, as previously discussed.

The logic flow 1000 may notify the host of at least one updated access state for at least the first logical interface at 1014. SCSI-T component 224-3 of destination cluster node 104-3 may notify the host 102-1 regarding the updated ALUA access states for at least LIFs 160-1, 160-2, and 160-3 from POV of cluster node 104-3 by notifying the host 102-1 that there is a LUN change indicating a LUN inventory update and LUN 106-4 is now accessible (e.g., A/O path and/or A/NO path) via at least LIFs 160-1, 160-2, and 160-3.

The logic flow 1000 may provide the at least one updated access state for at least the first logical interface to host, such that the host maintains access to the second storage unit via at least the first logical interface after the data mobility event at 1016 and end at 1018. For example, SCSI-T components 224-1, 224-2, and 224-3 of cluster nodes 104-1, 104-2 and destination cluster node 104-3 may provide updated ALUA access states for LIFs 160-1, 160-2, and 160-3 from POV of cluster nodes 104-1, 104-2, and destination cluster node 104-3 indicating to the host 102-1 that LUN 106-4 is now accessible via any of the LIFs 160-1, 160-2, and 160-3, such that the host 102-1 may maintain access (e.g., A/O path and/or A/NO path) to LUN 106-4 via LIFs 160-1, 160-2, and 160-3 after the data mobility event. However, SCSI-T component 224-4 of the source cluster node 104-4 may provide updated ALUA access states for at least LIF 160-4 from POV of cluster node 104-4 indicating to host 102-1 that LUN 106-4 is no longer accessible via at least LIF 160-4. The embodiments are not limited to these examples.

FIG. 10B illustrates one embodiment of a logic flow 1030. The logic flow 1030 may be representative of some or all of the operations executed by one or more embodiments described herein.

In the illustrated embodiment shown in FIG. 10B, the logic flow 1030 may start at 1032 and provide access states for at least two logical interfaces to a host communicatively coupled to the at least two logical interfaces managed by at least two cluster nodes, the at least two logical interfaces including a first logical interface managed by a destination cluster node and configured to provide access to a first storage unit, and a second logical interface managed by a source cluster node configured to provide access to a second storage unit, the source and destination cluster nodes being located in separate partitions at 1034. For example, SCSI-T components 224-1, 224-2, 224-3, and 224-4 may provide ALUA access states for LIFs 106-1, 106-2, 106-3, and 106-4 to host 102-1 communicatively coupled to the LIFs 106-1, 106-2, 106-3, and 106-4 managed by cluster nodes 104-1, 104-2, 104-3, and 104-4 and configured to provide access to LUNs 106-1, 106-2, 106-3 and 106-4. Additionally, a partition event (e.g., interconnect failure 304) may further separate the cluster 150 into a majority partition and a minority partition, where the source cluster node 104-3 and cluster nodes 104-1 and 104-2 are located in the majority partition and the destination cluster node 104-4 is located in the minority partition. Furthermore, because of the partition event separating cluster nodes 104 into a majority partition and a minority partition, host 102-1 may access LUN 106-1 106-2, and 106-3 via any of the LIFs 160-1, 160-2, and 160-3, but may not access LUN 106-4 via any of the LIFs 160-1, 160-2, and 160-3. However, the host 102-1 may access LUN 106-4 via LIF 160-4 but may not access LUNs 106-1, 106-2, and 106-3 via LIF 160-4.

The logic flow 1030 may optionally provide a pre-relocation information, in response to receiving a pre-relocation notification indicating a data mobility event of the first storage unit from source cluster node to the destination cluster node at 1036. For example, disk manager component 234-4 of source cluster node 104-4 may provide pre-relocation information, in response to receiving a pre-relocation notification from data mobility component 213-3 of source cluster node 104-3 by generating the pre-relocation information which may include, without limitation, a list of relocating storage unit(s) such as relocating volume 116-4, an identifier associated with the Data Blade component 220-4 of source cluster node 104-4, and/or an identifier associated with Data Blade component 220-3 of destination cluster node 104-3. The pre-relocation notification may indicate the start or beginning of the data mobility event 602 of a storage unit such as volume 116-4 being relocated from source cluster node 104-4 to destination cluster node 104-3.

The logic flow 1030 may optionally remove management responsibility for the second storage unit in response to receiving the pre-relocation information at 1038. For example, management kernel agent 222-4 of source cluster node 104-4 may optionally remove management responsibility for the volume 116-4, in response to receiving the pre-relocation information by removing the node-locality (i.e., super member) type attribute 266 from distributed volume group managing volume 116-4. It may be appreciated that because source cluster node 104-4 no longer hosts, owns, and/or manages the volume 116-4, any transactions associated with transaction manager 204-4 of source cluster node 104-4 requiring volume 116-4 will now begin to fail.

The logic flow 1030 may protect integrity of information stored in at least the second storage unit and accessed via the second logical interface at 1040. For example, the SCIS-T component 224-4 may protect the integrity of information stored in the volume 116-4 and accessed via LIF 160-4 by fencing any access requests received via LIF 160-4 to access LUN 106-4 contained in the relocating volume 116-4.

The logic flow 1030 may optionally provide post-relocation information, in response to receiving a post-relocation notification indicating the completion of the data mobility event of the second storage unit to the destination cluster node at 1042. For example, disk manager component 234-4 of source cluster node 104-4 may provide post-relocation information, in response to receiving a post-relocation notification from data mobility component 212-4 of source cluster node 104-4 indicating the completion of the data mobility event 602 of the second storage unit such as volume 116-4 from source cluster node 104-4 to destination cluster node 104-3. The post-relocation information may include, without limitation, a list of relocated storage unit(s) such as relocated volume 116-4, an identifier associated with the Data Blade component 220-4 of source cluster node 104-4, and/or an identifier associated with Data Blade component 220-3 of destination cluster node 104-3.

The logic flow 1030 may disassociate from the second storage unit, in response to receiving the post-relocation information at 1044. For example, management kernel agent component 222-4 of source cluster node 104-4 may disassociate from the relocated volume 116-4, in response to receiving the post-relocation information by distributing a received post-relocation information to one or more components such as BII component 228-4 of destination cluster node 104-4 in order to at least update cached volume location information. Additionally, management kernel agent component 222-4 may also leave distributed volume group for volume 116-4, and purge workspace of this distributed volume group. Management kernel agent component 222-4 may further remove mapped LUN 106—for relocated volume 116-4 from SCSI-T components 224-4. In response, the SCSI-T component 224-4 may leave LU group corresponding to the removed mapped LUN 106-4 and purge workspace of this LU group.

The logic flow 1030 may update at least one access state for the first logical interface managed by the source cluster node to disable the host access to the first storage unit via the first logical interface at 1046. For example, the SCSI-T component 224-4 of source cluster node 104-4, may update the ALUA access state for LIF 160-4 from the POV of source cluster node 104-4 to disable the host access to LUN 106-4 by indicating that the LUN 106-4 previously managed by source cluster node 104-4 is now not reported (-) (i.e., inaccessible) via at least the LIF 160-4. It may be appreciated that the SCSI-T component 224-4 may update the ALUA access state for LIF 160-4 based at least partially on the quorum status information, cached volume location information, and/or volume access state information, as previously discussed.

The logic flow 1030 may notify the host of at least one updated access state for at least the second logical interface at 1048. SCSI-T component 224-4 may notify the host 102-1 regarding the updated ALUA access state for LIF 160-4 from POV of source cluster node 104-4 by notifying the host 102-1 that there is a LUN change indicating a LUN inventory update and LUN 106-4 is now inaccessible (e.g., not reported (-)) via LIF 160-4.

The logic flow 1030 may provide the at least one updated access state for at least the first logical interface to the host, such that the host maintains access to the first storage unit via at least the second logical interface after the data mobility event at 1050 and end at 1052. For example, SCSI-T component 224-4 of source cluster node 104-4 may provide updated ALUA access state for LIF 160-4 from POV of source cluster node 104-4 indicating to the host 102-1 that LUN 106-4 is no longer accessible via at least the LIF 160-4. However, SCSI-T components 224-1, 224-2, and 224-3 of cluster nodes 104-1 and 104-2 and destination cluster node 104-3 may provide updated ALUA access states for at least LIFs 160-1, 160-2, and 160-3 from POV of cluster nodes 104-1 and 104-2 and destination cluster node 104-3 indicating to host 102-1 that LUN 106-4 is accessible via at least LIFs 160-1, 160-2, and 160-3, such that the host 102-1 may maintain access (e.g., A/O path and/or A/NO path) to LUN 106-4 via LIFs 160-1, 160-2, and 160-3 after the data mobility event 602. The embodiments are not limited to these examples.

Included herein is a set of non-limiting exemplary embodiments that is representative of at least some of the novel aspects of the disclosed architecture. It may be appreciated that not all exemplary embodiments are necessary for a novel implementation and in at least some of the non-limiting exemplary embodiments, the one or more components, instructions, steps, elements, and/or features may vary based at least partially on one or more implementations.

In a first non-limiting exemplary embodiment, the disclosed architecture may include, but is not limited to, a computer-implemented method, comprising the steps of providing access states for at least two logical interfaces to a host, the at least two logical interfaces comprising a first logical interface configured to provide access to a first storage unit and a second logical interface configured to provide access to a second storage unit; associating with at least one cluster node previously in a minority partition; updating at least one access state for at least one logical interface; notifying the host of the at least updated access state for the at least one logical interface; and providing the at least one updated access state for the at least one logical interface, such that the host regains access to the first and second storage unit via either the first logical interface or the second logical interface after the interconnect recovery.

With continued reference to the first non-limiting exemplary embodiment of the computer-implemented method, the computer-implemented method may further comprise determining whether the interconnect recovery has occurred between two different partitions; and notifying at least one component of at least one cluster node with status information of other cluster nodes, after determining that the interconnect recovery has occurred.

With continued reference to the first non-limiting exemplary embodiment of the computer-implemented method, the computer-implemented may further comprise receiving status information indicating that the interconnect recovery has occurred.

With continued reference to the first non-limiting exemplary embodiment of the computer-implemented method, wherein the step of determining further comprises sending at least one heartbeat signal to the at least one cluster node previously in the minority partition; receiving at least one heartbeat response signal, in response to the at least one heartbeat signal; and determining occurrence of the interconnect recovery based at least partially on a threshold number of received heartbeat response signals.

With continued reference to the first non-limiting exemplary embodiment of the computer-implemented method, wherein the step of associating further comprises requesting to join at least one group managing at least one storage unit; and acquiring information associated with at least one storage unit.

With continued reference to the first non-limiting exemplary embodiment of the computer-implemented method, wherein the host is communicatively coupled to at least the first and second logical interfaces and the first and second storage units are managed by at least two cluster nodes in at least two different partitions of a cluster before the interconnect recovery.

With continued reference to the first non-limiting exemplary embodiment of the computer-implemented method, and the occurrence of the interconnect recovery is determined based at least partially on connectivity with the at least cluster node previously in the minority partition.

In the first non-limiting exemplary embodiment, the disclosed architecture may also include, but is not limited to, a system, comprising a processor circuit; and memory operatively coupled to the processor circuit, the memory comprising a storage operating system for execution by the processor circuit and at least one component to provide access states for at least two logical interfaces to a host, the at least two logical interfaces comprising a first logical interface configured to provide access to a first storage unit and a second logical interface configured to provide access to a second storage unit, update at least one access state for at least one logical interface, notify the host of the at least one updated access state for the at least one logical interface, and provide the at least one updated access state for the at least one logical interface, such that the host regains access to the first and second storage unit via either the first logical interface or the second logical interface after the interconnect recovery.

With continued reference to the first non-limiting exemplary embodiment of the system, wherein the at least one component is to further receive status information indicating that interconnect recovery has occurred, and associate with at least one cluster node previously in a different partition.

With continued reference to the first non-limiting exemplary embodiment of the system, wherein the at least one component associates with the at least one cluster node is to further request to join at least one group managing at least one storage unit, and acquire information associated with at least one storage unit.

With continued reference to the first non-limiting exemplary embodiment of the system, wherein the first storage unit is accessible by the host via the first logical interface and inaccessible by the host via the second logical interface before the interconnect recovery, and the second storage unit is accessible by host via the second logical interface and inaccessible by the host via the first logical interface before the interconnect recovery.

With continued reference to the first non-limiting exemplary embodiment of the system, wherein the at least one component updates access state for at least one logical interface is to further update access state for the first logical interface to enable the host access to the second storage unit via the first logical interface, and update access state for the second logical interface to enable host access to the first storage unit via the second logical interface.

With continued reference to the first non-limiting exemplary embodiment of the system, wherein the first storage unit is managed by a first cluster node in a majority partition, the second storage unit is managed by a second cluster node in a minority partition, and the status information indicates that the second cluster node is at least in-quorum after the interconnect recovery.

With continued reference to the first non-limiting exemplary embodiment of the system, wherein the host is communicatively coupled to at least the first and second logical interfaces and the first and second storage units are managed by at least two cluster nodes in at least two different partitions of a cluster before the interconnect recovery.

In the first non-limiting exemplary embodiment, the disclosed architecture may further include, but is not limited to, at least one computer-readable storage medium comprising instructions that, when executed, cause a system to provide access states for at least two logical interfaces to a host, the at least two logical interfaces comprising a first logical interface configured to provide access to a first storage unit and a second logical interface configured to provide access to a second storage unit; associate with at least one cluster node previously in a majority partition; update at least one access state for at least one logical interface; notify the host of the at least updated access state for the at least one logical interface; and provide the at least one updated access state for the at least one logical interface, such that the host regains access to the first and second storage unit via either the first logical interface or the second logical interface after the interconnect recovery.

With continued reference to the first non-limiting exemplary embodiment of the at least one computer-readable storage medium, wherein the instructions to associate with the at least one cluster node, when executed, further cause the system to request to join at least one group managing at least one storage unit; and acquire information associated with at least one storage unit.

With continued reference to the first non-limiting exemplary embodiment of the at least one computer-readable storage medium, wherein the instructions, when executed, further cause the system to determine whether the interconnect recovery has occurred in the cluster based at least partially on connectivity with the at least one cluster node previously in the majority partition; receive status information indicating that the interconnect recovery has occurred; and transition to majority partition when the interconnect has occurred by performing at least a soft-reset and evicting at least one component from at least one distributed group managing at least one storage unit.

With continued reference to the first non-limiting exemplary embodiment of the at least one computer-readable storage medium, wherein the instructions to determine whether the interconnect recovery has occurred, when executed, further cause the system to receive at least one heartbeat signal from at least one cluster node in the majority partition; and determine occurrence of the interconnect recovery based at least partially on a threshold number of heartbeat signals received from the at least one cluster node.

With continued reference to the first non-limiting exemplary embodiment of the at least one computer-readable storage medium, wherein the host is communicatively coupled to at least the first and second logical interfaces and the first and second storage units are managed by at least two cluster nodes in at least two different partitions of a cluster before the interconnect recovery.

With continued reference to the first non-limiting exemplary embodiment of the at least one computer-readable storage medium, wherein the first storage unit is accessible by the host via the first logical interface and inaccessible by the host via the second logical interface before the interconnect recovery, and the second storage unit is accessible by host via the second logical interface and inaccessible by the host via the first logical interface before the interconnect recovery.

In a second non-limiting exemplary embodiment, the disclosed architecture may include, but is not limited to, a computer-implemented method, comprising providing access states for at least two logical interfaces to a host, the logical interface comprising a first logical interface managed by a source cluster node configured to provide access to a first storage unit and a second logical interface managed by a destination cluster node and configured to provide access to a second storage unit; protecting integrity of information stored in at least the first storage unit via the first logical interface; disassociating from the first storage unit, in response to receiving post-relocation information; updating at least one access state for the first logical interface to disable the host access to the first storage unit via the first logical interface; notifying the host of at least one updated access state for at least the first logical interface; and providing the at least one updated access state for at least the first logical interface to the host, such that the host maintains access to the first storage unit via at least the second logical interface.

With continued reference to the second non-limiting exemplary embodiment of the computer-implemented method, further comprising providing pre-relocation information, in response to receiving a pre-relocation notification indicating a data mobility event; removing management responsibility for the first storage unit; and providing post re-location information, in response to receiving a post-relocation notification indicating the completion of the data mobility event.

With continued reference to the second non-limiting exemplary embodiment of the computer-implemented method, wherein the step of disassociating from the first storage unit further comprises leaving at least one group managing the first storage unit based at least partially on post-relocation information; and purging workspace associated with the at least one group managing the first storage unit.

With continued reference to the second non-limiting exemplary embodiment of the computer-implemented method, wherein the step of protecting integrity of information further comprises receiving at least one access request from the host to access information stored in at least the first storage unit via the first logical interface; and fencing access to at least the first storage unit by responding to the at least one access request to access the first storage unit with a response indicating that at least one access state is in transition.

With continued reference to the second non-limiting exemplary embodiment of the computer-implemented method, wherein the host is communicatively coupled to the first logical interface and the second logical interface and the source and destination cluster nodes are located in separate partitions.

In the second non-limiting exemplary embodiment, the disclosed architecture may also include, but is not limited to, a system, comprising a processor circuit; and memory operatively coupled to the processor circuit, the memory comprising a storage operating system for execution by the processor circuit and at least one component to provide access states for at least two logical interfaces to a host, the logical interface comprising a first logical interface managed by a source cluster node configured to provide access to a first storage unit and a second logical interface managed by a destination cluster node and configured to provide access to a second storage unit, protect integrity of information stored in at least the first storage unit via the first logical interface, disassociate from the first storage unit, in response to receiving post-relocation notification, and provide the at least one updated access state for the at least one logical interface to the host, such that the host maintains access to the first storage unit via at least the second logical interface.

With continued reference to the second non-limiting exemplary embodiment of the system, wherein the at least one component is to further provide the pre-relocation information, in response to receiving a pre-relocation notification indicating a data mobility event, remove management responsibility for the first storage unit, and provide post re-location information, in response to receiving a post-relocation notification indicating the completion of the data mobility event.

With continued reference to the second non-limiting exemplary embodiment of the system, wherein the least one component disassociates from the first storage unit is to further leave at least one group managing the first storage unit based at least partially on the post-relocation information, and purge workspace associated with the at least one group managing the first storage unit.

With continued reference to the second non-limiting exemplary embodiment of the system, wherein the at least one component is to further update at least one access state for the first logical interface to disable the host access to the first storage unit via the first logical interface, and notify the host of at least one updated access state for at least the first logical interface.

With continued reference to the second non-limiting exemplary embodiment of the system, wherein the at least one component protects integrity of information stored in at least the first storage unit is to further receive at least one access request from the host to access information stored in at least the first storage unit via the first logical interface, and fence access to at least the first storage unit by responding to the at least one access request to access the first storage unit with a response indicating that at least one access state is in transition.

With continued reference to the second non-limiting exemplary embodiment of the system, wherein the host is communicatively coupled to the first and the second logical interfaces, and the source and destination cluster nodes are located in separate partitions.

In the second non-limiting exemplary embodiment, the disclosed architecture may further include, but is not limited to, at least one computer-readable storage medium comprising instructions that, when executed, cause a system to provide access states for at least two logical interfaces to a host, the logical interface comprising a first logical interface managed by a source cluster node configured to provide access to a first storage unit and a second logical interface managed by a destination cluster node and configured to provide access to a second storage unit; disassociate from the first storage unit, in response to receiving a post-relocation notification; update at least one access state for the first logical interface to disable the host access to the first storage unit via the first logical interface; notify the host of at least one updated access state for at least the first logical interface; and provide the at least one updated access state for at least the first logical interface to the host, such that the host maintains access to the first storage unit via at least the second logical interface.

With continued reference to the second non-limiting exemplary embodiment of the at least one computer-readable storage medium, wherein the instructions, when executed, further cause the system to provide pre-relocation information, in response to receiving a pre-relocation notification indicating a data mobility event; remove management responsibility for the first storage unit; and provide post re-location information, in response to receiving a post-relocation notification indicating the completion of the data mobility event.

With continued reference to the second non-limiting exemplary embodiment of the at least one computer-readable storage medium, wherein the instructions to disassociate from the first storage unit, when executed, further cause the system to leave at least one group managing the first storage unit based at least partially on the post-relocation information; and purge workspace associated with the at least one group managing the first storage unit.

With continued reference to the second non-limiting exemplary embodiment of the at least one computer-readable storage medium, wherein the instructions, when executed, further cause the system to protect integrity of information stored in at least the first storage unit via the first logical interface.

With continued reference to the second non-limiting exemplary embodiment of the at least one computer-readable storage medium, wherein the instructions to protect integrity of information, when executed, further cause the system to receive at least one access request from the host to access information stored in at least the first storage unit via the first logical interface, and fence access to at least the first storage unit by responding to the at least one access request to access the first storage unit with a response indicating that at least one access state is in transition.

With continued reference to the second non-limiting exemplary embodiment of the at least one computer-readable storage medium, wherein the host is communicatively coupled to the first and the second logical interfaces, and the source and destination cluster nodes are located in separate partitions.

In a third non-limiting exemplary embodiment, the disclosed architecture may include, but is not limited to, a computer-implemented method, comprising providing access states for at least two logical interfaces to a host, the logical interface comprising a first logical interface managed by a source cluster node configured to provide access to a first storage unit and a second logical interface managed by a destination cluster node and configured to provide access to a second storage unit; associating with the first storage unit, in response to receiving mount information; updating at least one access state for the second logical interface to enable the host access to the first storage unit via the second logical interface; notifying the host of at least one updated access state for at least the second logical interface; and providing the at least one updated access state for the at least the second logical interface to the host, such that the host maintains access to the first storage unit via at least the second logical interface.

With continued reference to the third non-limiting exemplary embodiment of the computer-implemented method, further comprising providing the mount information, in response to receiving a mount notification, the mount information comprising a list of mounted storage units and indicating availability of at least the first storage unit; and enabling management responsibility of the first storage unit, in response to receiving the mount information.

With continued reference to the third non-limiting exemplary embodiment of the computer-implemented method, wherein the step of enabling ownership and management responsibility further comprising notifying a transaction manager component that at least one component of the destination cluster node is a super member, such that any transactions requiring the first storage unit will begin to succeed.

With continued reference to the third non-limiting exemplary embodiment of the computer-implemented method, wherein the host is communicatively coupled to the first and the second logical interfaces, and the source and destination cluster nodes are located in separate partitions.

With continued reference to the third non-limiting exemplary embodiment of the computer-implemented method, wherein the at least one access state before relocation of first storage unit indicates that the first logical interface is an active/optimized path to access the first storage unit and the second logical interface is an active/optimized path to access the second storage unit.

With continued reference to the third non-limiting exemplary embodiment of the computer-implemented method, wherein the at least one updated access state after relocation of the first storage unit indicates that the first and second logical interfaces are active/optimized paths to access the first and second storage units.

In a third non-limiting exemplary embodiment, the disclosed architecture may include, but is not limited to, a system, comprising a processor circuit; and memory operatively coupled to the processor circuit, the memory comprising a storage operating system for execution by the processor circuit and at least one component to provide access states for at least two logical interfaces to a host, the logical interface comprising a first logical interface managed by a source cluster node configured to provide access to a first storage unit and a second logical interface managed by a destination cluster node and configured to provide access to a second storage unit, associate with the first storage unit, in response to receiving mount information indicating availability of the first storage unit, and provide the at least one updated access state for the at least two logical interface to the host, such that the host maintains access to the first storage unit via at least the second logical interface.

With continued reference to the third non-limiting exemplary embodiment of the system, wherein the at least one component is to further provide the mount information, in response to receiving a mount notification, the mount information comprising a list of mounted storage units and indicating availability of at least the first storage unit, and enable management responsibility of the first storage unit, in response to receiving the mount information.

With continued reference to the third non-limiting exemplary embodiment of the system, wherein the at least one component associates with the first storage unit is to further update at least one access state for the second logical interface to enable the host access to the first storage unit via the second logical interface, notify the host of at least one updated access state for at least the second logical interface.

With continued reference to the third non-limiting exemplary embodiment of the system, wherein the host is communicatively coupled to the first and the second logical interfaces, and the source and destination cluster nodes are located in separate partitions.

With continued reference to the third non-limiting exemplary embodiment of the system, wherein the at least one access state before relocation of first storage unit indicates that the first logical interface is an active/optimized path to access the first storage unit and the second logical interface is an active/optimized path to access the second storage unit.

With continued reference to the third non-limiting exemplary embodiment of the system, wherein the at least one updated access state after relocation of the first storage unit indicates that the second logical interface is an active/optimized path to access the first and second storage units.

In a fourth non-limiting exemplary embodiment, the disclosed architecture may include, but is not limited to, at least one computer-readable storage medium comprising instructions that, when executed, cause a system to provide access states for at least two logical interfaces to a host, the logical interface comprising a first logical interface managed by a source cluster node configured to provide access to a first storage unit and a second logical interface managed by a destination cluster node and configured to provide access to a second storage unit; associate with the first storage unit, in response to a received mount information indicating availability of the first storage unit; update at least one access date for the second logical interface to indicate that the first logical interface is configured to access the first storage unit; notify the host of at least one updated access state for at least two logical interfaces; and provide the at least one updated access state for the at least two logical interface to the host, such that the host maintains access to the first storage unit via at least the second logical interface.

With continued reference to the fourth non-limiting exemplary embodiment of at least one computer-readable storage medium comprising instructions that, when executed, further cause the system to provide the mount information, in response to receiving a mount notification, the mount information comprising a list of mounted storage units and indicating availability of at least the first storage unit; and enable management responsibility of the first storage unit, in response to receiving the mount information.

With continued reference to the fourth non-limiting exemplary embodiment of at least one computer-readable storage medium, wherein the host is communicatively coupled to the first and the second logical interfaces, and the source and destination cluster nodes are located in separate partitions.

With continued reference to the fourth non-limiting exemplary embodiment of at least one computer-readable storage medium, wherein the at least one access state before relocation of first storage unit indicates that the first logical interface is an active/optimized path to access the first storage unit and the second logical interface is an active/optimized path to access the second storage unit.

With continued reference to the fourth non-limiting exemplary embodiment of at least one computer-readable storage medium, wherein the at least one updated access state after relocation of the first storage unit indicates that the first and second logical interfaces are active/optimized paths to access the first and second storage units.

In the fourth non-limiting exemplary embodiment, the disclosed architecture may also include, but is not limited to, a system, comprising a host configured to access information stored on a first storage unit and a second storage unit; a source cluster node in a majority partition communicatively coupled to the host via a first logical interface, the source cluster node being configured to provide access states for at least the first logical interface and provide access to the first storage unit; and a destination cluster node in a minority partition communicatively coupled to the host via a second logical interface, the destination cluster node being configured to provide access states for at least the second logical interface and provide access to the second storage unit, wherein the source and destination cluster nodes are configured to provide updated access states for the first and second logical interfaces, such that the host maintains access to the first storage unit via at least the second logical interface after an data mobility event.

With continued reference to the fourth non-limiting exemplary embodiment of the system, wherein the source cluster node is further configured to provide pre-relocation information in-response to receiving a pre-relocation notification indicating the data mobility event of the first storage unit from the source cluster node to the destination cluster node, remove management responsibility for the first storage unit, and provide post-relocation information in response to receiving a post-relocation notification.

With continued reference to the fourth non-limiting exemplary embodiment of the system, wherein the destination cluster node is further configured to provide mount information, in response to receiving a mount notification indicating availability of the first storage unit at the destination cluster node after the data mobility event and enable management responsibility of the first storage unit.

With continued reference to the fourth non-limiting exemplary embodiment of the system, wherein the source cluster node is further configured to protect integrity of information stored in at least the first storage unit and accessed via the first logical interface and disassociate from the first storage unit, in response to receiving the post-relocation information.

With continued reference to the fourth non-limiting exemplary embodiment of the system, wherein the destination cluster node is further configured to associate with the first storage unit, in response to receiving the mount information.

With continued reference to the fourth non-limiting exemplary embodiment of the system, wherein the source cluster node is further configured to update at least one access state for the first logical interface to disable the host access to the first storage unit via the first logical interface and notify the host of at least one updated access state for at least the first logical interface, and the destination cluster node is further configured to update at least one access state for the second logical interface to enable the host access to the first storage unit via the second logical interface and notify the host of at least one updated access state for at least the second logical interface.

Figure 11:
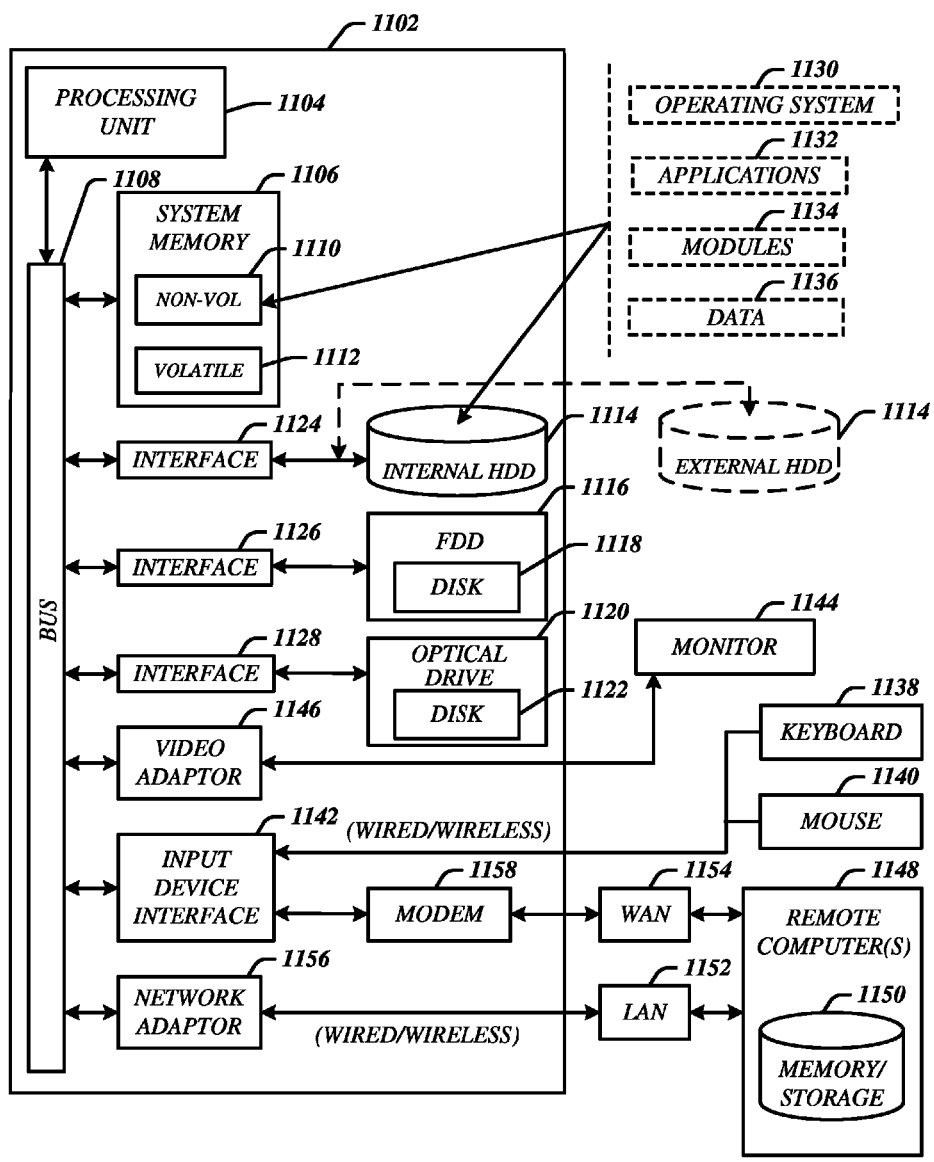
FIG. 11 illustrates an embodiment of a computing architecture.

FIG. 11 illustrates an embodiment of an exemplary computing architecture 1100 suitable for implementing various embodiments as previously described. In one embodiment, the computing architecture 1100 may comprise or be implemented as part of an electronic device. The embodiments are not limited in this context.

As used in this application, the terms "system" and "component" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, a program module, an application, an operating system, and/or a computer. By way of illustration, both an operating system running on a server and the server can be a component. In another illustration, both an application running on cluster node, and the cluster node can also be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1100.

As shown in FIG. 11, the computing architecture 1100 comprises a processing unit 1104, a system memory 1106 and a system bus 1108. The processing unit 1104 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1104.

The system bus 1108 provides an interface for system components including, but not limited to, the system memory 1106 to the processing unit 1104. The system bus 1108 can be any of several types of bus structure that may further interconnect to a memory bus (with or without a memory controller), a peripheral bus, and a local bus using any of a variety of commercially available bus architectures. Interface adapters may connect to the system bus 1108 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1100 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 11, the system memory 1106 can include non-volatile memory 1110 and/or volatile memory 1112. A basic input/output system (BIOS) can be stored in the non-volatile memory 1110.

The computer 1102 may include various types of computer-readable storage media in the form of one or more lower speed memory units, including an internal (or external) hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM or DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1110, 1112, including an operating system 1130 (e.g., a storage operating system), one or more application programs 1132, other program modules 1134, and program data 1136. In one embodiment, the one or more application programs 1132, other program modules 1134, and program data 1136 can include, for example, the various applications and/or components of the system 100.

A user can enter commands and information into the computer 1102 through one or more wire/wireless input devices, for example, a keyboard 1138 and a pointing device, such as a mouse 1140. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1104 through an input device interface 1142 that is coupled to the system bus 1108, but can be connected by other interfaces such as a parallel port, IEEE 1394 serial port, a game port, a USB port, an IR interface, and so forth.

A monitor 1144 or other type of display device is also connected to the system bus 1108 via an interface, such as a video adaptor 1146. The monitor 1144 may be internal or external to the computer 1102. In addition to the monitor 1144, a computer typically includes other peripheral output devices, such as speakers, printers, and so forth.

The computer 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computer 1102, or portions thereof, can be stored in the remote memory/storage device 1150. It may be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method, comprising:
providing, by an electronic device, access states for at least two logical interfaces to a host, the at least two logical interfaces comprising a first and a second logical interfaces, each logical interface being configured to provide access to a first and a second storage units;
receiving, by the electronic device, status information indicating a partition event has occurred;
transitioning, by the electronic device, to a majority partition after the partition event;
disassociating, by the electronic device, from an out of partition cluster node that transitioned to a minority partition after the partition event;
updating, by the electronic device, at least one access state for at least one logical interface;
notifying, by the electronic device, the host of the at least updated access state; and
providing, by the electronic device, the at least one updated access state for the at least one logical interface, such that the host maintains access to the first storage unit via the first logical interface and the second storage unit via the second logical interface after the partition event.

2. The method of claim 1, further comprising:
determining, by the electronic device, when the partition event has occurred based at least partially on connectivity with a cluster node; and
notifying, by the electronic device, at least one cluster node with status information for the out of partition cluster node.

3. The method of claim 2, wherein the step of determining further comprises:
sending,by the electronic device, at least one heartbeat signal to the cluster node;
determining, by the electronic device, occurrence of the partition event in the cluster based at least partially on a threshold number of heartbeat response signals received from the cluster node; and
declaring, by the electronic device, the cluster node as the out of partition cluster node after the cluster node fails to respond to the threshold number of heartbeat signals.

4. The method of claim 2, wherein the status information comprises quorum state information indicating the out of partition cluster node as out-of-quorum and connectivity state information indicating that the out of partition cluster node is out of partition.

5. The method of claim 1, wherein the disassociating further comprises:
evicting, by the electronic device, at least one component of the out of partition cluster node that transitioned to the minority partition from at least one distributed group; and leaving, by the electronic device, at least one distributed group managing at least one storage unit of the out of partition cluster node that transitioned to the minority partition.

6. The method of claim 1, wherein the host is communicatively coupled to the at least two logical interfaces to access the first and second storage units managed by at least two cluster nodes in a cluster, and the partition event separates the cluster into at least two partitions comprising at least the majority partition and the minority partition.

7. The method of claim 1, wherein the at least one access state indicates that at least one storage unit managed by the out of partition cluster node in the minority partition is inaccessible via the at least one logical interface.

8. An electronic device comprising:
a memory containing machine readable medium comprising machine executable code having stored thereon instructions for performing a method of managing non-disruptive storage area network availability in a partitioned cluster;
a processor coupled to the memory, the processor configured to execute the machine executable code to cause the processor to:
provide access states for at least two logical interfaces to a host, the at least two logical interfaces comprising a first and a second logical interfaces, each logical interface being configured to provide access to a first and a second storage units,
transition to a majority partition or a minority partition after a partition event,
disassociate from an out of partition cluster node that transitioned to a different partition after the partition event,
update at least one access state for at least one logical interface,
notify the host of the at least one updated access state, and
provide the at least one updated access state for the at least one logical interface, such that the host maintains access to the first storage unit via the first logical interface and the second storage unit via the second logical interface after the partition event.

9. The device of claim 8, wherein the at least one component is to further determine whether the partition event has occurred,
notify at least one cluster node with status information of an out of partition cluster node, and
receive status information indicating a partition event has occurred.

10. The device of claim 9, wherein the at least one component determines whether the partition event has occurred is to further
send at least one heartbeat signal to a cluster node,
determine occurrence of the partition event based at least partially on a threshold number of heartbeat response signals received from the cluster node, and
declare the cluster node as the out of partition cluster node after the cluster node fails to respond to the threshold number of heartbeat signals.

11. The device of claim 9, wherein the status information comprises quorum state information indicating the out of partition cluster node that transitioned to a different partition as out-of-quorum and connectivity state information indicating that the out of partition cluster node as out of partition.

12. The device of claim 8, wherein the at least component is to further evict at least one component of the out of partition cluster node that transitioned to the different partition from at least one distributed group, and leave at least one distributed group managing at least one storage unit of the out of partition cluster node that transitioned to the different partition.

13. The device of claim 8, wherein the host is communicatively coupled to the at least two logical interfaces to access the first and second storage units managed by at least two cluster nodes in a cluster, and the partition event separates the cluster into at least two partitions comprising at least the majority partition and the minority partition.

14. The device of claim 8, wherein the at least one access state indicates that at least one storage unit managed by the out of partition cluster node in the different partition is inaccessible via the at least one logical interface.

15. A non-transitory machine readable medium having stored thereon instructions for performing a method comprising machine executable code which when executed by at least one machine, cause the machine to:

provide access states for at least two logical interfaces to a host, the at least two logical interfaces comprising a first and a second logical interfaces, each logical interface being configured to provide access to a first and a second storage units;

transition to a minority partition after a partition event;

disassociate from an out of partition cluster node that transitioned to a majority partition after the partition event;

update at least one access state for at least one logical interface;

notify the host of the at least updated access state; and provide the at least one updated access state for the at least one logical interface, such that the host maintains access to the first storage unit via the first logical interface and the second storage unit via the second logical interface after the partition event.

16. The non-transitory machine readable medium of claim 15, wherein the instructions, when executed, further cause the system to:

determine whether the partition event has occurred based at least partially on connectivity with a cluster node;

notify at least one cluster node with status information for the out of partition cluster node; and receive status information indicating the partition event has occurred.

17. The non-transitory machine readable medium of claim 16, wherein the instructions to determine whether the partition event has occurred, when executed, further cause the system to:

send at least one heartbeat signal to the cluster node;

determine occurrence of the partition event based at least partially on a threshold number of heartbeat response signals received from the cluster node; and declare the cluster node as the out of partition cluster node after the cluster node fails to respond to the threshold number of heartbeat signals.

18. The non-transitory machine readable medium of claim 15, wherein the instructions to disassociate from the out of partition cluster node, when executed, further cause the system to:

evict at least one component of the out of partition cluster node that transitioned to a majority partition from at least one distributed group; and leave at least one distributed group managing at least one storage unit of the out of partition cluster node that transitioned to the majority partition.

19. The non-transitory machine readable medium of claim 15, wherein the host is communicatively coupled to the at least two logical interfaces to access the first and second storage units managed by at least two cluster nodes in a cluster, and the partition event separates the cluster into at least two partitions comprising at least the majority partition and the minority partition.

20. The non-transitory machine readable medium of claim 15, wherein the at least one access state indicates that at least one storage unit managed by the out of partition cluster node in the majority partition is inaccessible via the at least one logical interface.

* * * * *